United States Patent [19]
Kato et al.

[11] Patent Number: 5,600,843
[45] Date of Patent: Feb. 4, 1997

[54] RING SYSTOLIC ARRAY SYSTEM FOR SYNCHRONOUSLY PERFORMING MATRIX/NEURON COMPUTATION USING DATA TRANSFERRED THROUGH CYCLIC SHIFT REGISTER CONNECTED IN CASCADE OF TRAYS

[75] Inventors: Hideki Kato; Hideki Yoshizawa; Hiroki Iciki, all of Tokyo; Kazuo Asakawa, Kawasaki, all of Japan

[73] Assignee: Fujitsu Limited, Kawasaki, Japan

[21] Appl. No.: 227,472

[22] Filed: Apr. 14, 1994

Related U.S. Application Data

[63] Continuation of Ser. No. 591,138, Sep. 20, 1990, abandoned.

[30] Foreign Application Priority Data

Sep. 20, 1989 [JP] Japan ................................. 1-243969
Sep. 20, 1989 [JP] Japan ................................. 1-243970
Sep. 20, 1989 [JP] Japan ................................. 1-243971
Sep. 20, 1989 [JP] Japan ................................. 1-243972

[51] Int. Cl.⁶ ............................. G06F 15/80; G06F 15/16
[52] U.S. Cl. ............................. 395/800; 395/16; 395/21; 364/DIG. 1; 364/137
[58] Field of Search ............................ 364/137; 395/325, 395/800, 250, 29.11, 21, 97

[56] References Cited

U.S. PATENT DOCUMENTS

| | | | |
|---|---|---|---|
| 4,524,455 | 6/1985 | Holsztynski et al. | 382/41 |
| 4,816,993 | 3/1989 | Takahashi et al. | 395/250 |
| 4,891,787 | 1/1990 | Gifford | 395/325 |
| 4,979,096 | 12/1990 | Uedo et al. | 395/375 |
| 5,014,235 | 5/1991 | Morton | 395/375 |
| 5,129,092 | 7/1992 | Wilson | 395/800 |
| 5,138,704 | 8/1992 | Takahashi et al. | 395/325 |
| 5,165,023 | 11/1992 | Gifford | 395/325 |
| 5,170,483 | 12/1992 | Keryvel et al. | 395/800 |

FOREIGN PATENT DOCUMENTS 0147857 12/1984 European Pat. Off. .
0236762 2/1987 European Pat. Off. .

OTHER PUBLICATIONS

*Neural Networks from Models to Applications,* E.S.P.C.I., Paris, France 1988, L. Personnaz, G. Dreyfus.
IEEE International Conference on Neural Networks, Jul. 24–27, 1988.
Parallel Architectures for Artificial Neural Nets, S. Y. Kung and J. N. Hwang, Princeton University Department of Electrical Engineering, Princeton, NJ, Proceeding of International Conference on Neural Networks (1988), INNS.
Parallel Architectures ofr Artificial Neural Nets, S. Y. Kung, Princeton University Department of Electrical Engineering, Princeton, NJ, Proceeding of International Conference on Systolic Arrays (1988), IEEE.

*Primary Examiner*—Krisna Lim
*Attorney, Agent, or Firm*—Staas & Halsey

[57] ABSTRACT

A parallel data processing system comprises a plurality of data processing units each having at least one input and storing data of a matrix and a plurality of trays each having a first input and an output and for storing data of a vector, each of all or part of said trays having a second output connected to said first input of a respective one of said data processing units, and said trays being connected in cascade to form a shift register for performing data transfer between corresponding ones of the trays and the data processing units and data processing in the data processing units synchronously, thereby performing an operation of a matrix vector product or a neuron computer operation on analog signals.

41 Claims, 51 Drawing Sheets

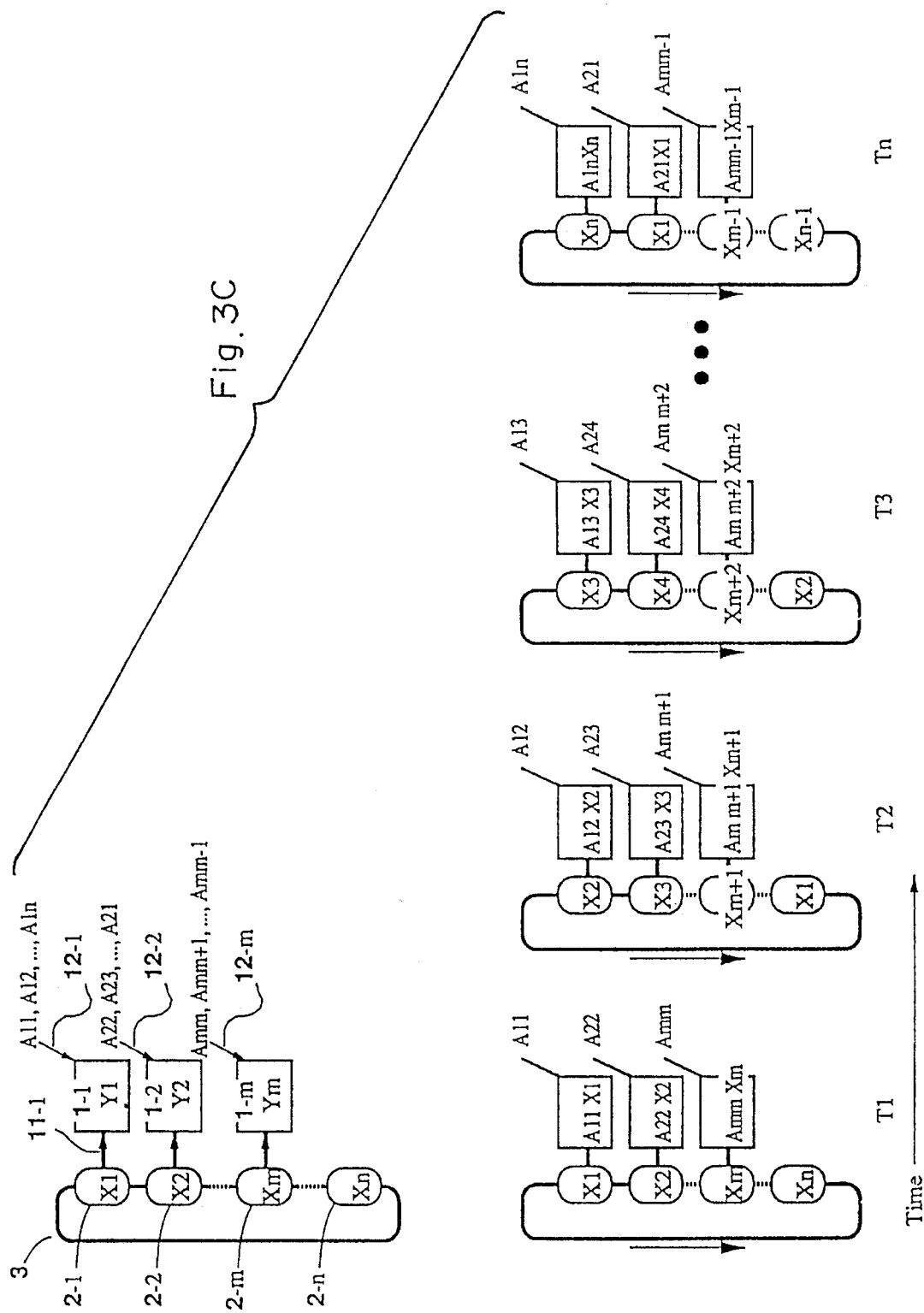

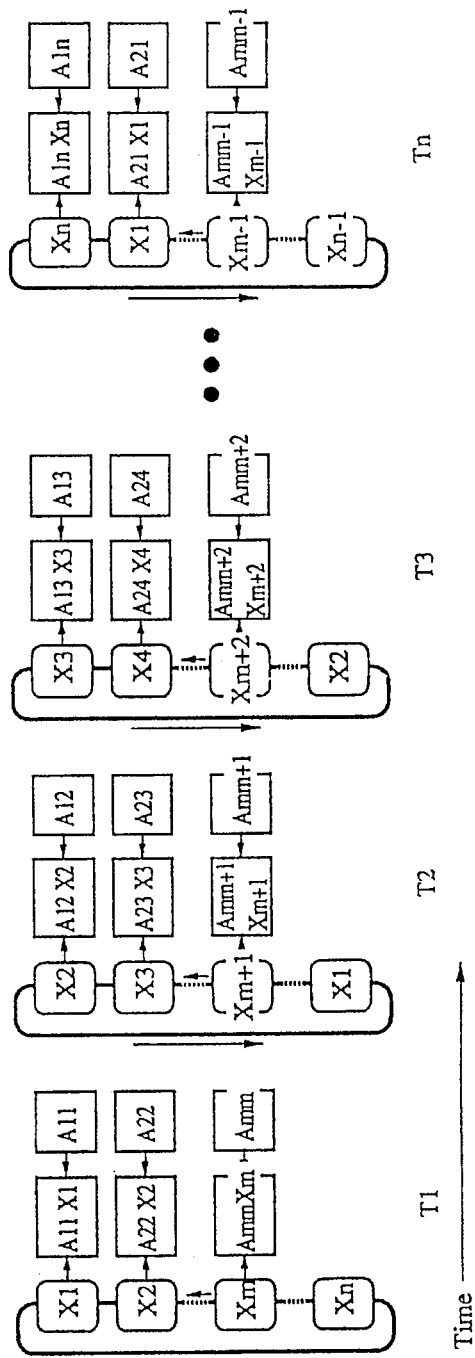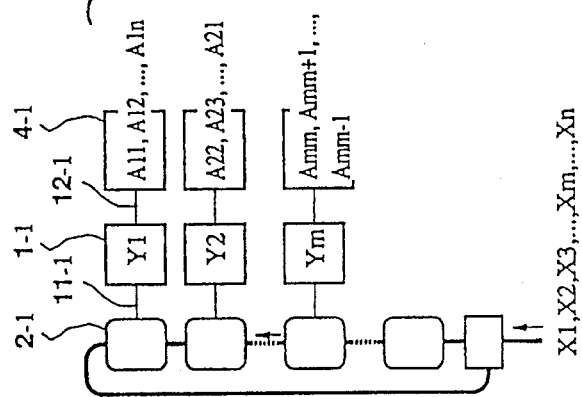
Fig. 4C

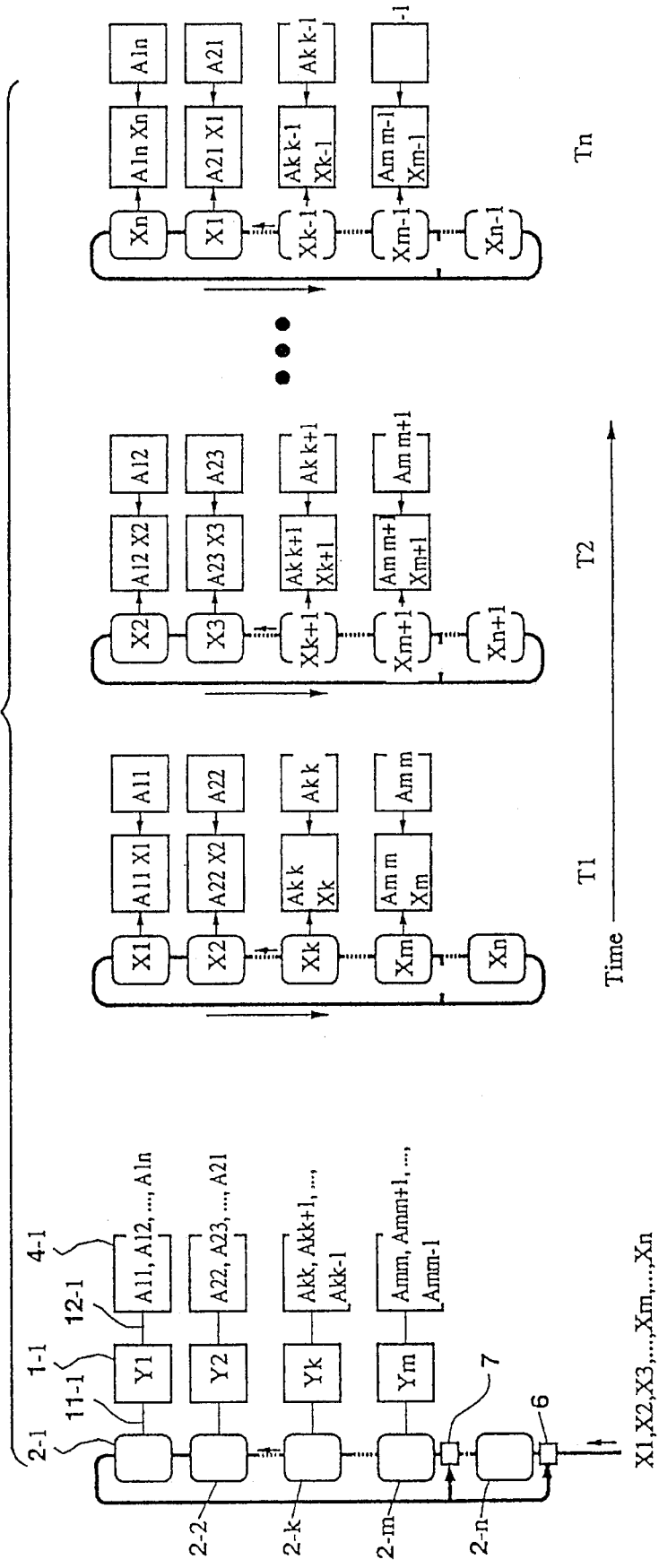

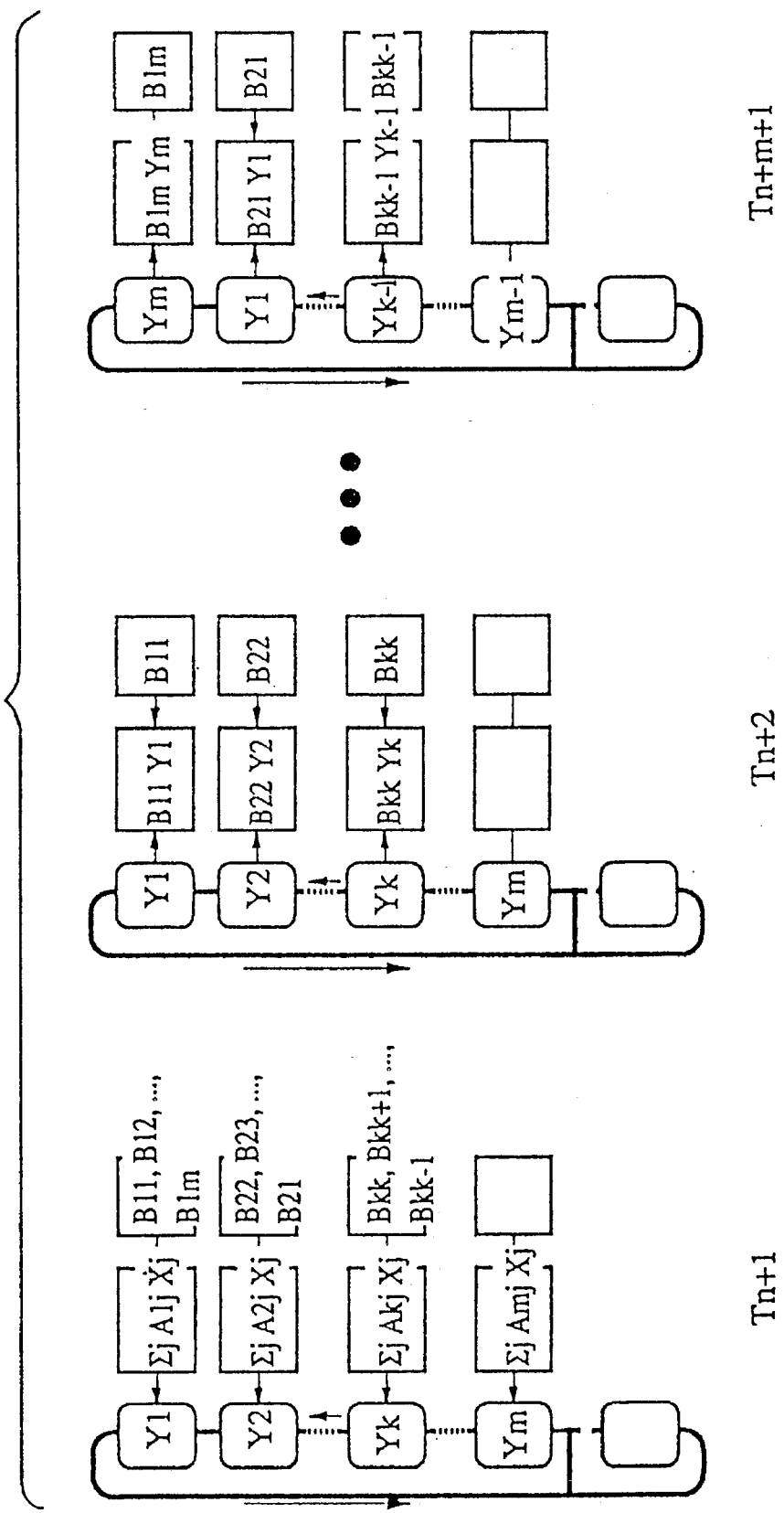

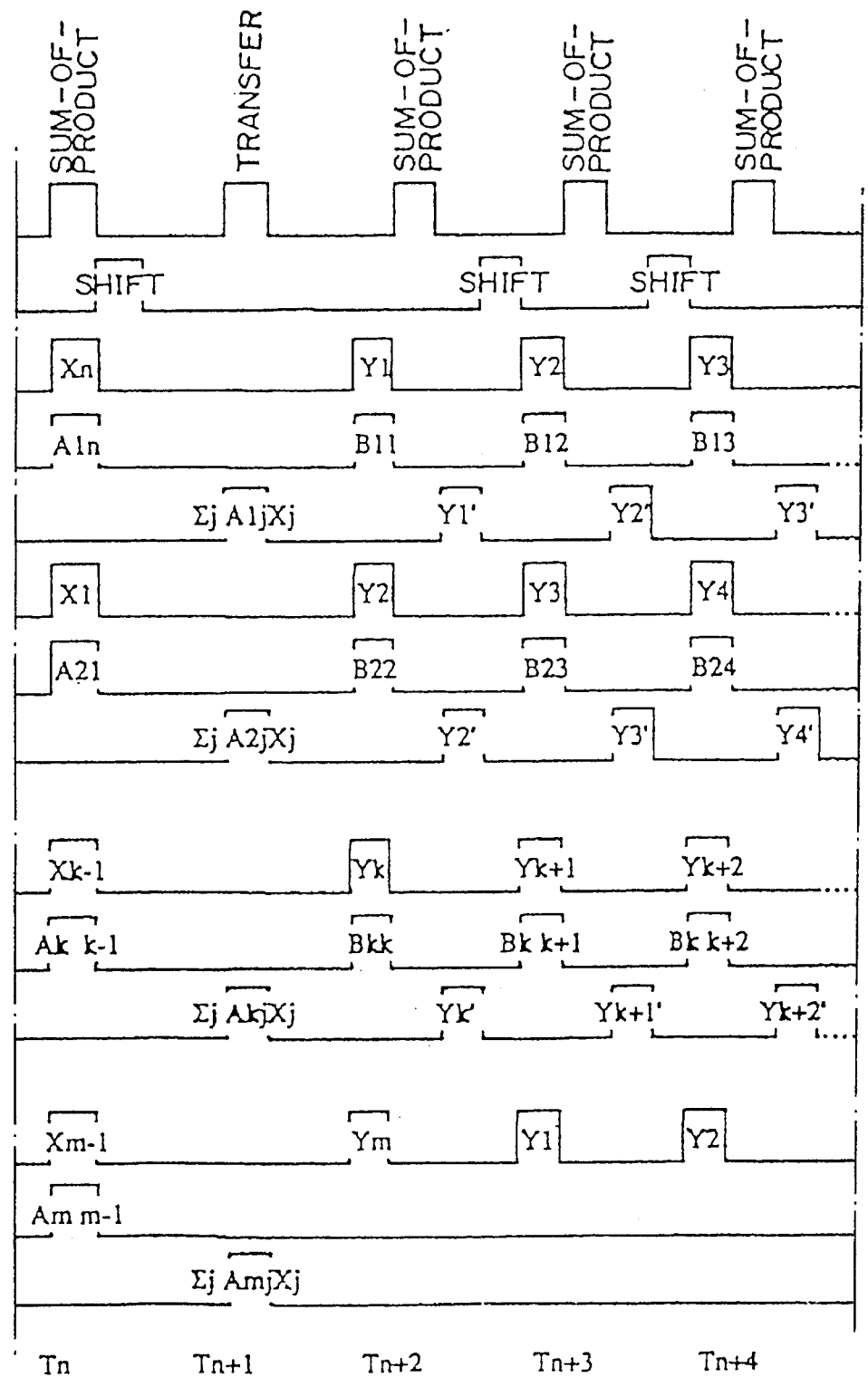
Fig. 5D(ii)

Fig. 5D(iii)
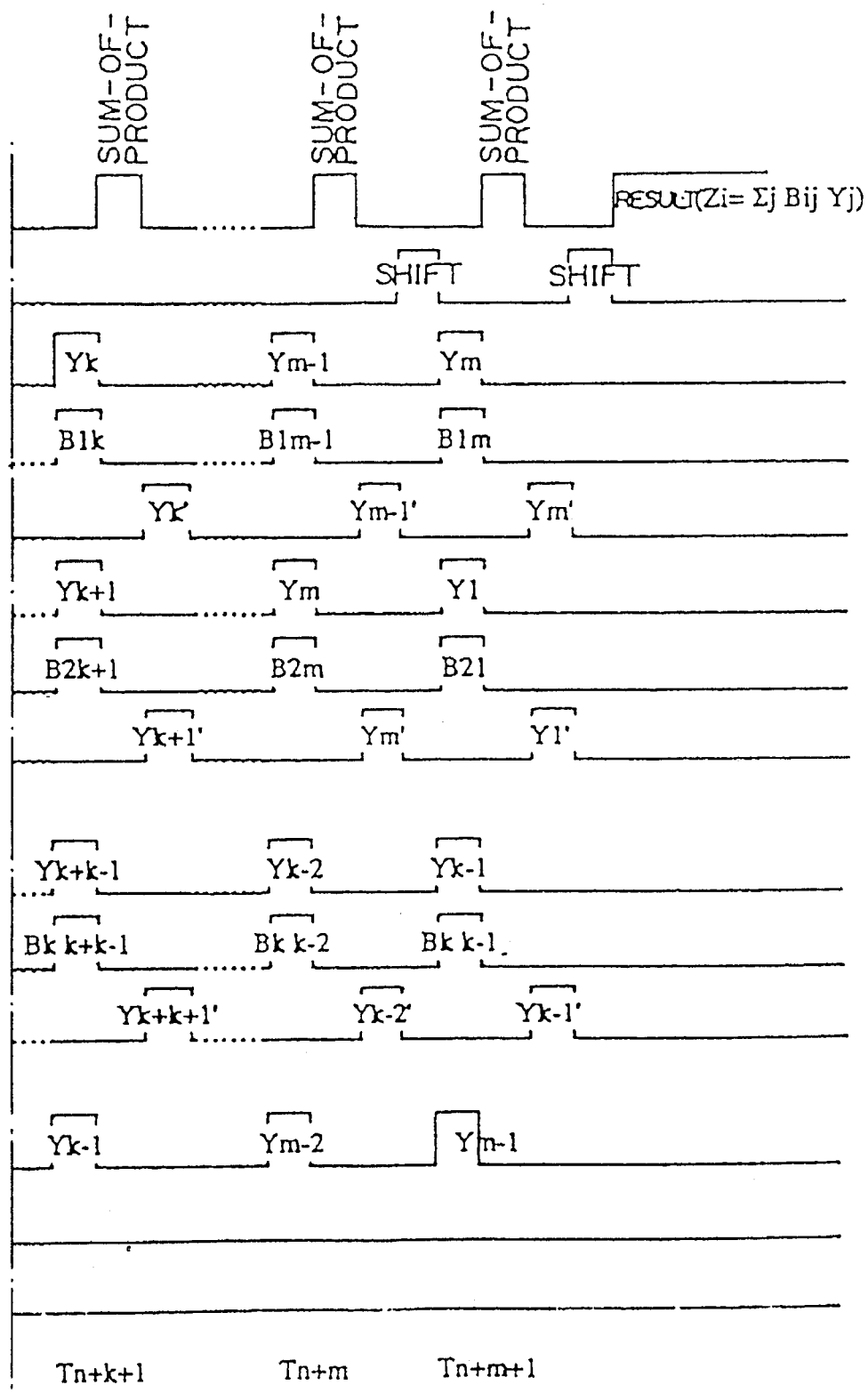

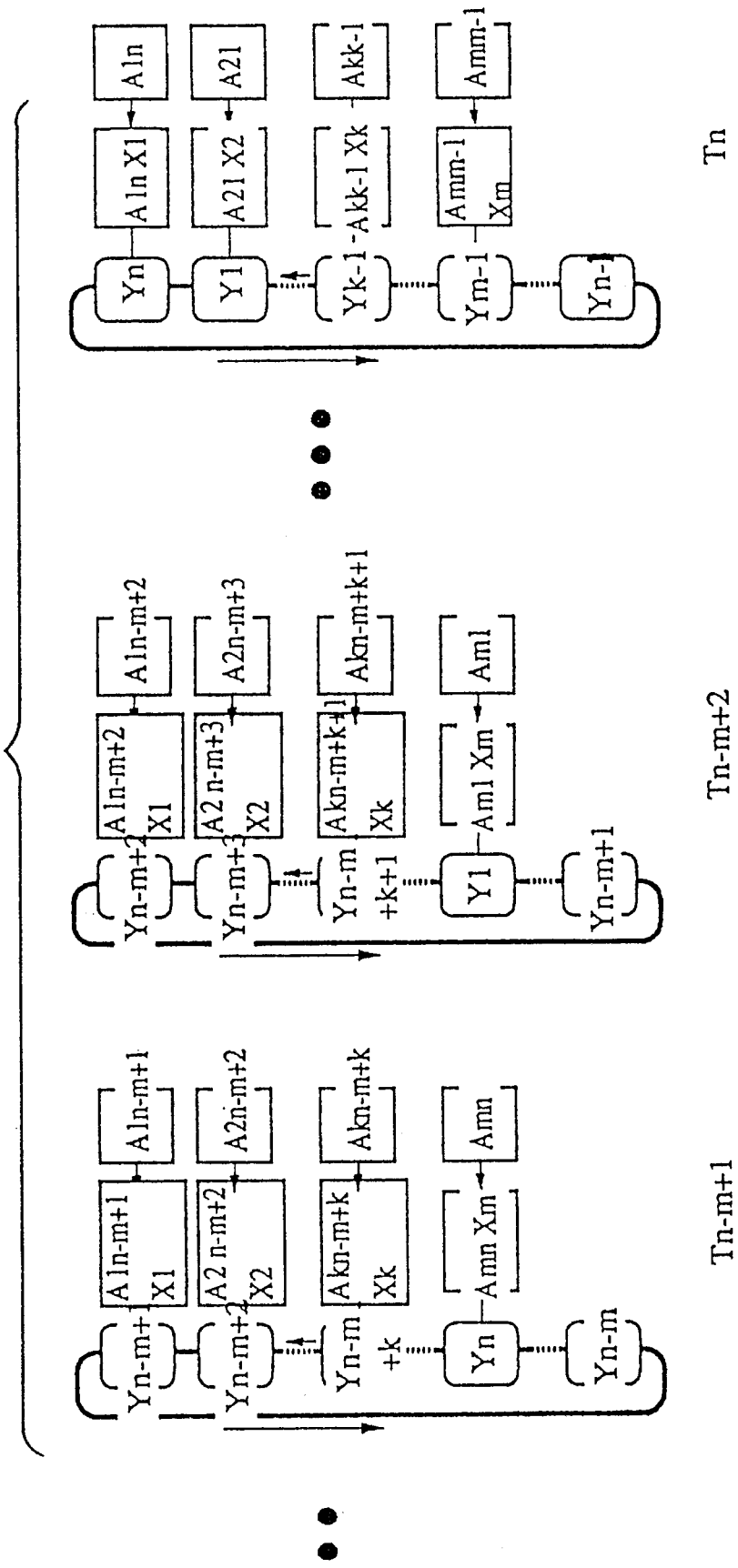
Fig. 6C(ii)

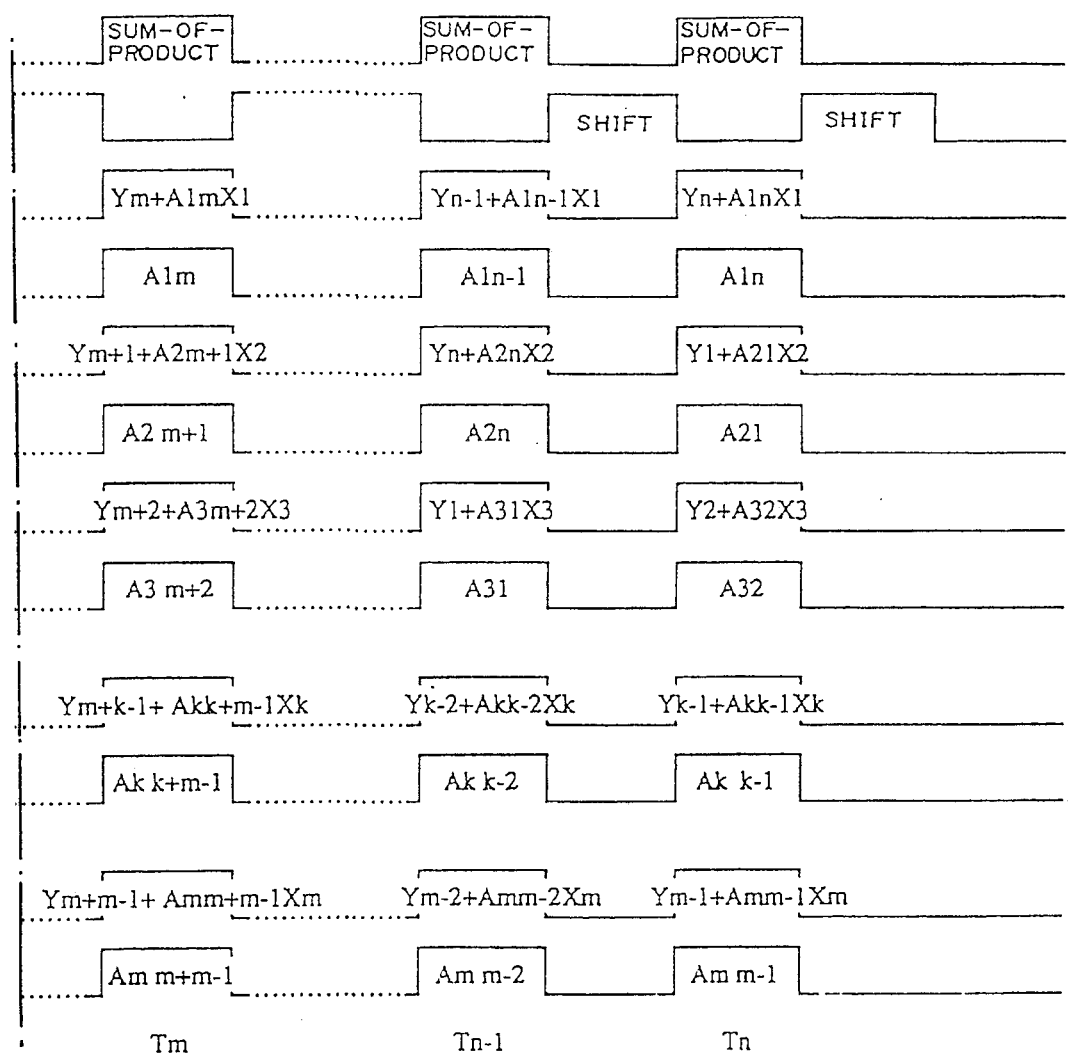
Fig. 6D(ii)

$Y = f(U)$; f IS SIGMOID FUNCTION $U = \Sigma_{i=1,n} W_i X_i$

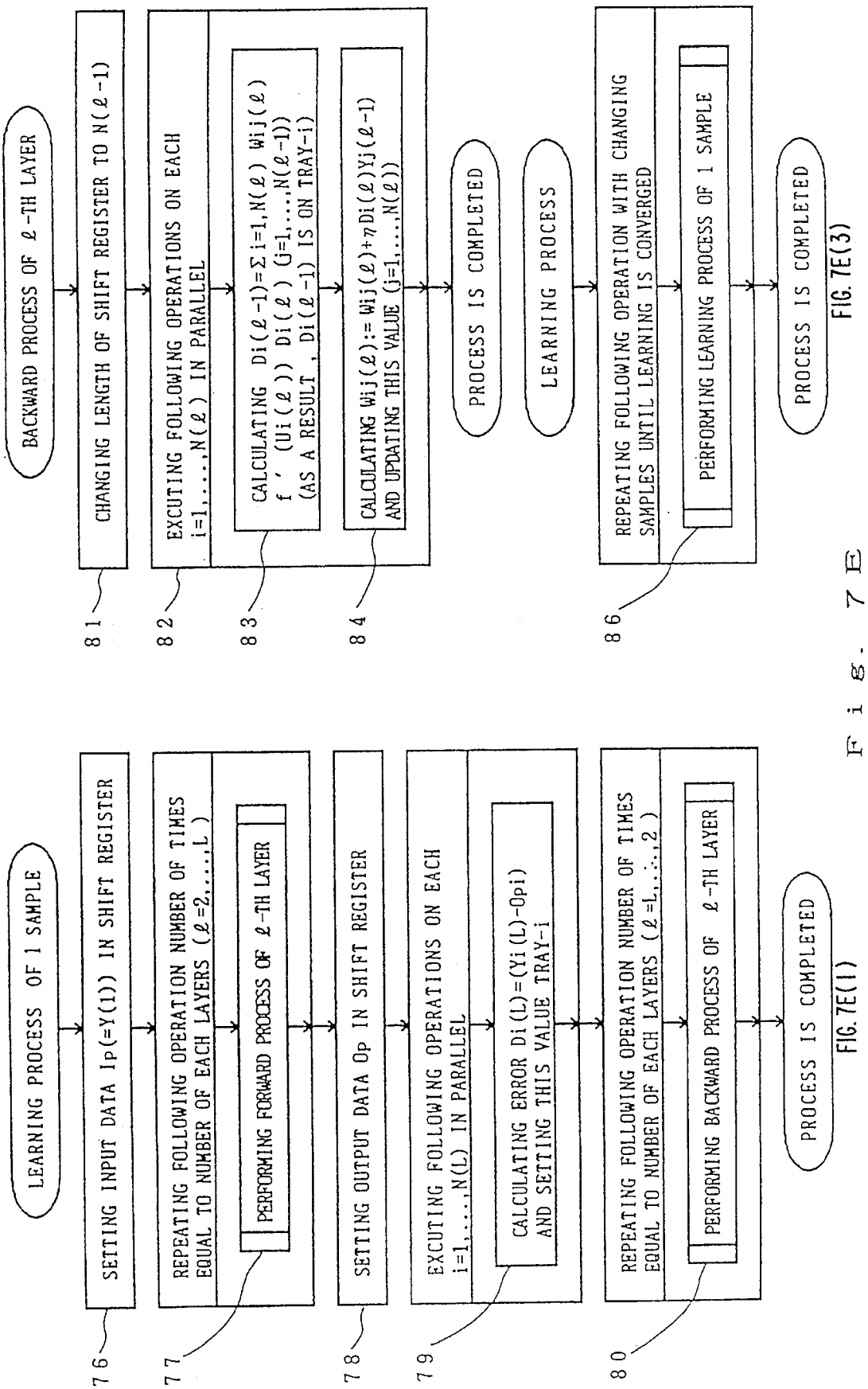

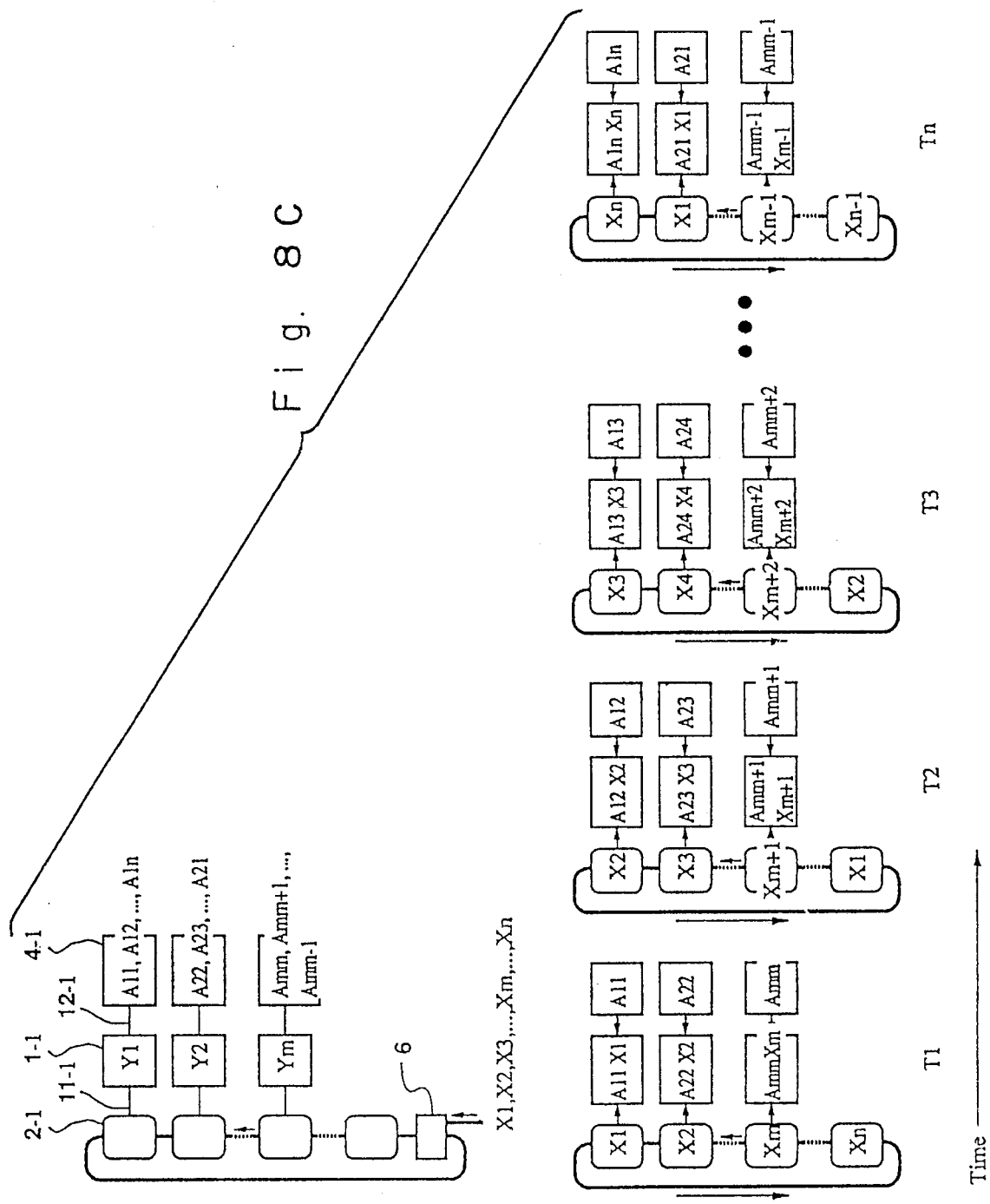

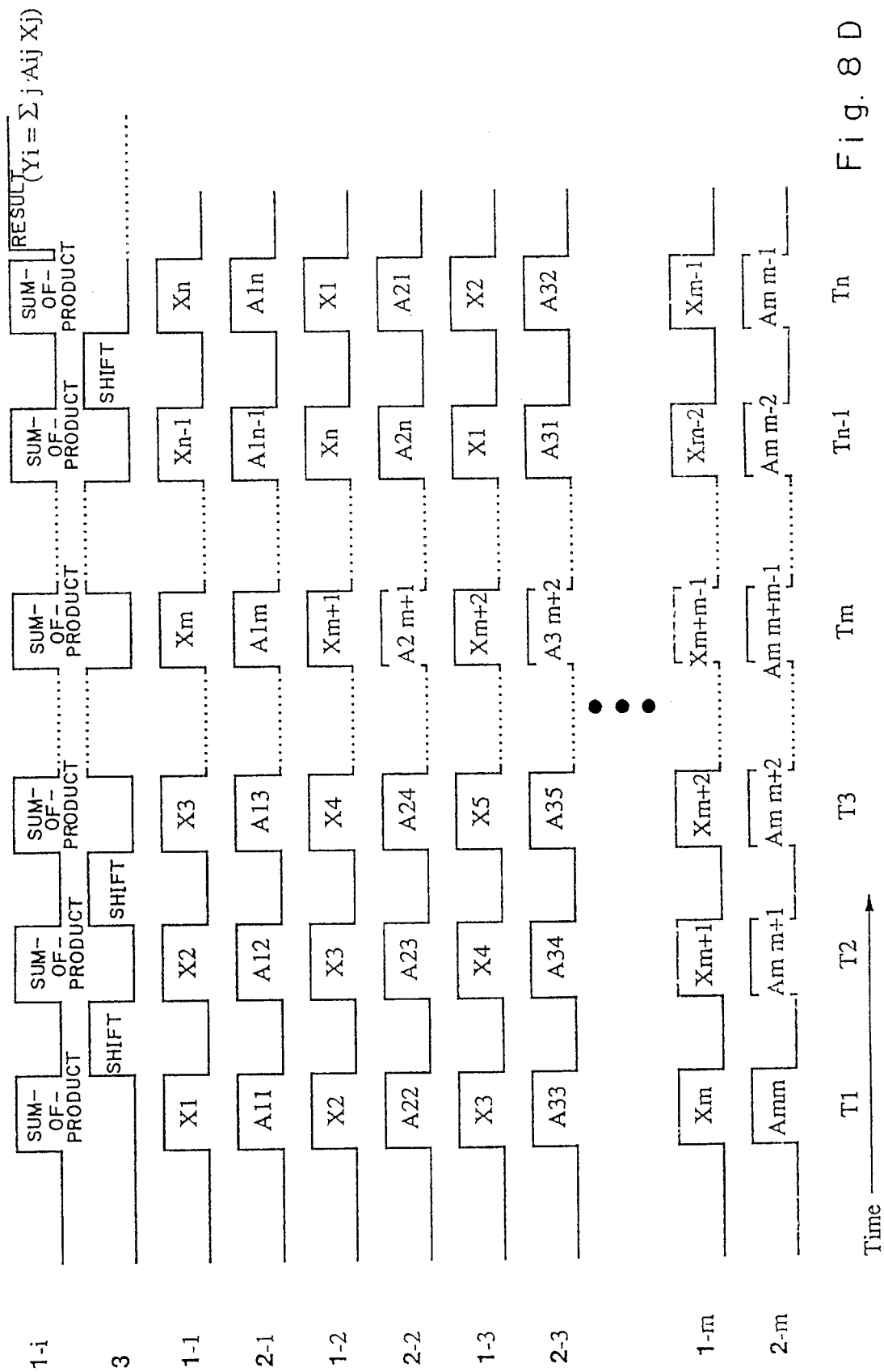

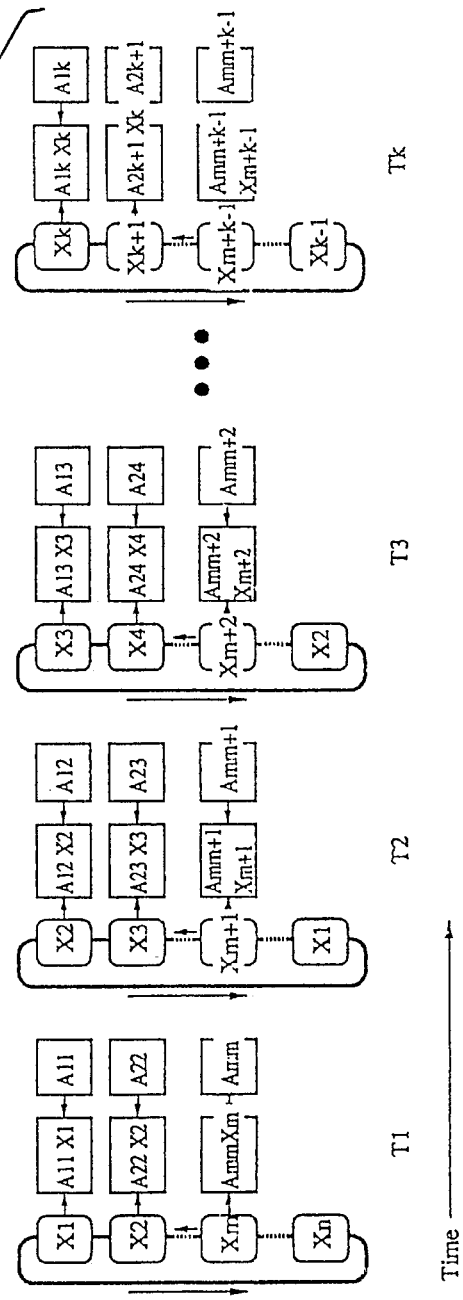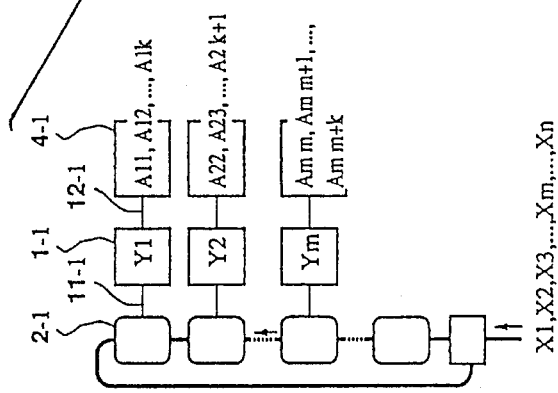
Fig. 9C

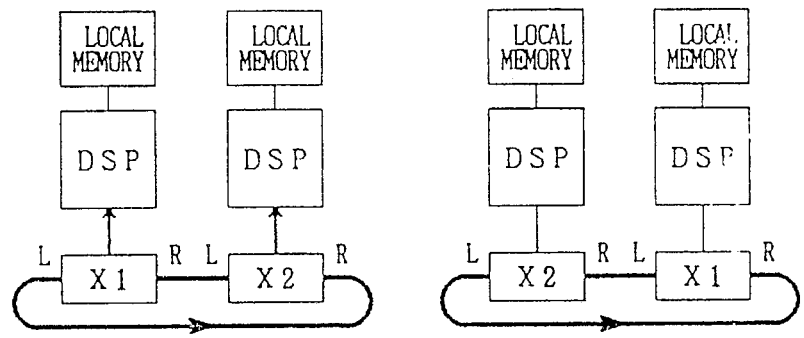
RSL ( READ SHIFT LEFT )
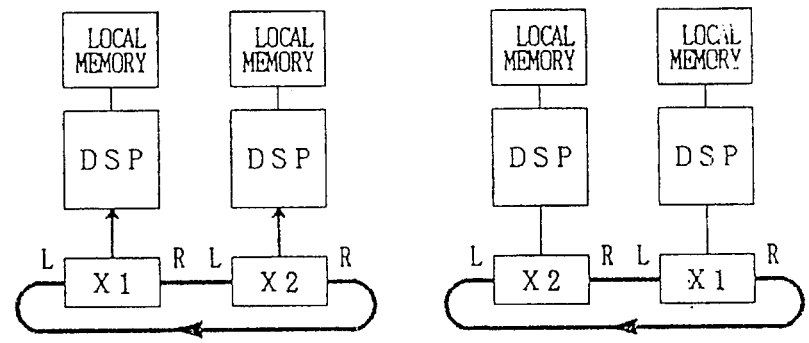
RSR ( READ SHIFT RIGHT )
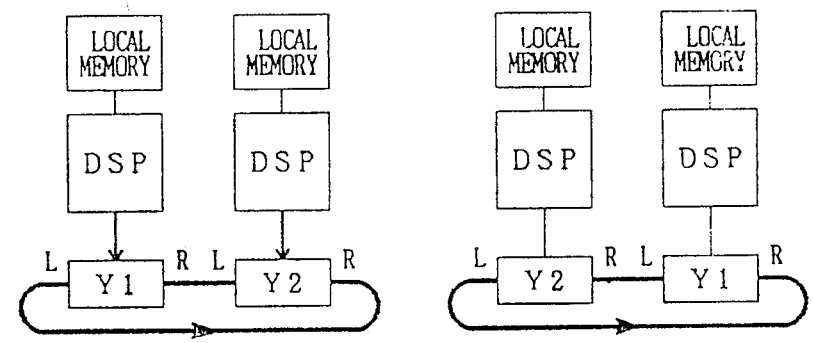
WSL ( WRITE SHIFT LEFT )
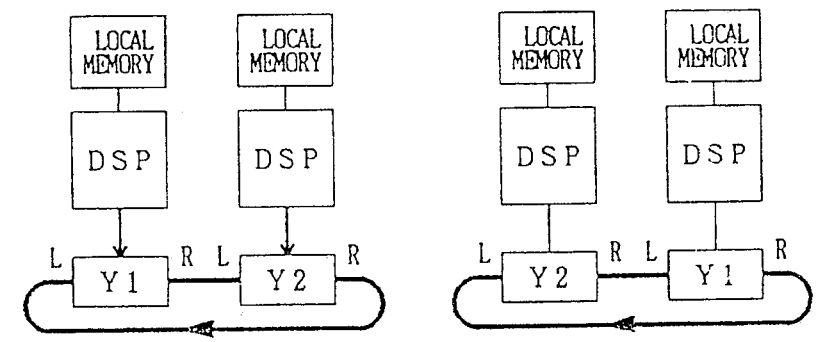
WSR ( WRITE SHIFT RIGHT )
Fig. 10E

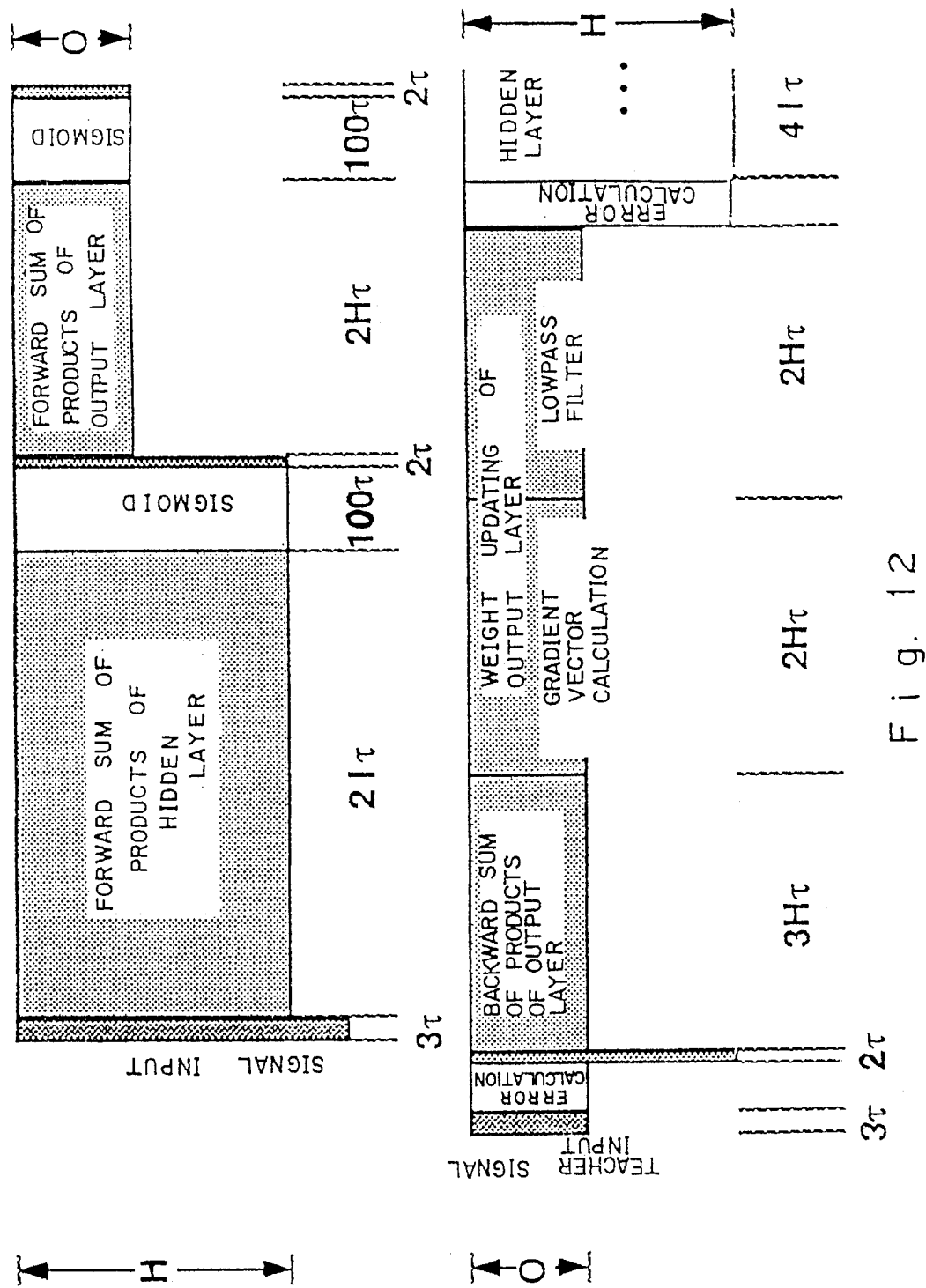

RING SYSTOLIC ARRAY SYSTEM FOR SYNCHRONOUSLY PERFORMING MATRIX/NEURON COMPUTATION USING DATA TRANSFERRED THROUGH CYCLIC SHIFT REGISTER CONNECTED IN CASCADE OF TRAYS

This application is a continuation of application Ser. No. 07/591,138, filed Sep. 20, 1990, now abandoned.

BACKGROUND OF THE INVENTION

1. Field of the Invention

The present invention relates to a parallel data processing system and, more particularly, to a parallel data processing system for processing data using a plurality of data processing units synchronously.

2. Description of the Related Art

With recent expansion of the fields of application of data processing, large quantities of data are processed in an electronic computer system or a digital signal processing system. In the field of image processing or voice processing in particular, high-speed data processing is needed. For this reason, the utilization of parallel data processing using a plurality of data processing units synchronously becomes important.

In general, important concepts of processing using a plurality of processing units include the number effect. The number effect is defined as an improvement in data processing speed proportional to the number of processing units used. In the parallel processing system, it is very important to obtain a good number effect.

Apart from the limitation due to the number of processing units for parallel processing, the main cause of the deterioration of the number effect is prolongation of the total processing time due to addition of data transfer time to inherent data processing time. To improve the number effect, therefore, it is important to fully utilize the capacity of data transmission lines. However, it is very difficult.

If the processing is regular, however, it will be possible to improve the number effect by utilizing the regularity. Data are caused to flow in a systolic array, that is, cyclically and an operation is carried out where two pieces of data are aligned in the flow of data. A parallel processing system utilizing the regularity of processing is a systolic array system. In the systolic array system, a one-dimensional systolic array system called a ring systolic array system is a parallel data processing system which processes systolic data using a plurality of data processing units synchronously and is easy to implement. The processing with regularity includes parallel processing which applies a nonlinear function to a matrix operation based on the inner product of vectors and a sum-of-products operation in a neural network.

FIG. 1A illustrates the principle structure of a conventional common-bus-coupled parallel processing system. In the figure, PE designates a processor element, M designates a memory, COMMON BUS designates a common bus, BUS1 designates a bus coupled to the common bus and BUS2 designates an internal bus for coupling each of the processor elements PE to its corresponding respective memory M. In the common-bus-coupled parallel system, communications among the processor elements (hereinafter referred to as PEs) are performed over the common bus. Since only one bus-width of data is transmitted over the common bus during a specific time interval, the communications must be performed synchronously over the entire common bus.

FIG. 1B is an operational flowchart of calculation of the product of a matrix and a vector by the common-bus-coupled parallel system. Each PE multiplies Y in its internal register by data X from another PE and adds the resultant product to Y. For this reason, as illustrated in the flowchart, the contents, i.e., $Y_i$ of the internal register of PE-i is first cleared to 0. Then, the following step is repeated n times. That is, when $X_j$ is applied to the common bus, PE-i multiplies an input from the bus BUS1 connected to the common bus and an input supplied from the memory M through the internal bus BUS2 and adds the resultant product to $Y_i$. This operation is repeated.

FIG. 2A illustrates the principle of a conventional ring systolic system. A processor element PE is connected to another PE by a cyclic common bus. M designates a memory for storing coefficients $W_{ij}$. $W_{11}, W_{12}, \ldots W_{33}$ are elements of a coefficient matrix. In general, $W_{ij}$ is an element at the intersection of the i-th row and the j-th column of the matrix. The multiplication of the coefficient matrix W and a vector $\mathbf{x} = (X_1, X_2, X_3)$ is made by the ring systolic system as follows.

FIG. 2B illustrates the internal structure of the i-th processor element PE-i. In the figure, MULTIPLIER designates a multiplier, ADDER designates an adder, ACC designates an accumulator and M designates a group of registers for storing coefficient elements $W_{ij}$. Each of the registers is of a FIFO (first-in first-out) type. In the figure, the element $W_{ij}$ at the intersection of the i-th row and the j-th column of the coefficient matrix is now being read out of the register. The element read out of the register is circulated in sync with the next clock to enter the last stage via a bus BUS1. As illustrated, $W_{i1}, \ldots, W_{i,j-1}$ have already been circulated and stored in the last stages.

On the other hand, each element of the vector is entered via the bus BUS1. At present, an element $X_j$ is entered. The result of the inner product of $W_{i1} \times X_1 + \ldots + W_{i,j-1} \times X_{j-1}$ has already been stored in the accumulator ACC. This is now output from the accumulator 25 and entered into the adder via its input. $X_j$ entered from the outside and $W_{ij}$ output from the FIFO register are multiplied in the multiplier. The result of the multiplication is input to the adder via its other input so that it is added to the current contents of the accumulator ACC. The output of the adder is applied to the same accumulator ACC in sync with the next clock. This is repeated so that the operation of inner product is performed on the row vector of the i-th row of the coefficient matrix W and the externally applied vector $\mathbf{x}$. The switch SWITCH is adapted to cause data $X_j$ to pass through the processor element PE or set data $X_j$ into the accumulator ACC.

When the product of a matrix and a vector is calculated in such a PE, PE-1 first multiplies $W_{11}$ and $X_1$ as shown in FIG. 2A. During the next clock cycle $X_2$ flows out of the right PE-2 and $W_{12}$ is output from the memory M-1 so that $W_{12} \times X_2$ is calculated. Similarly, the product of $W_{13}$ and $X_3$ is obtained during the next clock cycle. Thereby, the product of the first column of the coefficient matrix and the vector $\mathbf{x}$ becomes possible to implement in the PE-1. Also, the product of the second column and the vector is calculated in PE-2. That is, $W_{22}$ and $X_2$ are multiplied, $W_{23}$ and $X_3$ are multiplied during the next clock cycle, and the product of $W_{21}$ and cyclically returned $X_1$ is obtained during the next clock cycle. Similarly, the product of the third row and the vector can be obtained by multiplying $W_{33}$ and $X_3$, multiplying $W_{31}$ and circulating $X_1$, and multiplying $W_{32}$ and cyclically returned $X_2$. According to this operation, therefore, the product of $W_{11}$ and $X_1$, the product of $W_{22}$ and $X_2$, and the product of $W_{33}$ and $X_3$ can be obtained simultaneously. As shown, however, torsion is produced in the arrangement of elements of the coefficient matrix in order to carry out the simultaneity. By carrying out data transfer between PEs and data processing in each PE synchronously in such a ring systolic array system, data transmission lines can be utilized effectively and thus a good number effect can be obtained.

FIG. 2C illustrates a multi-stage arrangement of the ring systolic configuration of FIG. 2A which calculates the product of a continuous matrix and a vector. Such a systolic array system is regular in processing, thus permitting the capacity of data transmission lines to be fully utilized and thus the number effect to be improved.

In the conventional common-bus-coupled parallel system shown in FIG. 1A, since processing elements are coupled by a common bus, only one piece of data can be transmitted at a time. The coupling by the common bus needs synchronization over the entire common bus. A problem with the conventional common-bus-coupled parallel system is that there are few kinds of processing which bring about a good number effect. Furthermore, a problem with the coupling by a common bus is that the common bus becomes long as the number of PEs coupled increases and thus the establishment of synchronization over the entire common bus becomes difficult. In addition, the coupling by a common bus is not suited for a largescale parallel system. In the conventional ring systolic array system as shown in FIGS. 2A and 2B, the number effect can be achieved by carrying out the data transfer between PEs and data processing in each PE synchronously. With this system, however, the data transfer between PEs and the data processing in each PE must be timed. With this system, when the optimum numbers of data processing units and data storage units are not equal to each other as in the case where the product of a rectangular matrix and a vector is obtained, PEs which are not involved in actual data processing are needed, that is, idle PEs increase in number, thus deteriorating the number effect. In other words, a problem which can be solved efficiently and a circuit configuration correspond closely with each other, and, in case where a problem to be solved is not optimum in size, the number effect deteriorates. Conversely, problems that can achieve a good number effect are specified, decreasing adaptability to extensive processing and flexibility or versatility. Consequently, it becomes difficult to implement a high-speed data processing system which can be applied to processing covering a range that is wide to some extent.

SUMMARY OF THE INVENTION

The object of the present invention is to reduce the overhead from the transmission of data among a plurality of processors and perform a matrix operation or a neurocomputer operation using an analog signal such that a desirable number effect is achieved in an operation for obtaining a product of a rectangular matrix and a vector. A further object of the present invention is to implement a hardware configuration of the same level of complexity as a ring systolic array system or a common-bus-coupled type SIMD (Single Instruction Multi Data) fully utilizing the inherent degree of parallelism in the system.

A feature of the present invention resides in a parallel data processing system comprising a plurality of data processing units each having at least one input, a plurality of trays each having a first input 10 and an output and functions of storing and transferring data, each of all or part of the trays having a second output connected to the first input of a respective one of the data processing units, and the trays being connected in cascade to form a shift register and means for performing data transfer between corresponding ones of the trays and the data processing units, while data processing in the data processing units synchronously, thereby performing a matrix operation or a neuroncomputer operation on analog signals.

BRIEF DESCRIPTION OF THE DRAWINGS

FIG. 3C is a diagram for use in explanation of the operation of the present invention, FIG. 4C is a diagram for use in explanation of the operation of the first embodiment, FIG. 7I is an explanatory view of calculating the sum of products in the transposed matrix, FIG. 8C is a diagram for use in explanation of the operation of the fifth embodiment, FIG. 8D is a timing chart of the fifth embodiment, FIG. 9C is a diagram for use in explanation of the operation of the sixth embodiment, FIG. 10E is a data flow diagram between the tray and the data processing unit, FIG. 12 is a time and space chart at the time of learning in the embodiments of the present invention.

DETAILED DESCRIPTION OF THE PREFERRED EMBODIMENTS

Figure 1A:
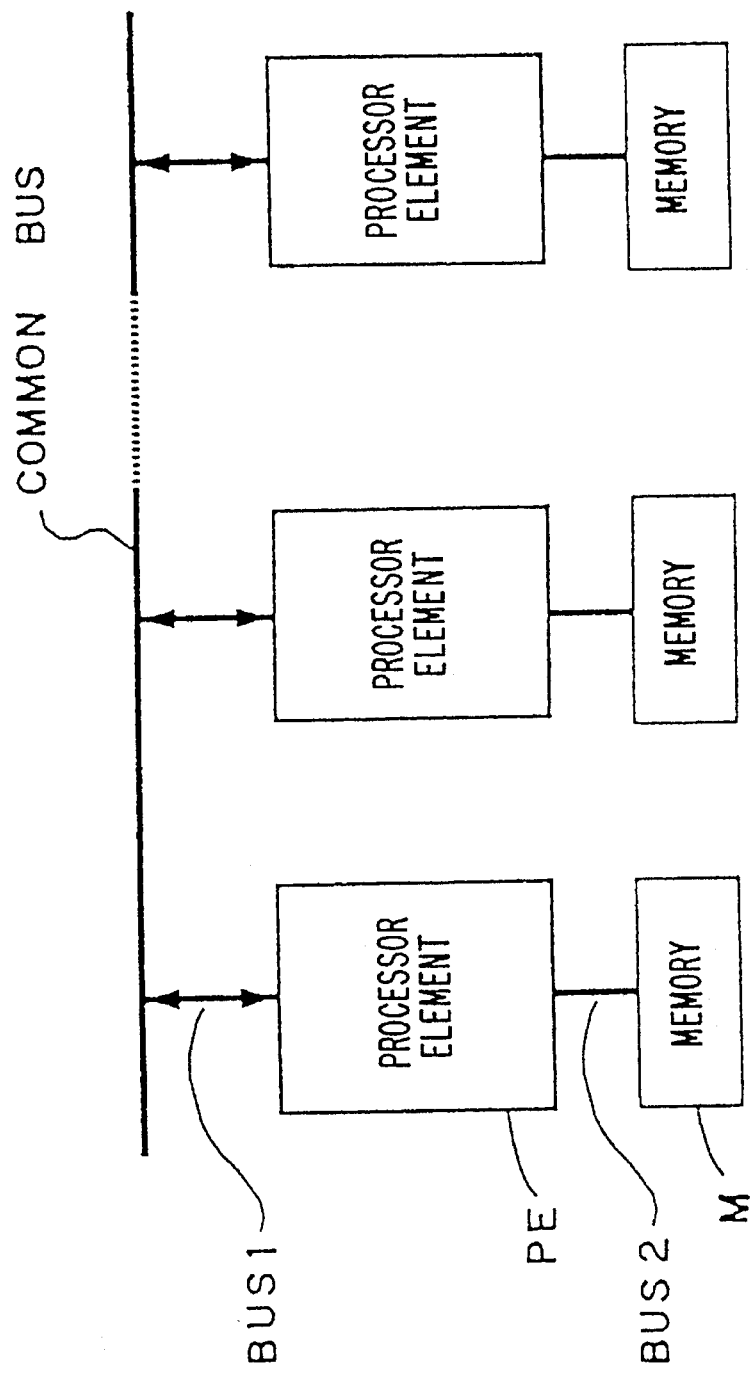
FIG. 1A illustrates the principle structure of a common bus SIMD system.
Figure 1B:
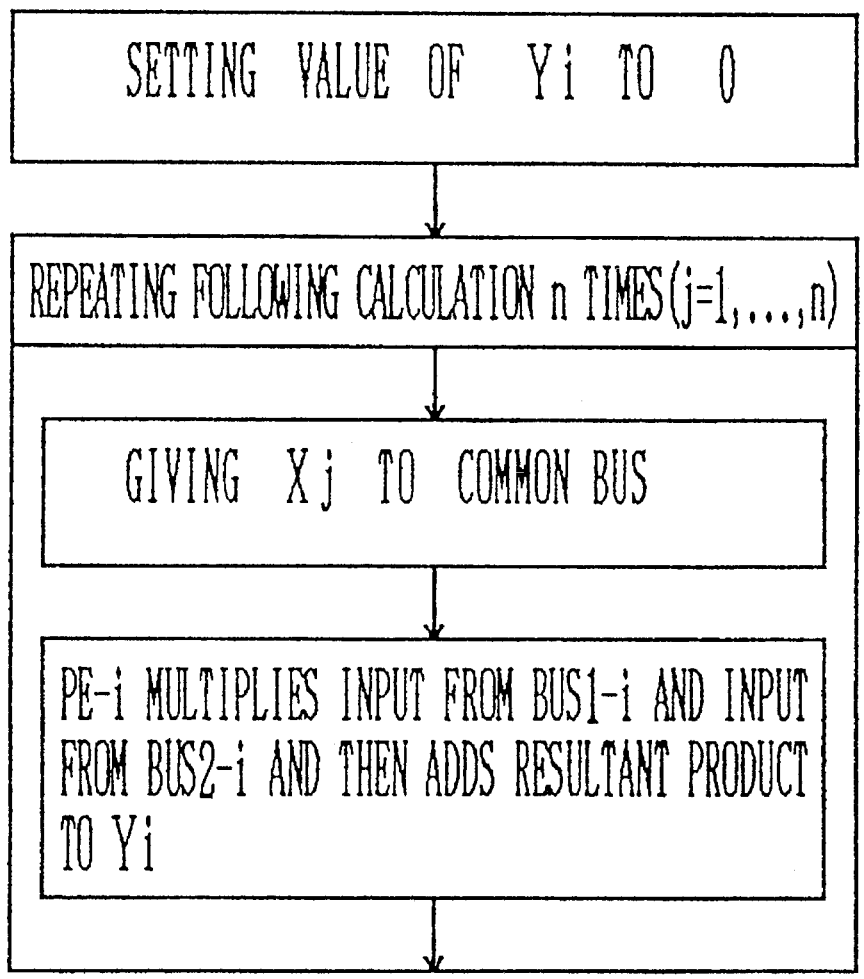
FIG. 1B is an operational flowchart of calculation of the product of a matrix and a vector according to the common bus SIMD system.
Figure 2B:
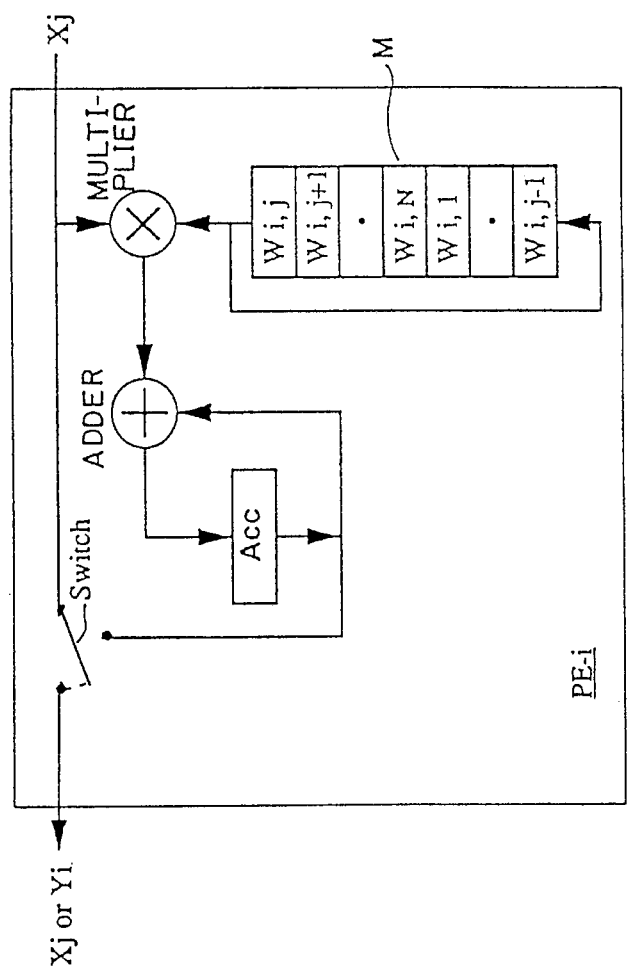
FIGS. 2A and 2B illustrate the principle of calculation of the product of a matrix and a vector according to a ring systolic system.
Figure 2A:
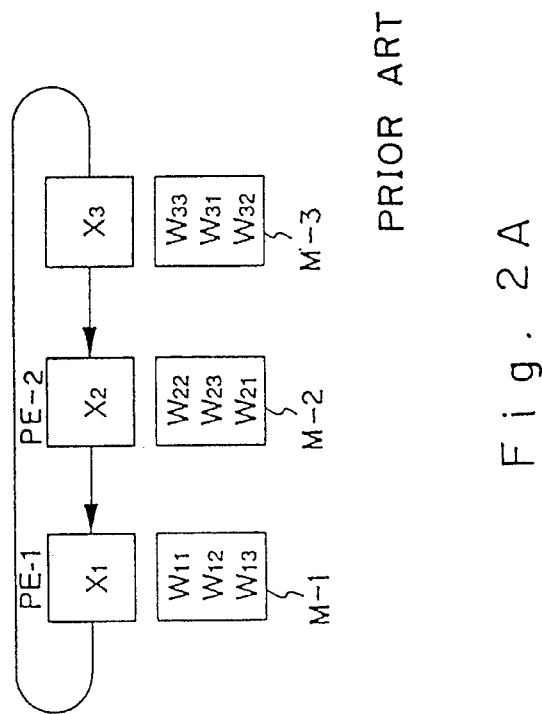
Figure 2C:
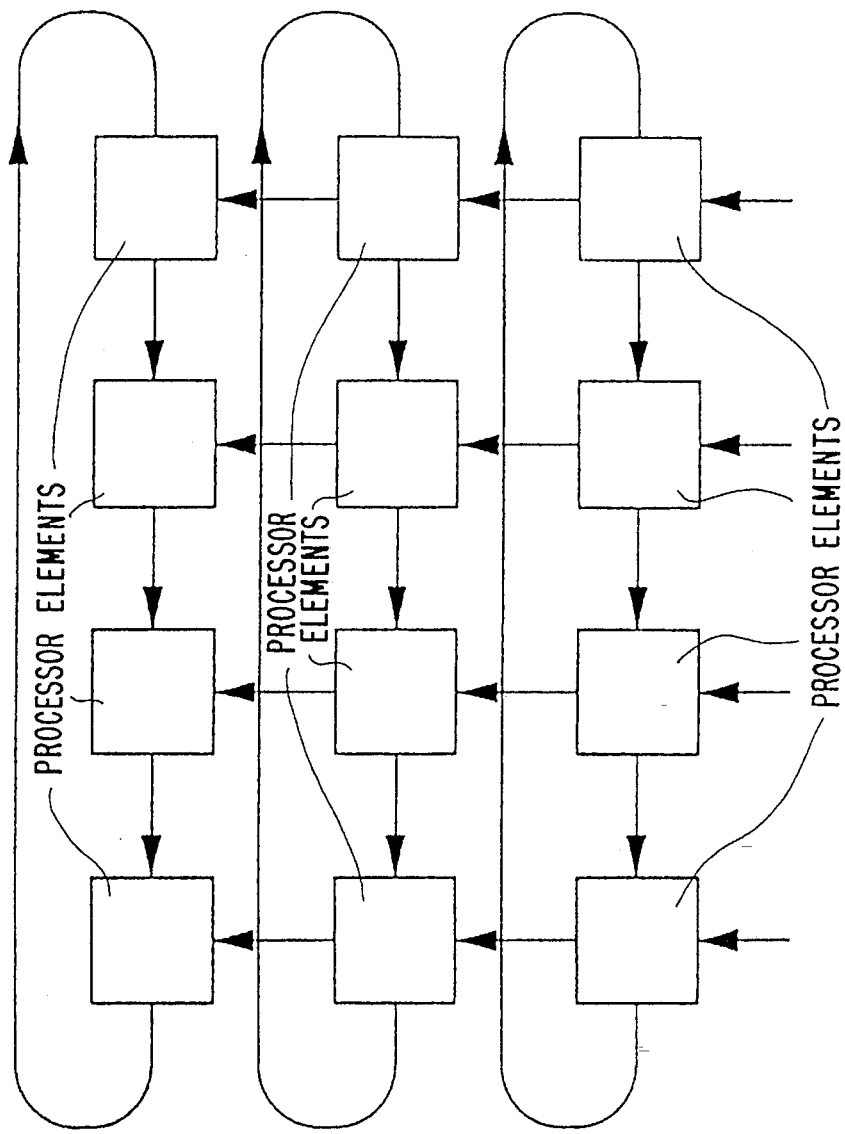
FIG. 2C illustrates the principle of calculation of the product of a matrix and a vector according to the ring systolic system.
Figure 3A:
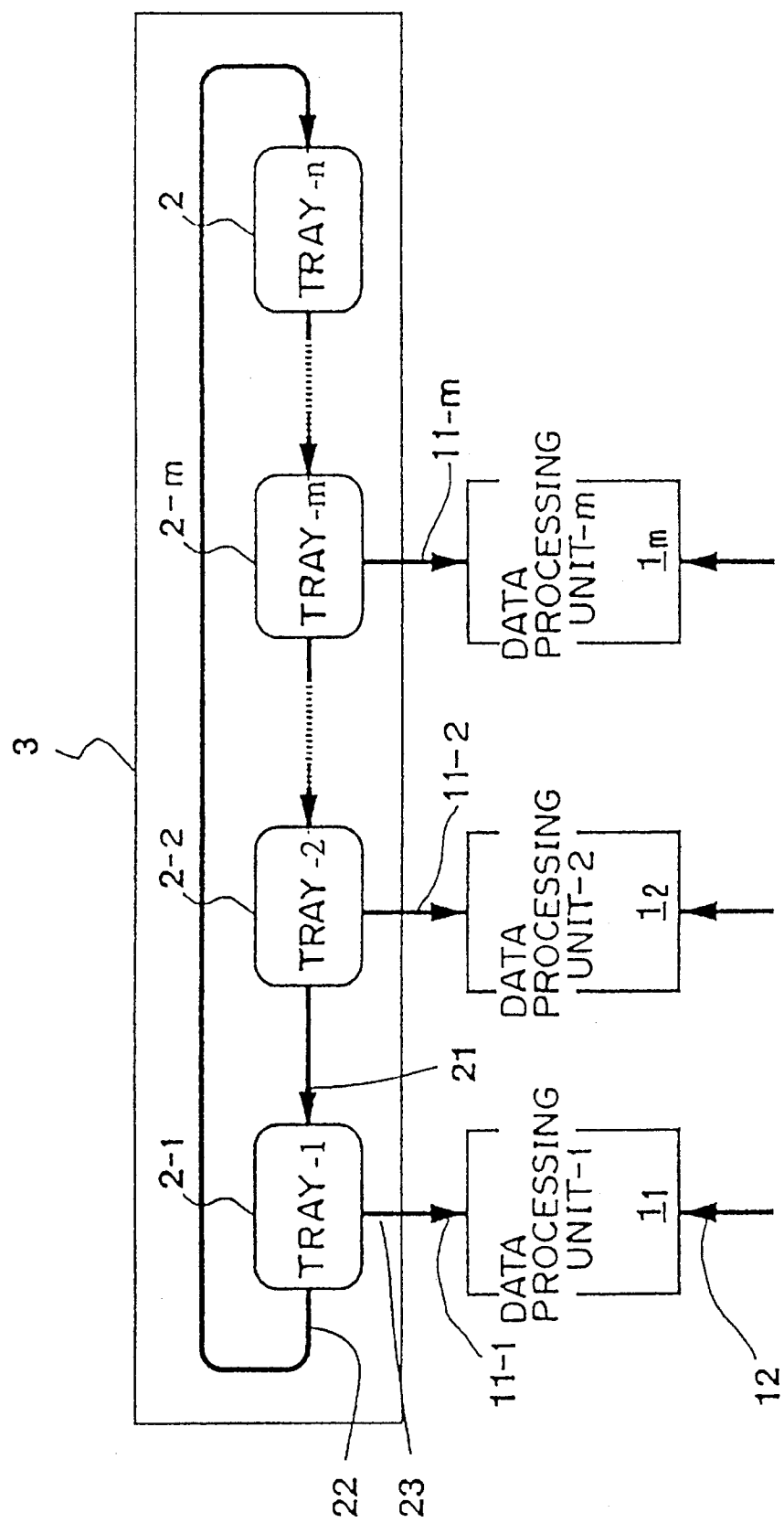
FIG. 3A illustrates the principle structure of the present invention.

FIG. 3A illustrates the principle of the present invention. In the figure, $1_1, 1_2, \ldots$ designates a data processing unit, $2_1, 2_2, \ldots$, each designates a tray for storing and transferring data, 3 designates a shift register constructed by interconnecting the trays, 11 designates a first input of the data processing unit, 12 designates a second input of the data processing unit, 21 designates a first input of the tray, 22 designates a first output of the tray, and 23 designates a second output of the tray 2.

The data processing units 1 process data. The trays 2 transfer data and form a shift register 3 for shifting data cyclically. The present invention allows the product of a m×n matrix A and a vector $x$ with n elements to be calculated by the use of m data processing units and n trays in a processing time proportional to n regardless of whether the number m of rows of the matrix A is smaller than the number n of columns or m is larger than n, thereby achieving a good number effect. That is, in the configuration comprised of m data processing units 1 each having two inputs and functions of multiplying two inputs and accumulating the results of multiplications for calculation of the inner product and n trays 2, each of the data processing units I multiplies an input from 11 and an input from 12, adds the product to the contents of its accumulating register Y and then shifts an element of the vector A between adjoining trays in the shift register 3. By repeating this operation n times, it becomes possible to carry out the multiplication of the m×n matrix $x$ and the n-dimensional vector using m data processing units in a processing time proportional to n. That is, the present invention, unlike the conventional system, can achieve a good number effect without the need for any timing process by separating the data processing units 1 and the trays 2 having data storage function even if m and n differ from each other. Furthermore, the present invention can make the data transfer time negligible as compared with data processing time because the data transfer between trays 2 and data processing by data processing units 1 are performed concurrently and, in general, the data transfer time can be expected to be shorter than the data processing time required by the data processing units. Therefore, the data transfer time can be hidden by the data process time.

Figure 3B:
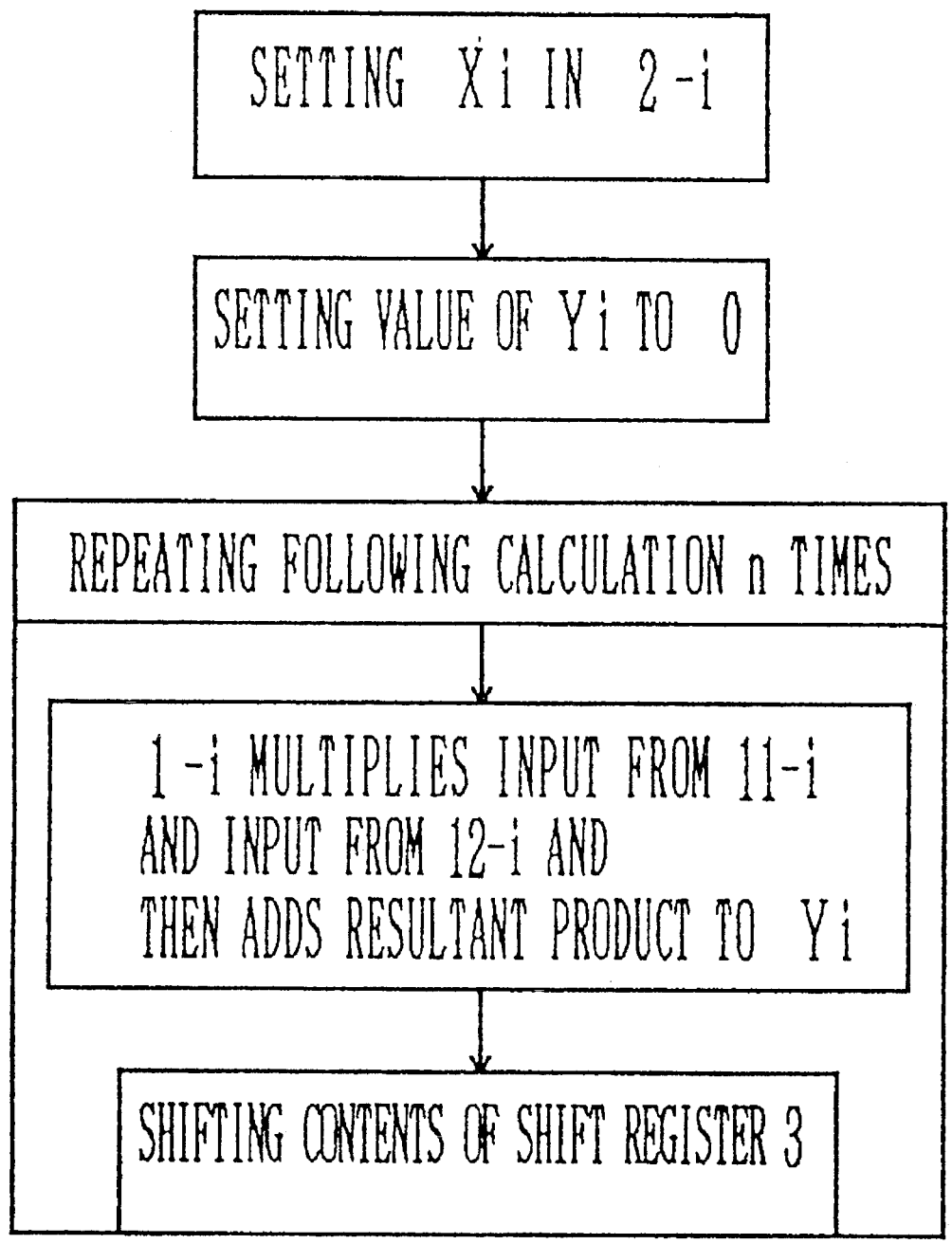
FIG. 3B is an operational flowchart of the present invention.

FIG. 3B is an operational flowchart of a basic configuration of the present invention illustrated in FIG. 3A. As illustrated in FIG. 3A, according to the present invention, data processing units 1 and trays 2 having data storage function are separated. Adjacent trays 2 are connected in a ring to form a systolic system. To obtain the product of a m×n matrix A and a vector $x$ with n elements where m corresponds to the number of the data processing units and n corresponds to the number of the trays, the operation illustrated in the flowchart of FIG. 3B is performed.

$X_i$ is set in the i-th tray 2. The value of $Y_i$ in an accumulating register of data processing unit i is set to 0. That is, the contents of the accumulating register of the i-th data processing unit are initialized. The i-th processing unit $1_i$ multiplies an input from $11_i$ and an input from $12_i$ and then adds the resultant product to the contents of the accumulator $Y_i$, thereby performing a partial minor product operation. The i-th processing unit $1_i$ then shifts the contents of the shift register 3. The calculation of the inner product and the shift operation are repeated n times. As a result of the processing, the product of the rectangular matrix A and the vector $x$ is formed. In this case, data transfer between trays and data processing in data processing units are performed concurrently.

FIG. 3C is a conceptual diagram of the operation of the system of the present invention. In FIG. 3C, data $X_1$ to $X_n$ in the trays 2 are elements of the vector $x$ and the number of the elements is n. The data processing units are m in number and incorporate their respective accumulators Y1, Y2, ..., Ym. The m×n rectangular matrix has elements from $A_{11}$ to $A_{mn}$ and hence m×n elements. $A_{11}, A_{12}, \ldots A_{1n}$ in the first row of the coefficient matrix are entered in sequence at respective timing steps in the systolic operation into the data processing unit $1_1$ from the input bus $12_1$. Also, the data processing unit $1_2$ is supplied with $A_{22}, A_{23}, \ldots A_{21}$ in sequence at respective timing steps in the systolic operation. In addition, the data processing unit $1_m$ is supplied with $A_{mm}, A_{m\ m+1}, \ldots, A_{m\ m-1}$ in sequence at respective timing steps in the systolic operation.

Figure 3D:
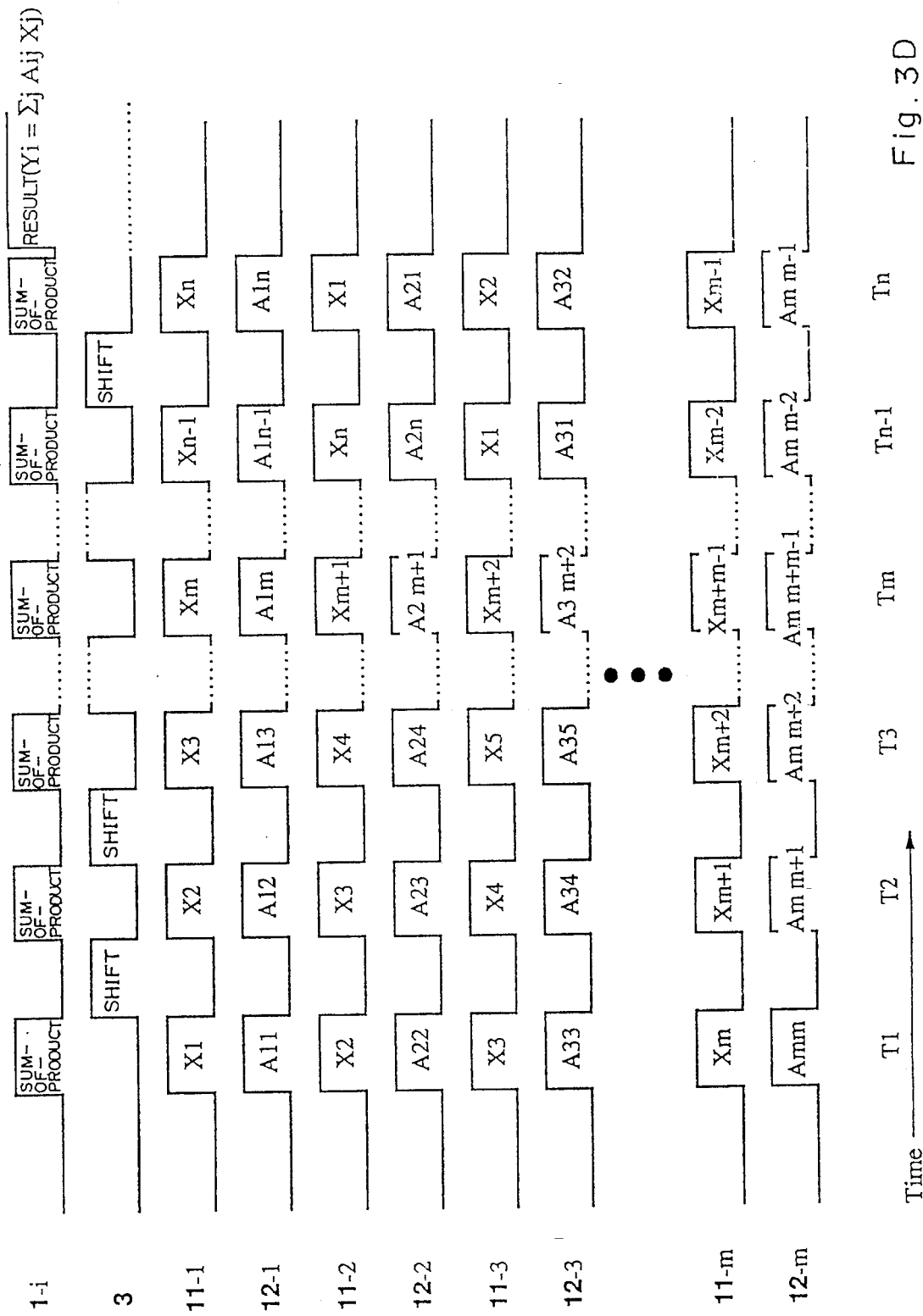
FIG. 3D is a timing chart for use in explanation of the operation of the present invention.

FIG. 3D is a timing chart of the operation illustrated in FIG. 3C. The operations at $T_1, T_2, T_3$ and $T_n$ in FIG. 3C correspond to those at $T_1, T_2, T_3$ and $T_n$ in FIG. 3D. At time $T_1$, data $X_1, X_2, \ldots X_m, \ldots X_n$ are present in the trays $2_1, 2_2, \ldots 2_n$, respectively, and $A_{11}, A_{22}, \ldots A_{mm}$, which are the elements of the coefficient matrix, are present in the data processing units $1_1, 1_2, \ldots 1_m$. Therefore, at this time $T_1$, data process unit $1_1$ obtains a product of $A_{11}$ and data $X_1$ in tray $2_1$, data processing unit $1_2$ obtains a product of $A_{22}$ and data $X_2$ and data processing unit $1_m$ obtains a product of $A_{mm}$ and data $X_m$. That is, at a sync clock for obtaining the sum of products, $X_1$ is present at the bus $11_1$, $A_{11}$ at the bus $12_1$, $X_2$ at bus $11_2$, $A_{22}$ at $12_2$, $X_3$ at $11_3$, $A_{33}$ at $12_3$, $X_m$ at $11_m$ and $A_{mm}$ at $12_m$. As illustrated in FIG. 3C, the inner product is calculated at time $T_1$. The contents of accumulators Y are 0 at this point so that the result of the inner product is added to 0. When the sum-of-products calculation is terminated, a shift operation is performed. That is, the shift operation is performed during a time interval between $T_1$ and $T_2$ as illustrated in FIG. 3D. Data is shifted between adjoining trays. That is, data are left-shifted in this case. Then, time $T_2$ arrives in FIG. 3C. In the timing chart of FIG. 3D as well, the sum-of-products is obtained during time interval $T_2$. As a result of the shift operation, $X_2$ is stored in the tray $2_1$, $X_3$ in the tray $2_2$ and $X_{m+1}$ in the tray $2_m$. Also, $A_{12}, A_{23}, \ldots A_{m\ m+1}$, which are the elements of the coefficient matrix, are entered into the trays $1, 2, \ldots, m$, respectively. Data present on the buses at time $T_2$ are illustrated in FIG. 3D. At time $T_2$, the product of $A_{12}$ and $X_2$ is obtained and then added to the contents of the accumulator Y. In the unit $1_1$, therefore, the product of $A_{11}$ and $X_1$ obtained at time $T_1$ and the product of $A_{12}$ and $X_2$ obtained at time $T_2$ are summed and the result is stored in the accumulator. Similarly, in the unit $1_2$, $A_{22} \times X_2 + A_{23} \times X_3$ is stored in the accumulator. This is the case with the unit $1_m$. The shift operation is performed again and then time $T_3$ arrives. $X_3$ is shifted to the tray $1$, $X_4$ to the tray $2$, $X_{m\ m+2}$ to the tray m and $X_2$ to the tray n so that the calculation of inner product as shown in FIG. 3C is carried out at time $T_3$.

The symbols of inputs to be entered into the data processing units are indicated on the time slot $T_3$ of FIG. 3D. When such calculations are performed till time $T_n$, $A_{1n} \times X_n$ is added to the sum of the so-far-obtained products, i.e., the sum of $A_{11} \times X_1$ obtained at $T_1$, $A_{12} \times X_2$ obtained at $T_2$, $A_{13} \times X_3$ obtained at $T_3, \ldots$, and $A_{1\ n-1} \times X_{n-1}$ obtained at $T_{n-1}$, the sum having been stored in the accumulator Y in the tray $2_1$, so that the inner product of the first row of the matrix $A$ and the vector $X$ is formed. In the tray $2_2$ as well, the calculation of the inner product of the second row of the matrix A and the vector $X$ is performed in n clock cycles. Similarly, the inner product of the m-th row vector of the matrix and the vector $X$ is calculated by the data processing unit $1_m$.

Therefore, by performing such a time series process, it becomes possible to perform the multiplication of a m×n rectangular matrix and an m dimensional vector in a process time proportional to n by the use of m data processing units. Thus, a good number effect can be achieved. It is important here that data processing units and trays having data storage function are separated and made to correspond in number to the rows and columns in a rectangular matrix, respectively, and a time-series operation is synchronously possible even if the dimensions differ between the row and column. Even if n is smaller than m, m trays 2 are used so that a processing time is prolonged in proportion to m. In this case as well, a process will be performed with the number effect.

Figure 4A:
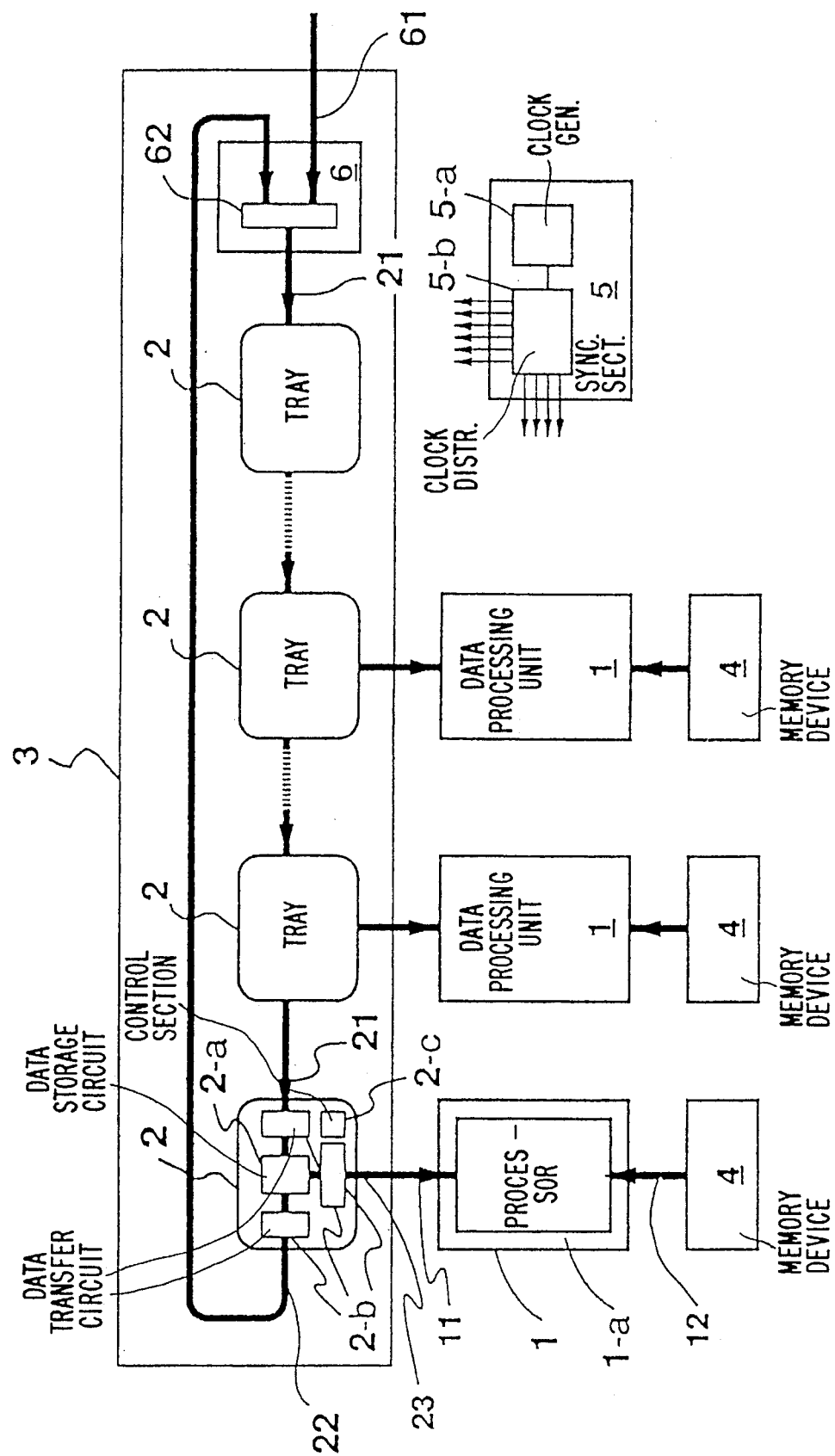
FIG. 4A illustrates a configuration of a first embodiment of the present invention.

FIG. 4A is a detailed block diagram of the configuration of FIG. 3 for calculating the product Y (m elements) of a m×n ($n \geq m \geq 1$) matrix A and a vector $X$ with n elements. In the figure, like reference characters are used to designate corresponding parts to those in FIG. 3A. $1a$ designates a processor of the data processing unit 1, which may be constructed from a digital signal processor, $2a$ designates a data storage circuit of the tray 2, which may be constructed from a latch circuit, $2b$ designates a data transfer circuit of the tray 2, which may be constructed from a bus driver, $2c$ designates the control section of the tray 2, which may be constructed from logic circuits, 4 designates a memory device partially supplying data to the data processing unit 1 and partially controlling the data processing unit 1 and may be constructed from a RAM (random access memory), 5 designates a section of the system for establishing synchronization between the data processing units 1 and the trays 2. $5a$ designates a clock generator which may be constructed from a crystal oscillator, and $5b$ designates a clock distributor which may be constructed from a buffer circuit.

The operation of the present embodiment is substantially the same as the above-described operation of the principle diagram of the present invention (illustrated in FIG. 3A).

Figure 4B:
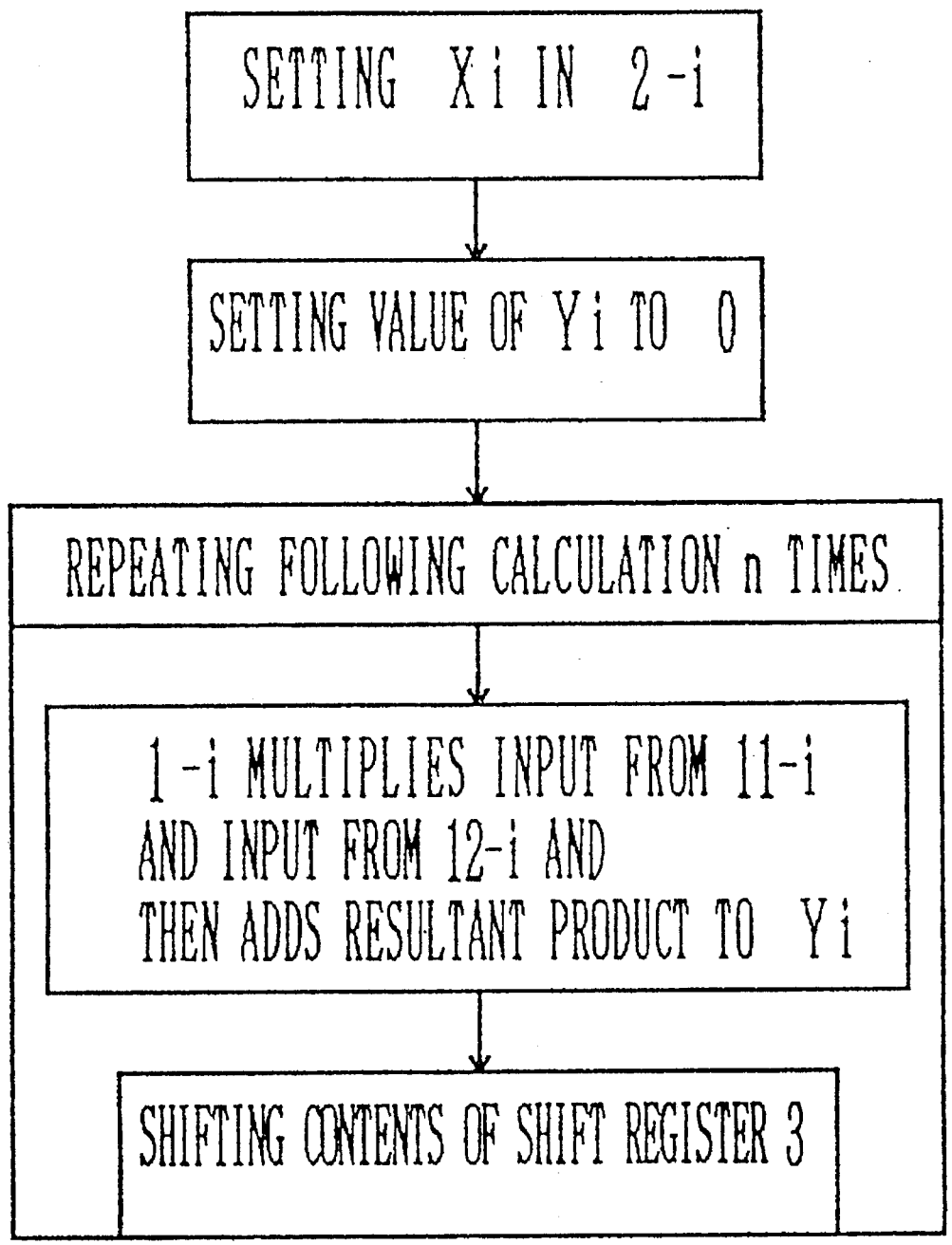
FIG. 4B is an operational flowchart of the first embodiment.

FIG. 4B is a flowchart of the system of the present invention illustrated in FIG. 4A. As illustrated in FIG. 4A, according to the present invention, the data processing units 1 and the trays 2 having a function of storing data are separated from each other, and the trays 2 are connected in a ring to form a systolic system. Where the number of the data processing units is m and the number of the trays is n, the product of a m×n matrix $A$ and a vector $X$ with n elements is calculated in accordance with the flowchart of FIG. 6B. $X_i$ is set in tray $2_i$. The contents of $Y_i$ is set to 0. Whereby, the contents of the accumulating register in the i-th data processing unit is initialized. The i-th processing unit $1_i$ multiplies an input from $11_i$ and an input from $12_i$ and then adds the resultant product to the contents of the accumulator $Y_i$. Then, the contents of the shift register 3 are shifted. The inner product calculation and the shift operation are repeated n times. As a result of this processing, the product of the rectangular matrix $A$ and the vector $X$ is formed. In this case, data transfer between trays and data processing in each data processing unit are performed concurrently.

FIG. 4C is a conceptual diagram of the operation of the system of the present invention and shows a systolic operation performed in the same manner as in FIG. 3C. In FIG. 4C, data $X_1$ to $X_n$, stored in the tray 2, are elements of the vector $X$, and are n in number. There are m data processing units which incorporate accumulators $Y_1, Y_2, \ldots Y_m$, respectively. The m×n elements of $A_{11}$ to $A_{mn}$ are present in an m×n rectangular matrix. $A_{11}, A_{12}, \ldots, A_{1n}$, which are the elements in the first row of the coefficient matrix, are synchronously entered into the data processing unit $1_1$ from an input bus $12_1$. Also, $A_{22}, A_{23}, \ldots, A_{21}$ are entered into the data processing unit $1_2$ in the sequence of timing steps of the systolic operation. In addition, $A_{mm}, A_{m\ m+1}, \ldots, A_{m\ m-1}$ are synchronously entered into the data processing unit $1_m$.

Figure 4D:
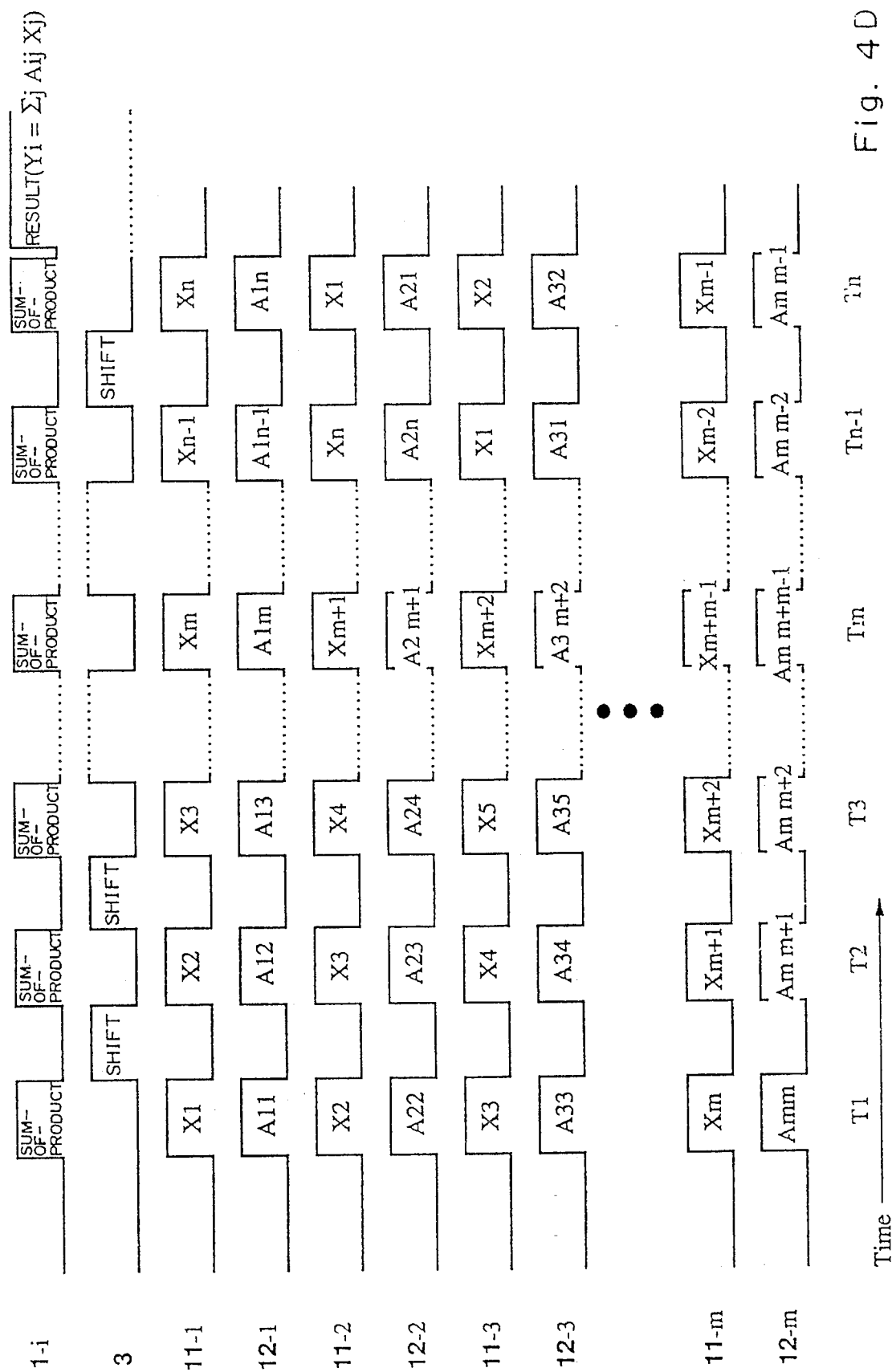
FIG. 4D is a timing chart of the first embodiment.

FIG. 4D is a timing chart of the operation illustrated in FIG. 4C. Time intervals $T_1$ to $T_n$, in FIG. 4C correspond to times $T_1, T_2, \ldots, T_n$ of FIG. 4D. At time $T_1$, $X_1, X_2, X_m, \ldots, X_n$ are present in the trays $2_1, 2_2, \ldots, 2_n$, respectively, as illustrated in FIG. 4C. Into the data processing units $1_1, 1_2, \ldots, 1_m$ are respectively entered $A_{11}, A_{22}, \ldots, A_{mm}$ which are elements of the coefficient matrix. At time $T_1$, therefore, the product of $A_{11}$ and data $X_1$ in the tray $2_1$ is obtained in the data processing unit $1_1$, the product of $X_2$ in the tray $2_2$ and $A_{22}$ supplied from a memory is obtained in the data processing unit $1_2$, and likewise the product of $A_{mm}$ and $X_m$ is obtained in the data processing unit $1_m$. This is performed at time $T_1$ shown in FIG. 4D. That is, at a sync clock for obtaining the sum of products, $X_1$ is present on the bus $11_1$, $A_{11}$ is present on the bus $12_1$, $X_2$ is present on the bus $11_2$, $A_{22}$ is present on the bus $12_2$, $X_3$ is present on the bus $11_3$, $A_{33}$ is present on the bus $12_3$, $X_m$ is present on the bus $11_m$ and $A_{mm}$ is present on the bus $12_m$. The calculation of the inner product is performed at time T1 as illustrated in FIG. 4C. The value of the accumulator Y is 0 at this point. Thus, the result is the sum of the inner product and 0. When the calculation of the sum of products is terminated, the shift operation is performed. As illustrated in FIG. 4D, the shift operation is performed between $T_1$ and $T_2$, during which time data is shifted between adjoining trays. That is, the left shift is performed in this case. Then, the operation advances to time $T_2$ in FIG. 4C and the operation timing also advances to time $T_2$ in FIG. 4D, thereby performing an operation of the time of the products. As a result of the shift operation, $X_2$ is stored in the tray $2_1$, $X_3$ is stored in the tray $2_2$, and $X_{m+1}$ is stored in the tray $2_m$. Into the trays $2_1, 2_2, \ldots, 2_m$ are entered $A_{12}, A_{23}, A_{m\ m+1}$, respectively. Data present on the buses are indicated on time slot $T_2$ of FIG. 4D. Thus, the product of $A_{12}$ and $X_2$ is formed at $T_2$ and added to the previous contents of the accumulator Y. Thus, in the unit $1_1$, the product of $A_{11}$ and $X_1$ obtained at $T_1$ and the product of $A_{12}$ and $X_2$ obtained at $T_2$ is summed and the result is stored in the accumulator. Similarly, $A_{22} \times X_2 + A_{23} \leqq X_3$ is stored in the accumulator in the unit $1_2$. This is the case with the unit $1_m$. The shift operation is performed again and then time $T_3$ arrives. As a result, $X_3$ is shifted to the tray $2_1$, $X_4$ is shifted to the tray $2_2$, $X_{m+2}$ is shifted to the tray $2_m$, and $X_2$ is shifted to the tray $2_n$. The calculation of inner product is carried out at time $T_3$ as illustrated in FIG. 4C.

The symbols of inputs to be entered into the data processing units are indicated on time slot $T_3$ in the time chart of FIG. 4D. When such calculations are performed till time $T_n$, $A_{1n} \times X_n$ is added to the sum of the products, i.e., the sum of $A_{11} \times X_1$ obtained at $T_1$, $A_{12} \times X_2$ obtained at $T_2$, $A_{13} \times X_3$ obtained at $T_3, \ldots,$ and $A_{1\ n-1} \times X_{n-1}$ obtained at $T_{n-1}$, the sum having been stored in the accumulator Y in the tray $2_1$, so that the inner product of the first row of the matrix $\mathbb{A}$ and the vector $\mathbb{X}$ is calculated. In the tray $2_2$ as well, the calculation of the inner product of the second row of the matrix $\mathbb{A}$ and the vector $\mathbb{X}$ is performed in n clock cycles. Similarly, the inner product of the m-th row of the matrix and the vector $\mathbb{X}$ is calculated by the data processing unit $1_m$.

Therefore, by performing such a time series process, it becomes possible to perform the multiplication of an m×n rectangular matrix and an n-dimensional vector in a process time proportional to n by the use of m data processing units. Thus, a good number effect can be achieved.

Figure 5A:
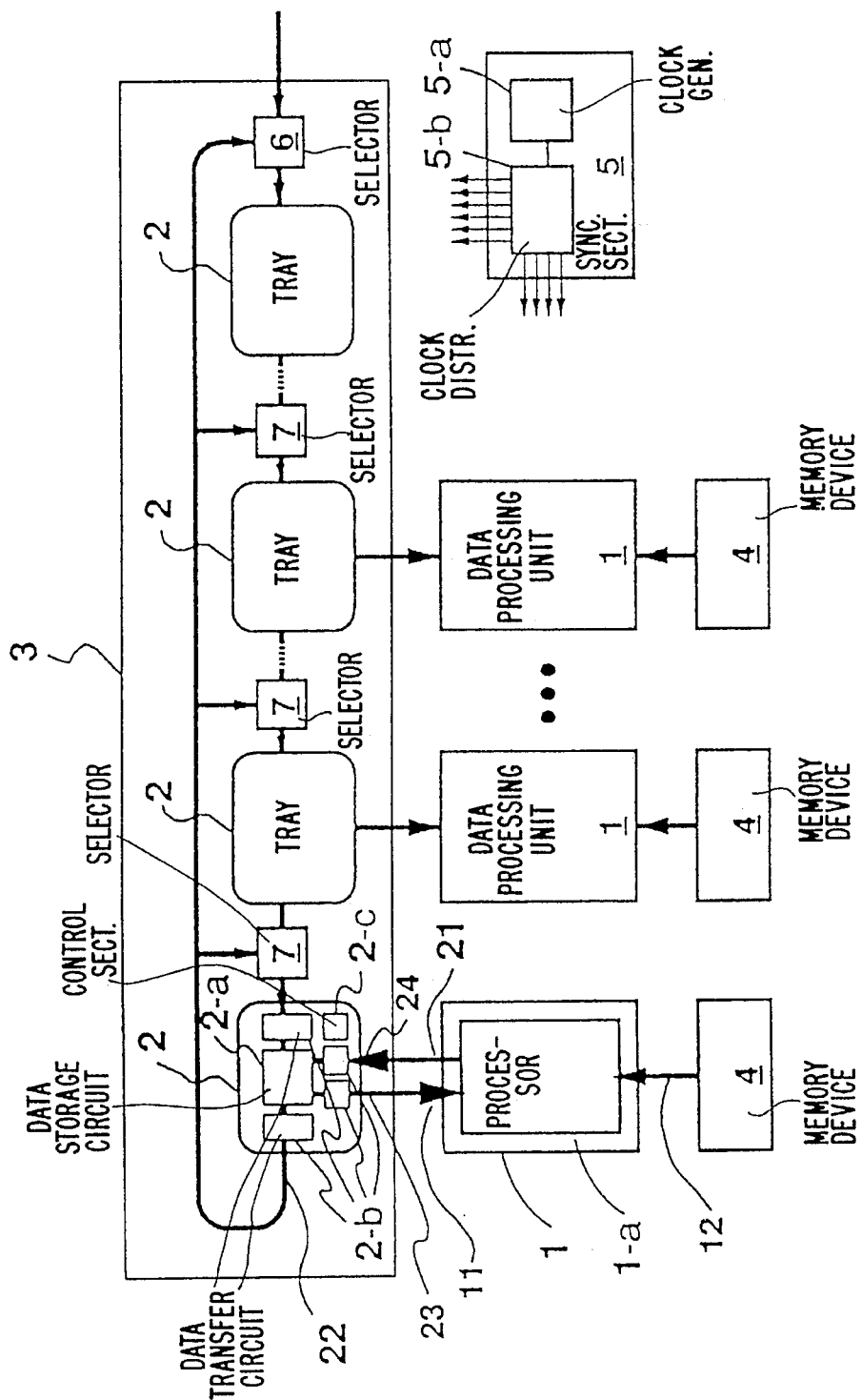
FIG. 5A illustrates a configuration of a second embodiment of the present invention.

FIG. 5A illustrates a second embodiment of the present invention. More specifically, FIG. 5 illustrates a configuration of a systolic system for multiplying the product of a m×n matrix $\mathbb{A}$ and a vector $\mathbb{X}$ with n elements by a k×m matrix $\mathbb{B}$ from left. In the figure, like reference characters are used to designate corresponding parts to those in FIG. 3A. 1a designates a processor of the data processing unit 1, which may be constructed from a digital signal processor. 2a designates a data storage circuit of the tray 2, which may be constructed from a latch circuit, 2b designates the data transfer circuit of the tray 2, which may be constructed from a bus driver, 2c designates control section of the tray 2, which may be constructed from logic circuits. 4 designates a memory device partially supplying data to the data processing unit 1 and partially controlling the data processing unit 1 and may be constructed from a RAM (random access memory). 5 designates a section of the system for establishing synchronization between the data processing units 1 and the trays 2. 5a designates a clock generator which may be constructed from a crystal oscillator, and 5b designates a clock distributor which may be constructed from a buffer circuit. 6 designates a selector for selecting among data returned systolically, data input to the tray and external data, and 7 designates selectors for bypassing systolic data halfway.

The second embodiment is exactly the same as the first embodiment in operation as far as the intermediate result $\mathbb{A}\mathbb{x}$ is obtained. Provided that, in the state in which the elements of the intermediate result $\mathbb{A}$ are stored in the respective data processing units, (a) the elements of the intermediate result are written into the corresponding trays 2, (b) the bypassing selector 7 is turned on to alter the length of the shift register to m, and (c) the matrix $\mathbb{A}$ is changed to the matrix $\mathbb{B}$ and n and m are changed to m and k, respectively, in the first embodiment of the present invention, exactly the same operation will result.

Figure 5B:
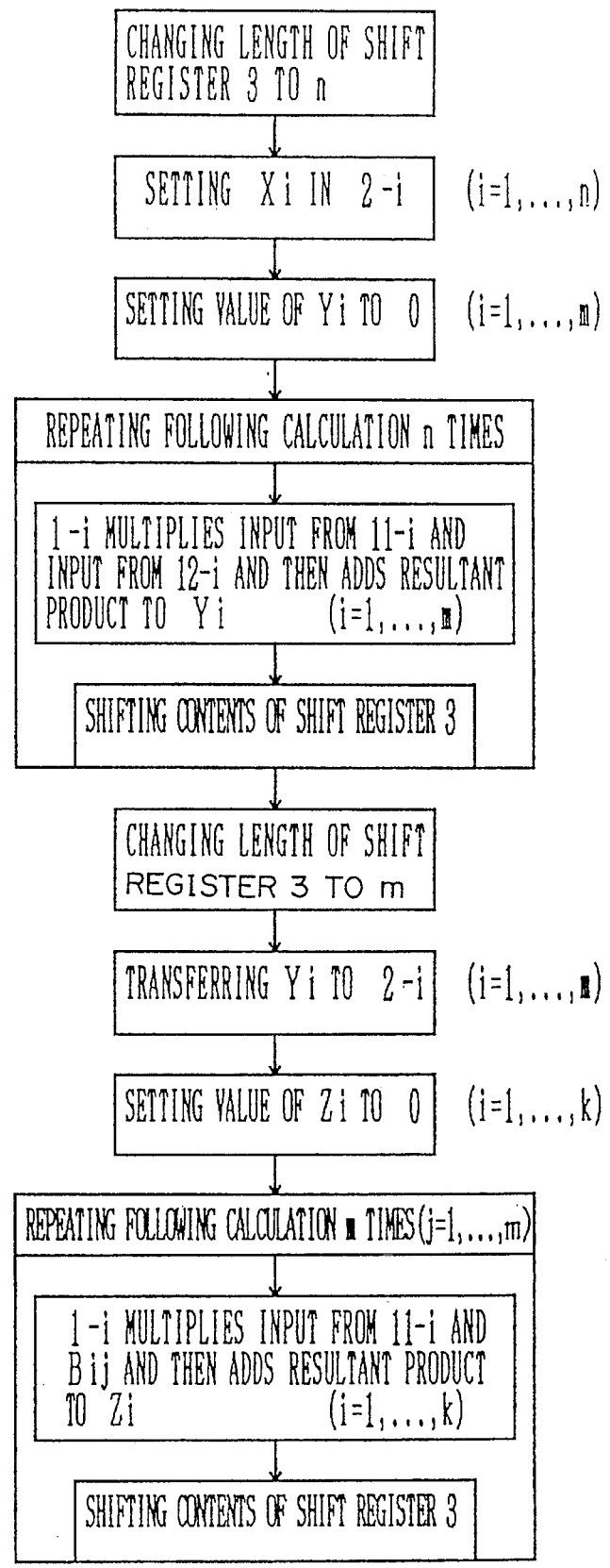
FIG. 5B is an operational flowchart of the second embodiment, FIGS. 5C($i$) and 5C($ii$) are diagrams for use in explanation of the operation of the second embodiment, FIGS. 5D($i$), 5D($ii$) and 5D($iii$) are an operational timing chart of the second embodiment.
Figure 5D:
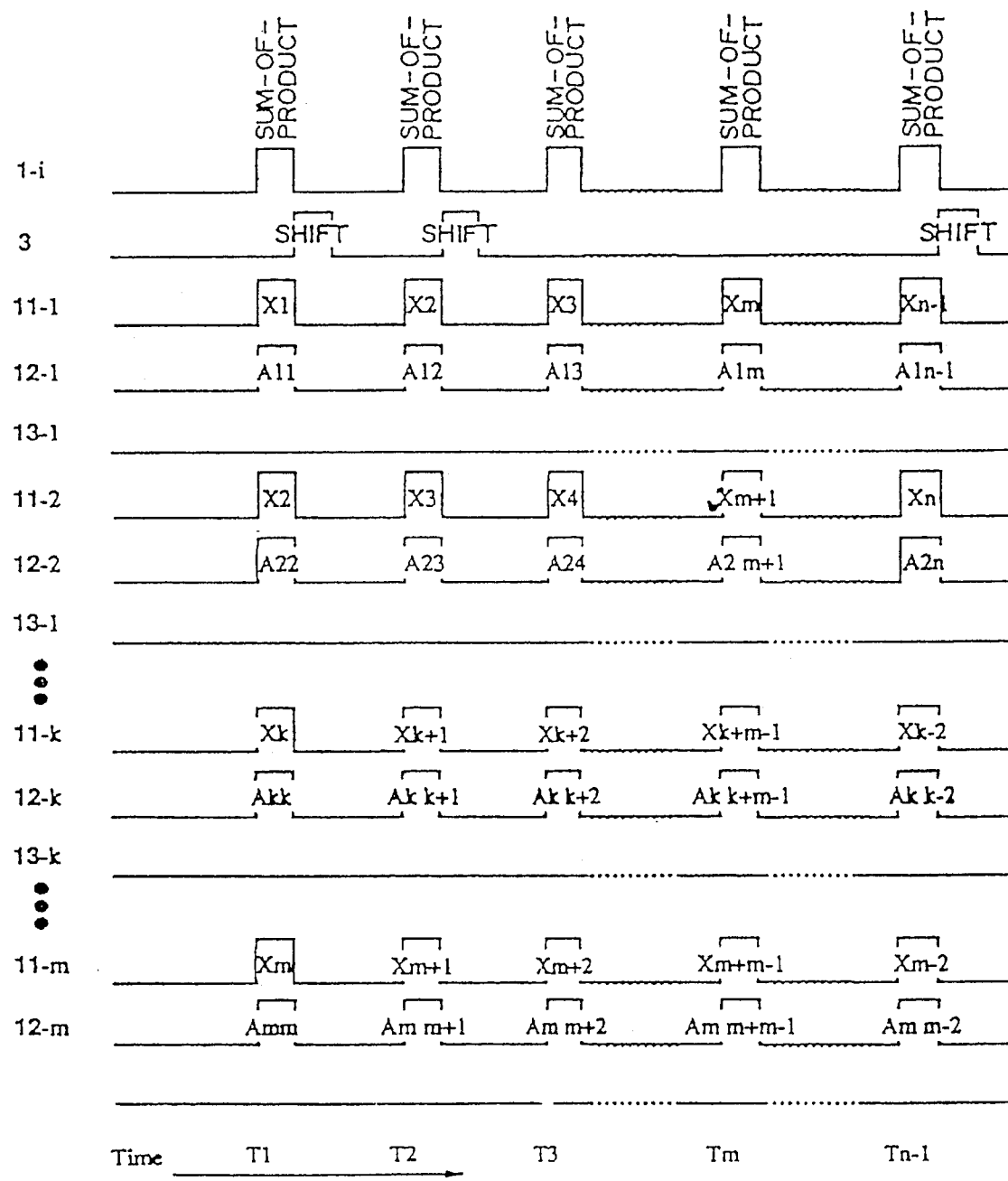

FIG. 5B is an operational flowchart of the second embodiment, FIGS. 5C(i) and 5C(ii), hereafter referred to as FIG. 5C, are a schematic diagram illustrating the operation of the second embodiment, and FIGS. 5D(i), 5D(ii) and 5D(iii), hereafter referred to as FIG. 5D, are a timing chart of the operation of the second embodiment.

Multiplying the product of an m×n matrix $\mathbb{A}$ and a vector $\mathbb{X}$ with n elements by a k×m matrix $\mathbb{B}$ from the left is performed in accordance with the flowchart of FIG. 5B. $X_i$ is set in the tray $2_i$. The value of $Y_i$ is set to 0. That is, the value of the accumulating register in the i-th data processing unit is initialized. The i-th processing unit $1_i$ multiplies an input from $11_i$ and an input from $12_i$ and then adds the resultant product to the contents of the accumulator $Y_i$. Then, the shift register 3 is shifted. The calculation of the inner product and the shift operation are repeated n times. As a result of this process, the product of the rectangular matrix $\mathbb{A}$ and the vector $\mathbb{X}$ is formed.

Next, the length of the shift register is changed to m and the contents of $Y_i$ are transferred to the tray $2_i$. $Z_i$ (i=1, \ldots, k) is then set to 0. For multiplication by the matrix $\mathbb{B}$, the i-th processing unit $1_i$ multiplies an input from $11_i$ and an input from $12_i$ and then adds the resultant product to the contents of an accumulator $Z_i$. The contents of the shift register 3 are then shifted. The calculation of the inner product and the shift operation are repeated k times.

FIG. 5C is a conceptual diagram of the above operation. In the figure, data $X_1$ to $X_n$ in the trays 2 are elements of the vector $\mathbb{X}$ whose number is n. At first, m data processing units are effective and have accumulators $Y_1, Y_2, \ldots Y_m$. The m×n rectangular matrix $\mathbb{A}$ has m×n elements of $A_{11}$ to $A_{mn}$. $A_{11}$, $A_{12}$, . . . , $A_{1n}$, which are elements in the first row of the coefficient matrix, are synchronously entered into the data processing unit $1_1$ from the input bus $12_1$. The data processing unit 12 is supplied with $A_{22}$, $A_{23}$, . . . , $A_{21}$ in the sequence of timing steps of the systolic operation. Also, the data processing unit $1_m$ is supplied with $A_{mm}$, $A_{m\;m+1}$, . . . , $A_{m\;m-1}$ synchronously.

FIG. 5D is a timing chart of the operation illustrated in FIG. 5C. In respect of operations during time intervals $T_1$ to $T_n$, FIG. 5C correspond to FIG. 5D. At time $T_1$, elements $X_1$, $X_2$, . . . , $X_k$, . . . , $X_n$ of vector $\mathbf{x}$ are present in the trays 1, 2, . . . , n, respectively, as illustrated in FIG. 5C. In the data processing units 1, 2, . . . , k, . . . , m are respectively stored $A_{11}$, $A_{22}$, . . . , $A_{kk}$ . . . , $A_{mm}$ which are elements of the coefficient matrix. At time $T_1$, therefore, the product of $A_{11}$ obtained from a memory in the data processing unit 1 and data $X_1$ in the tray 1 is obtained, the product of $X_2$ in the tray 2 and $A_{22}$ supplied from a memory is obtained in the data processing unit 2, and likewise the product of $A_{kk}$ and $X_k$ is obtained in the tray k. This is performed at time $T_1$ in FIG. 5D. That is, at a sync clock for obtaining the sum of products, element $X_1$ of vector is present on the bus $11_1$, element $A_{11}$ of coefficient matrix $A$ is present on the bus $12_1$, $X_2$ is present on the bus $11_2$, $A_{22}$ is present on the bus $12_2$, $X_k$ is present on the bus $11_k$, $A_{kk}$ is present on the bus $12_k$, $X_m$ is present on the bus $11_m$ and $A_{mm}$ is present on the bus $12_m$. The calculation of the inner product is performed at time $T_1$ as illustrated in FIG. 5C. The value of the accumulator Y is 0 at this point. Thus, the result is the sum of the inner product and 0. When the calculation of the sum of products is terminated, the shift operation is performed. As illustrated in FIG. 5D, the shift operation is performed between $T_1$ and $T_2$, during which time data is shifted between adjoining trays. That is, the left shift is performed in this case. Then, time $T_2$ arrives in FIG. 5C. Likewise, time $T_2$ arrives in FIG. 5D, thereby performing an operation of the sum of the products. As a result of the shift operation, $X_2$ is stored in tray $2_1$, $X_3$ is stored in tray $2_2$, $X_{k+1}$ is stored in tray $2_k$ and $X_{m+1}$ is stored in the tray $2_m$. Into data processing units $1_1$, $1_2$, . . . $1_k$, . . . , $1_m$ are entered elements $A_{12}$, $A_{23}$, . . . , $A_{k\;k+1}$, . . . , $A_{m\;m+1}$, of the coefficient matrix respectively. It is shown by data present on the buses 11 and 12 on time slot $T_2$ of FIG. 5D that elements of vector $\mathbf{x}$ are entered into trays and elements of coefficient matrix are entered into data processing units. Thus, the product of $A_{12}$ and $X_2$ is formed at $T_2$ and added to the previous content of the accumulator Y. Thus, in the tray $2_1$, the product of $A_{11}$ and $X_1$ obtained at $T_1$ and the product of $A_{12}$ and $X_2$ obtained at $T_2$ is summed and the result is stored in the accumulator. Similarly, $A_{22} \times X_2 + A_{23} \times X_3$ is stored in the accumulator in tray $2_2$. This is the case with trays $2_k$ and $2_m$. The shift operation is performed again and time $T_3$ arrives. As a result, $X_3$ is shifted to tray $2_1$, $X_4$ is shifted to tray $2_2$, $X_{k+2}$ is shifted to tray $2_k$, and $X_{m+2}$ is shifted to tray $2_m$, and $X_2$ is shifted to tray $2_n$. The calculation of inner products is carried out at time $T_3$ as illustrated in FIG. 5C.

When such calculations are performed till time $T_n$, $A_{1m} \times X_m$ will, as shown in time $T_m$ in FIG. 5D, be added to the sum of the so-far-obtained products, i.e., the sum of $A_{11} \times X_1$ obtained at $T_1$, $A_{12} \times X_2$ obtained at $T_2$, $A_{13} \times X_3$ obtained at $T_3$, . . . , and $A_{1\;k} \times X_k$ obtained at $T_k$, which has been stored in the accumulator Y in tray $2_1$, so that the inner product of the first row of the matrix $A$ and the vector $\mathbf{x}$ is calculated. In tray $2_2$ as well, the calculation of the inner product of the second row of the matrix $A$ and the vector $\mathbf{x}$ is performed in n clock cycles. Similarly, the inner product of the k-th row of the matrix and the vector $\mathbf{x}$ is calculated by the data processing unit $1_k$.

Assuming that the effective number of the data processing units is k and the effective number of the trays is m, an operation of obtaining the product of a k×m matrix $\mathbb{B}$ and a vector $\mathbf{y} = A\,\mathbf{x}$ with m elements is performed. An i-th element $Y_i$ of $A\,\mathbf{x}$ is set in the tray $2_i$. The value of $Z_i$ is set to 0. That is, the value of the accumulating register of the i-th data processing unit is initialized. The i-th processing unit $1_i$ multiplies an input from $11_i$ and an input from $12_i$ and then adds the resultant product to the contents of the accumulator $Z_i$. The contents of the shift register 3 are then shifted. This calculation of the inner product and shift operation are repeated m times, corresponding to dimension m of $A\,\mathbf{x}$. As a result of this process, the product of the rectangular matrix $\mathbb{B}$ and the vector $\mathbf{y}$ is formed.

In FIG. 5C, let data $Y_1$ to $Y_m$ in the tray 2, which are elements of the vector $\mathbf{y}$, be m in number. There are k effective data processing units which incorporate accumulators $Z_1$, $Z_2$, . . . , $Z_k$, respectively. There are k×m elements of $B_{11}$ to $B_{km}$ in the k×m rectangular matrix $A$ . $B_{11}$, $B_{12}$, . . . , $B_{1m}$, which are the elements in the first row of the coefficient matrix $A$, are synchronously entered into the data processing. unit $1_i$ from an input bus $12_1$. Also, $B_{22}$, $B_{23}$, . . . , $B_{21}$ are entered into the data processing unit $1_2$ in the sequence of timing steps of the systolic operation. In addition, $B_{kk}$, $B_{k\;k+1}$, . . . , $B_{k\;k-1}$ are synchronously entered into the data processing unit $1_k$.

FIG. 5D is a timing chart of the operation illustrated in FIG. 5C. In respect of operations during time intervals $T_{n+1}$ to $T_{n+m+1}$, FIG. 5C corresponds to FIG. 5D. At time $T_{n+1}$, $Y_1$, $Y_2$, . . . , $Y_m$ are present in trays $2_1$, $2_2$, . . . , $2_m$, respectively, as illustrated in FIG. 5C. In the data processing units 1, 2, . . . , k have been respectively stored $B_{11}$, $B_{22}$, . . . , $B_{kk}$ which are elements of the coefficient matrix $\mathbb{B}$. At time $T_{n+2}$, the product of $B_{11}$ and data $Y_1$ in tray $2_1$ is obtained in the data processing unit $1_1$, the product of $Y_2$ in tray $2_2$ and $B_{22}$ supplied from a memory is obtained in the data processing unit 2, and likewise the product of $B_{kk}$ and $Y_k$ is obtained in unit $1_k$. This is performed at time $T_{n+2}$ in FIG. 5D. That is, at a sync clock for obtaining the sum of products, $Y_1$ is present on the bus $11_1$, $B_{11}$ is present on the bus $12_1$, $Y_2$ is present on the bus $11_2$, $B_{22}$ is present on the bus $12_2$, $Y_3$ is present on the bus $11_3$, $B_{33}$ is present on the bus $12_3$, $Y_k$ is present on the bus $11_k$ and $B_{kk}$ is present on the bus $12_k$. Thus, the calculation of the inner products is performed at time $T_{n+2}$ as illustrated in FIG. 5C. The value of the accumulator Z is 0 at this point. Thus, the result is the sum of the inner product and 0. When the calculation of the sum of products is terminated, the shift operation is performed. As illustrated in FIG. 5D, the shift operation is performed between $T_{n+2}$ and $T_{n+3}$, during which time data is shifted between adjoining trays. That is, the left shift is performed in this case. Then, time $T_{n+3}$ arrives in FIG. 5C. Time $T_{n+3}$ arrives in FIG. 5D, thereby performing an operation of the sum of the products. As a result of the shift operation, $Y_2$ is stored in tray $2_1$, $Y_3$ is stored in tray $2_2$, and $Y_{k+1}$ is stored in tray $2_k$. Into trays $2_1$, $2_2$, . . . , $2_k$ are entered elements $B_{12}$, $B_{23}$, $B_{k\;k+1}$ of coefficient matrix $\mathbb{B}$, respectively. Data present on the buses are indicated on time slot $T_{n+3}$ of FIG. 5D. Thus, the product of $B_{12}$ and $Y_2$ is formed at $T_{n+3}$ and then added to the previous contents of the accumulator Z. Thus, in the unit 1, the sum of the product of $B_{11}$ and $Y_1$ obtained at $T_{n+2}$ and the product of $B_{12}$ and $Y_2$ obtained at $T_{n+3}$ is obtained and the result is stored in the accumulator Z. Similarly, $B_{22} \times Y_2 + B_{23} \times Y_3$ is stored in the accumulator Z in the unit 2. This is the case with tray $\mathbf{2}_k$. The shift operation is performed again and then time $T_{n+4}$ arrives.

When such calculations are performed till time $T_{n+m+1}$, $B_{1m} \times Y_m$ is added to the sum of the so-far-stored products, i.e., the sum of $B_{11} \times Y_1$ obtained at $T_{n+2}$, $B_{12} \times Y_2$ obtained at $T_{n+3}$, $B_{13} \times Y_3$ obtained at $T_{n+4}$, and so on, the sum having been stored in the accumulator Z in the unit 1, so that $B^m \times Ym$ is added to the sum of the inner products stored in the accumulator Z at time $T_{n+m+1}$ and the inner product of the first row of the matrix $\mathbb{B}$ and the vector $\mathbf{Y}$ is calculated. In the unit 2 as well, the calculation of the inner product of the second row of the matrix B and the vector $\mathbf{y}$ is performed. Similarly, the inner product of the k-th row of the matrix B and the vector $\mathbf{y}$ is calculated by the data processing unit $\mathbf{1}_k$.

Therefore, by performing such a time series process, it becomes possible to perform the multiplication of a k×m rectangular matrix $\mathbb{B}$ and a vector in a process time proportional to m. Thus, a good number effect can be achieved.

It is important in the second embodiment that the length of the shift register 3 can be changed, and the intermediate result can be written into the trays 2 and processed as new data. If the length of the shift register 3 could not be changed, n unit times would be needed to circulate all the data. The capability of processing of intermediate results as new data will permit the execution of a wider range of processes with small-scale hardware than in the ring systolic array system. Furthermore, it is important that a time required to write data into the shift register is short and constant.

Figure 6A:
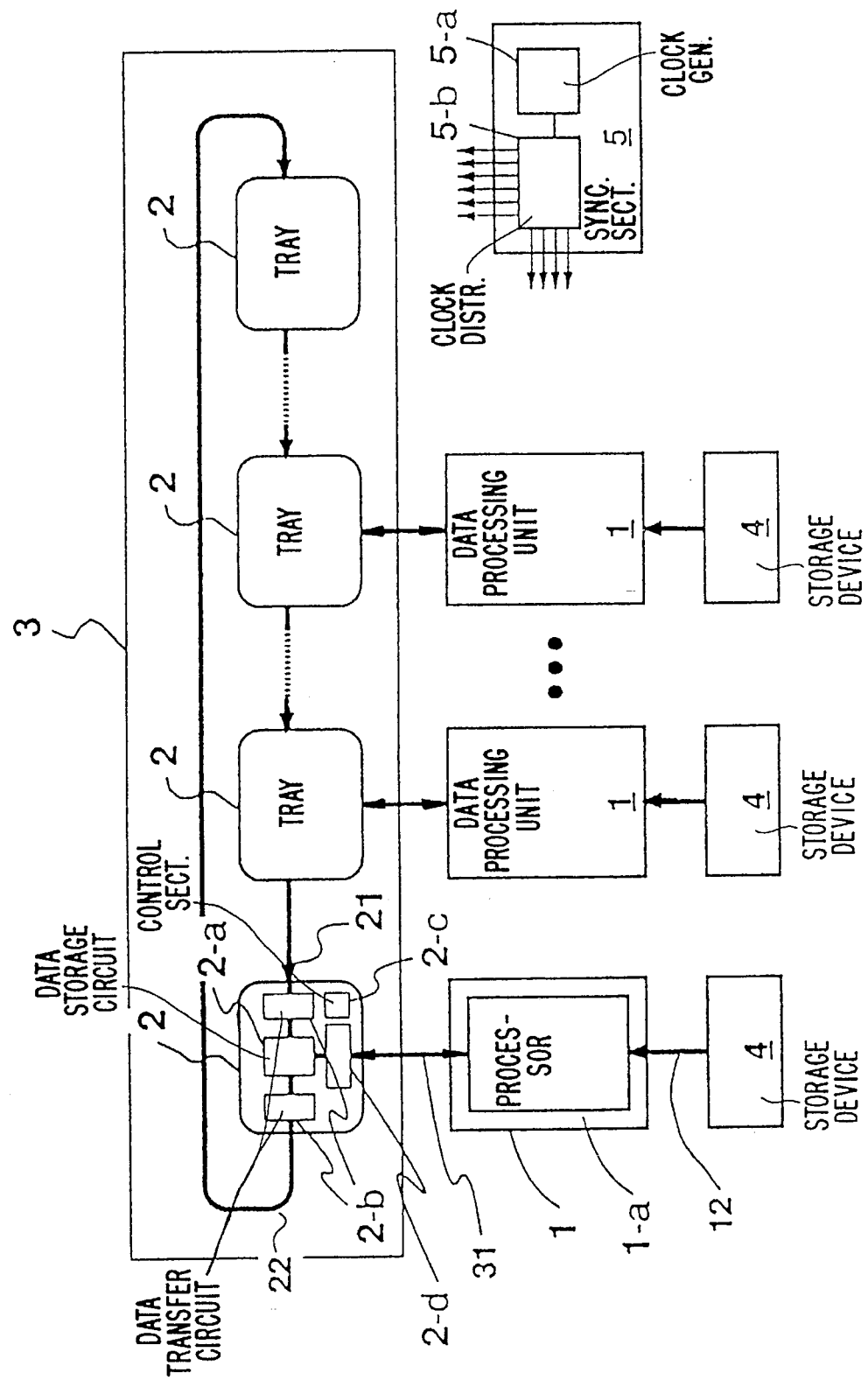
FIG. 6A illustrates a configuration of a third embodiment of the present invention.

FIG. 6A illustrates a third embodiment of the present invention. This system is configured to calculate the product of the transposed matrix $\mathbf{A}^T$ of an m×n rectangular matrix A, i.e., a (n×m) matrix, and a vector $\mathbf{x}$ with m elements. In this figure, like reference characters are used to designate corresponding parts to those in FIG. 3.

In calculating the product of the transposed matrix $\mathbf{A}^T$ and the vector $\mathbf{x}$, row vectors constituting the matrix A are each stored in respective memories 4 coupled to data processing units 1 and data are circulated through the shift register 3 while a partial sum of products obtained in the middle of calculating are accumulated in data storage circuits 2a in the trays.

FIG. 6A is a detailed block diagram of the third embodiment in which the product $\mathbf{y}$ (n elements) of an n×m (n≧m≧1) matrix $\mathbf{A}^T$ and a vector $\mathbf{x}$ with m elements is calculated. In the figure, like reference characters are used to designate corresponding parts to those in FIG. 3. 1a designates a processor of the data processing unit 1, which may be constructed from a digital signal processor. 2a designates a data storage circuit of the tray 2, which may be constructed from a latch circuit, 2b designates a data transfer circuit of the tray 2, which may be constructed from a bus driver, 2c designates the control section of the tray 2, which may be constructed from logic circuits. 4 designates a storage device partially supplying data to the data processing unit 1 and partially controlling the data processing unit 1 and may be constructed from a RAM (random access memory). 5 designates a section of the system for establishing synchronization between the data processing units 1 and the trays 2. 5a designates a clock generator which may be constructed from a crystal oscillator, and 5b designates a clock distributor which may be constructed from a buffer circuit.

Figure 6B:
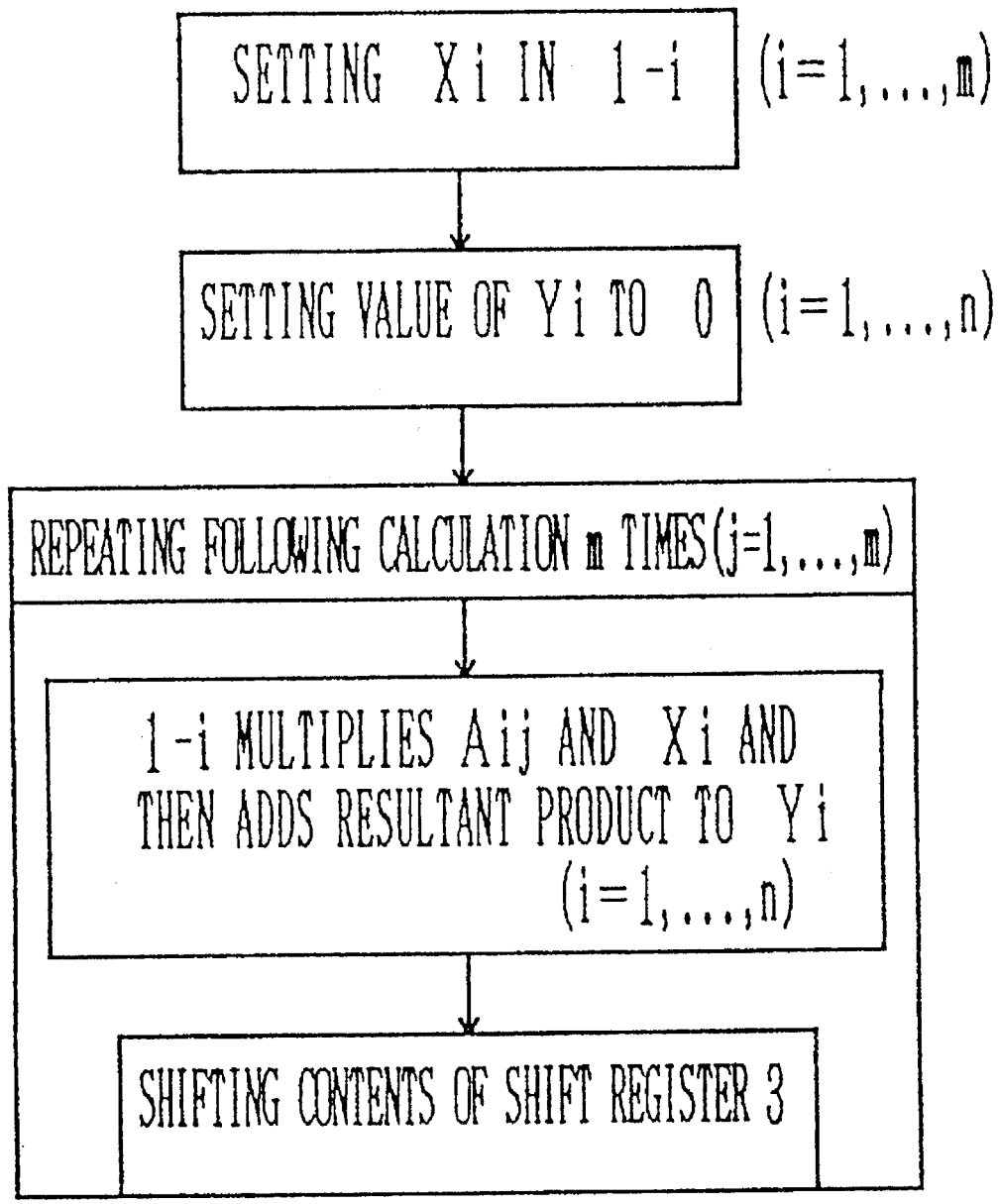
FIG. 6B is an operational flowchart of the third embodiment, FIGS. 6C($i$) and 6C($ii$) are diagrams for use in explanation of the operation of the third embodiment, FIGS. 6D($i$) and 6D($ii$) are an operational timing chart of the third embodiment.

FIG. 6B is an operational flowchart of the third embodiment. $X_i$ is set in the unit $\mathbf{1}_i$ (i=1,. . . , m). The value of accumulator $Y_i$ (i=1, . . . , n) is set to 0. The unit $\mathbf{1}_i$ multiplies $A_{ji}$ and $X_i$ and then adds the resultant product to $Y_i$ (i=1, . . . n). The contents of the shift register, namely, the sum of products is then shifted. This operation is repeated for j=1, . . . , m. The multiplication of a transposed matrix and a vector is made possible with each of the row vectors of the matrix A stored in a memory 4 without changing an arrangement of data, i.e., without transposing the matrix A. This is very important in execution of a back propagation which is one of learning algorithms of a neural network to be described later. The amount of calculation in the network is of the order of m. The data transfer time is negligible as compared with the processing time so that there is no overhead for the transfer time. Further, this operation is applied to a SIMD method.

Figure 6C:
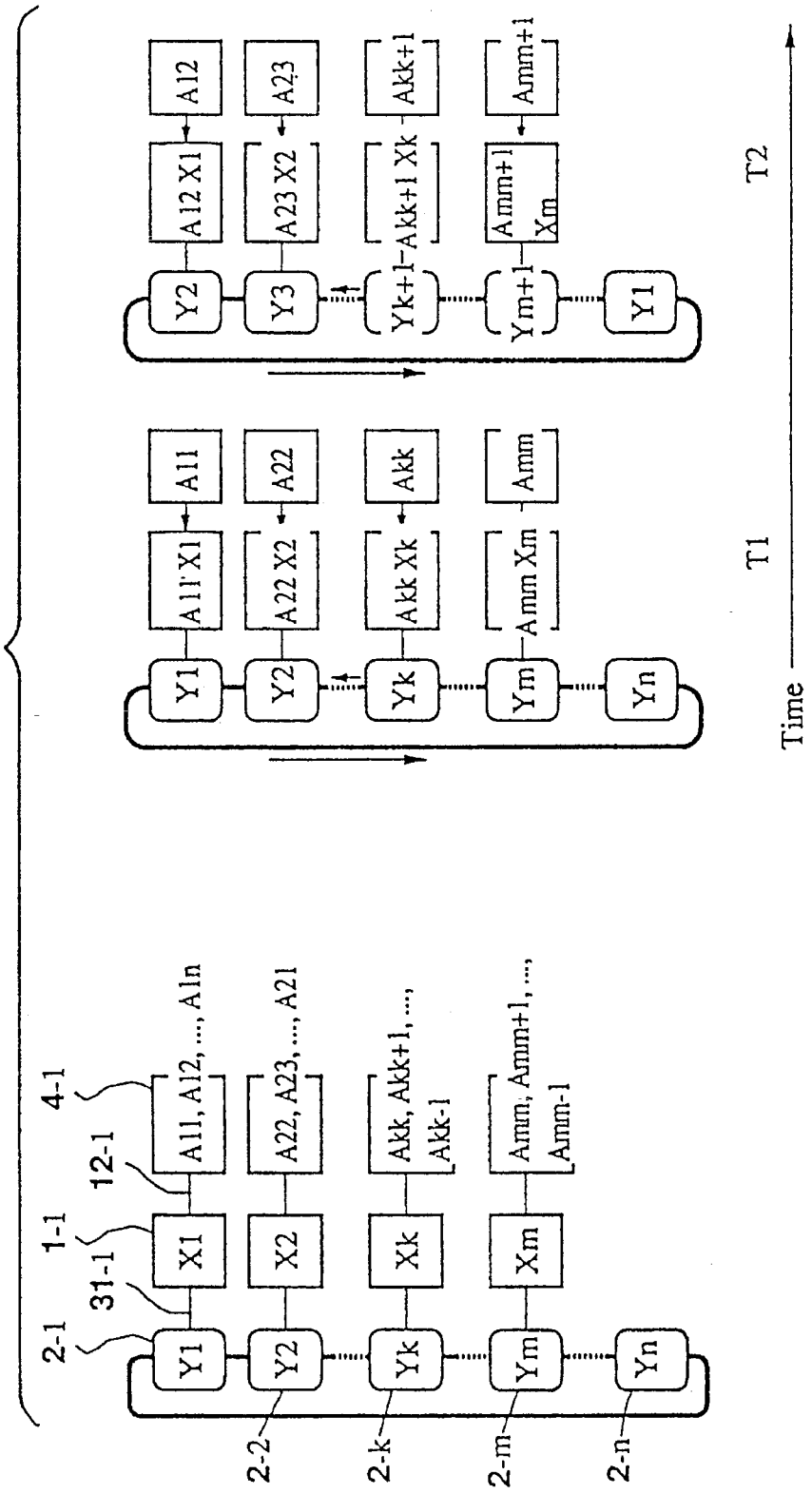
FIG. 6E is a detailed operational flowchart of the third embodiment.

FIGS. 6C(i) and 6C(ii), hereafter referred to as FIG. 6C, are a schematic diagram illustrating the operation of the third embodiment. $A_{11}$ to $A_{1m}$ are entered into the unit 11 in sequence. $A_{22}, A_{23}, A_{21}$ are entered into the unit $\mathbf{1}_2$, and $A_{kk}$, $A_{k\ k+1}, \ldots, A_{k\ k-1}$ are entered into the k-th unit through a memory circuit starting with a diagonal element $A_{22}$. $A_{mm}$, $A_{m\ m+1}, \ldots, A_{m\ m-1}$ are entered into the m-th unit. $Y_1$ to $Y_n$ circulate through the trays.

Figure 6D:
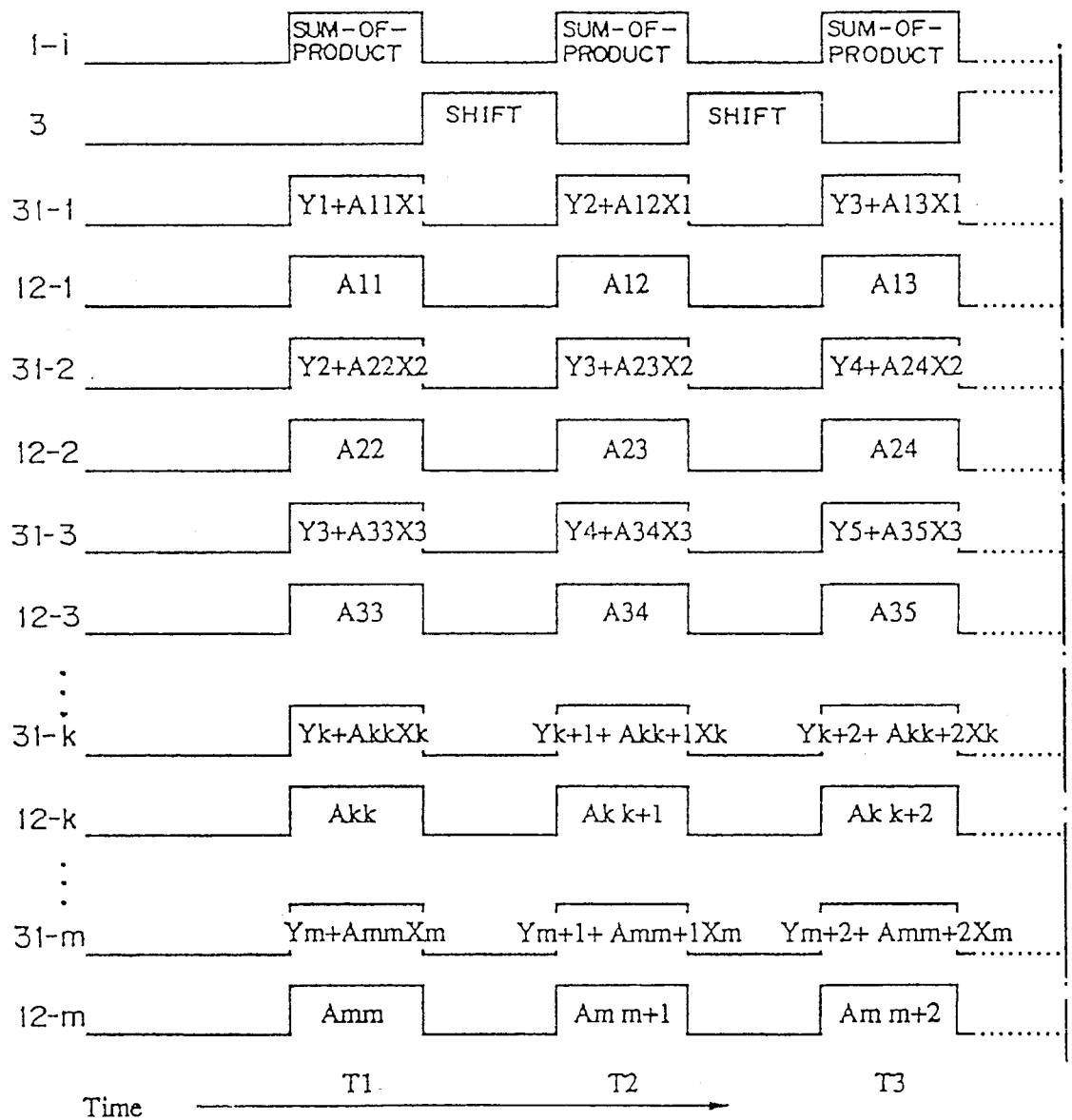

FIGS. 6D(i) and 6D(ii), hereafter referred to as FIG. 6D, are a timing chart of the operation of the third embodiment. Data present on the buses provided between the memory and data processing unit and between the data processing unit and tray are indicated on time slots $T_1$ to $T_n$ and they correspond to those in FIG. 6C. $Y_1$ to $Y_n$ are all 0 in time slot $T_1$. The product of $A_{11}$ and $X_1$ is formed by the unit $\mathbf{1}_1$ and then added to $Y_i$. At the same time, $A_{22}$ and $X_2$ are added to $Y_2$, $A_{kk} \times X_k$ is added to $Y_k$ and $A_{mm} \times X_m$ is added to $Y_m$. A shift operation is performed and then time $T_2$ arrives. That is, Y data circulate. In the first unit, $A_{12} \times X_1$ is calculated and then added to the content of $Y_2$ which is $A_{22} \times X_2$ obtained at $T_1$. Thus, $Y_2 = A_{22} \times X_2 + A_{12} \times X_1$. Similarly, in the unit 2, $A_{23} \times X_2$ is added to the previous content of $Y_3$, thereby providing $A_{33} \times X_3 + A_{23} \times X_2$. In the k-th unit $A_{k\ k+1} \times X_k$ is added to $Y_{k+1}$. Also, in the m-th unit, $A_{m\ m+1} \times X_m$ is added to $Y_{m+1}$. Thus, as a result of circulation of Y data, in the n-th time slot $T_n$, $A_{1n} \times X_1$ is added to $Y_n$ which has been obtained by then in the first unit $\mathbf{1}_1$. Also, $A_{21} \times X_2$ is added to $Y_1$ in unit 12. When this is viewed as a whole, the first element $X_1$ of the vector $\mathbf{x}$ is multiplied by $A_{11}$ at $T_1$ so that $A_{11} \times X_1$ is calculated. This is stored in $Y_1$. Actually, the second element $A_{21} \times X_2$ in the first row of the transposed matrix $\mathbf{A}^T$ is calculated in the last clock cycle $T_n$. This is stored in the same $Y_1$. The product of the last element $A_{m1}$ in the first row of the transposed matrix A and $X_m$ is calculated by the m-th unit in the clock cycle $T_{n-m+2}$ of FIG. 6C. That is, the product of $A_{m1}$ and $X_m$ is obtained by being added to $Y_1$. This is the case with the second row of the transposed matrix A. The product of $A_{12}$ and $X_1$ is calculated by the unit 1 in the clock cycle $T_2$. $A_{22} \times X_2$ is obtained by the second unit in the clock cycle $T_1$. It is in the time slot $T_{n-m+3}$ that $Y_2$ is recirculated to obtain a product. After the time slot $T_{n-m+3}$ the multiplication and shift operation are performed. In the time slot $T_n$, $A_{32} \times X_3$ is added to $Y_2$ in the third unit. Thus, the inner product of the second row of the transposed matrix $A^T$ and the vector $\mathbf{x}$ is calculated in time slot $T_n$. Since, in general, the data line from the k-th tray to the k-th unit is $31_k$, portions indicated at $31_k$ have only to be followed as shown in FIG. 6D. That is, $Y_k + A_{kk} \times X_k$ is calculated in time slot $T_1$, $Y_{k+1} + A_{k\ k+1} \times X_k$ is calculated in time slot $T_2$ and $Y_{k+2} + A_{k\ k+2} X_k$ is calculated in time slot $T_3$. $Y_{k-2} + A_{k\ k-2} \times X_k$ is calculated in time slot $T_3$. $Y_{k-1} + A_{k\ k-1} \times X_k$ is calculated in time slot $T_{n-1}$. Whereby, the product of the transposed matrix $A^T$ and m-dimensional vector $\mathbf{x}$ is calculated. That is, to calculate the transposed matrix $A^T$ and the vector $\mathbf{x}$, partial row vectors constituting the matrix $A$ are each stored in respective memories 4 connected to the data processing units 1 and the partial sums yielding in the middle of calculation are circulated through the shift register while they are accumulated in the data storage circuits of the trays 2. Where the product of a transposed matrix $A^T$ and a vector $\mathbf{x}$ is calculated after the product of a matrix $A$ and a vector $\mathbf{u}$ has be obtained by the use of such a method, the partial row vectors of the matrix $A$ stored in the memories 4 connected to the data processing units 1 and used in calculating the product of the matrix $A$ and the vector u may be used as they are without transferring the partial matrices of the transposed matrix $A^T$ to the data processing units 1. It is not necessary to transpose matrix $A$ in a memory when the transposed matrix $A$ is calculated in the present embodiment. Thus, the transfer time can be saved and the process time can be further shortened.

Figure 6E:
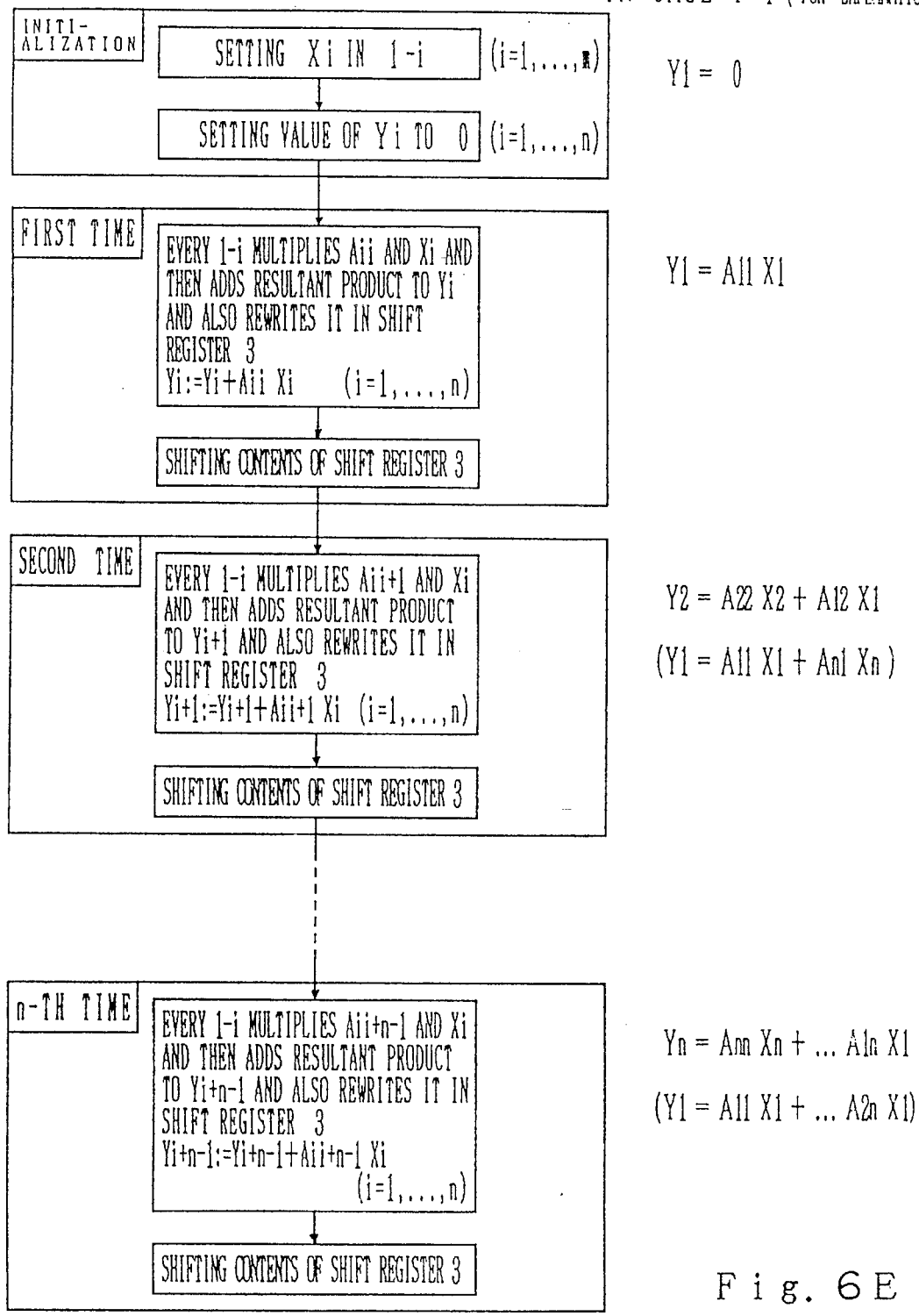

FIG. 6E is a detailed flowchart of the step to be repeated of FIG. 6B.

As an initialization process, $X_i$ is set in unit $1_i$ and the value of $Y_i$ is made 0. As a first timing, each unit $1_i$ adds the product of $A_{ii}$ and $X_i$ to $Y_i$ and write the result of the sum of the products in tray 3 again. Namely, $$Y_i = Y_i + A_{ii} X_i \ (i=1, \ldots, n)$$

Then, tray 3 is shifted.

At a second timing, each unit $1_i$ adds the product of $A_{i\ i+1}$ and $X_i$ to $Y_{i+1}$ and the result of the sum of the products is written in tray 3. Namely, $$Y_{i+1} = Y_{i+1} + A_{i\ i+1} X_i \ (i=1, \ldots, n)$$

Then tray 3 is shifted.

At n-th timing, each unit $1_i$ adds the product of $A_{i\ i+n-1}$ and $X_i$ to $Y_{i+n-1}$ and writes the result of the sum of the products in tray 3 again. Namely, $$Y_{i+n-1} = Y_{i+n-1} + A_{i\ i+n-1} X_i \ (i=1, \ldots, n)$$

Then, the tray 3 is shifted.

Figure 7A:
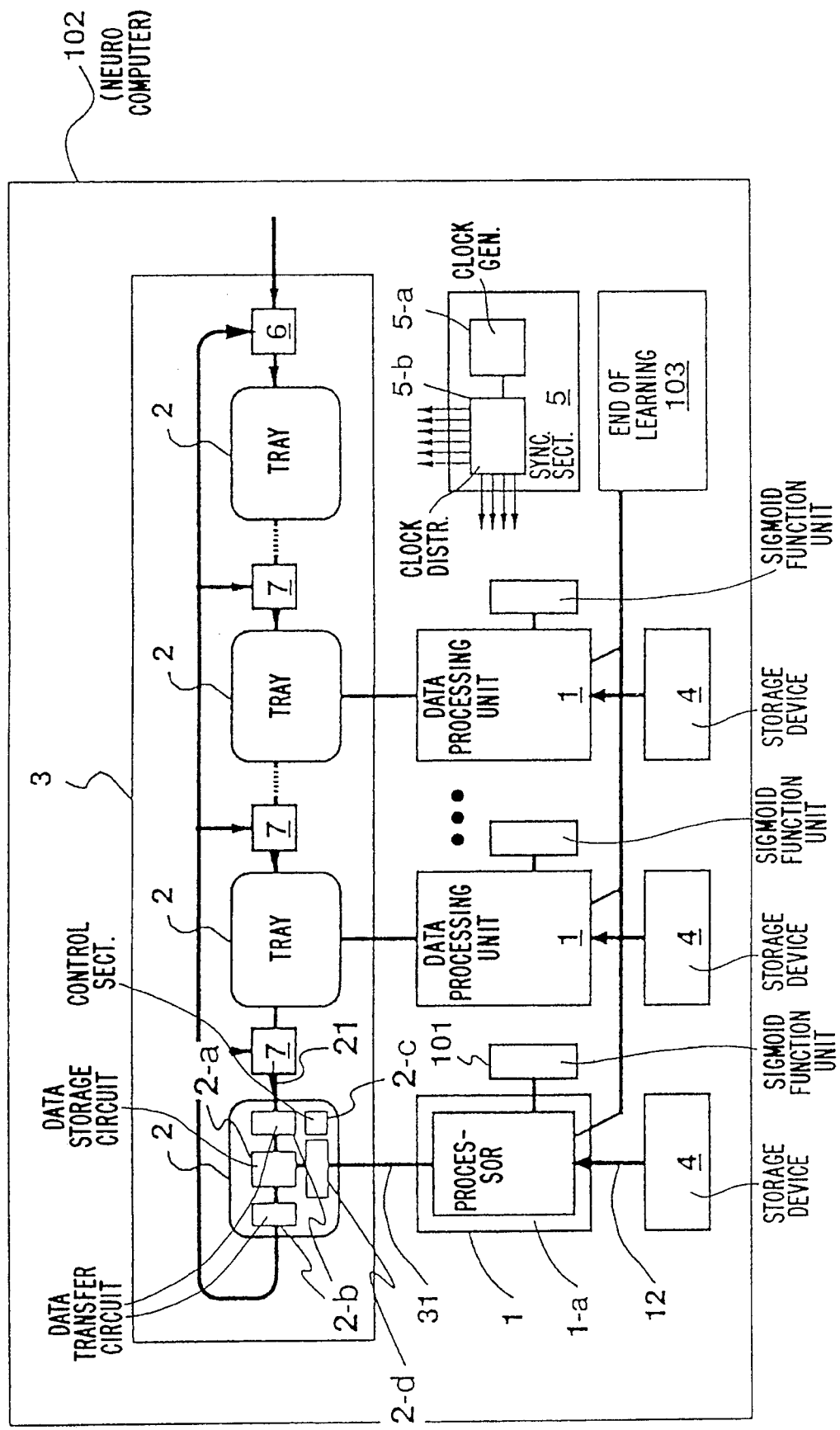
FIG. 7A illustrates a configuration of a fourth embodiment.

FIG. 7A illustrates a fourth embodiment of the fourth invention. The present embodiment is directed to a neuro-computer. In FIG. 7A, like reference characters are used to designate corresponding parts to those in FIG. 6. 1a designates a processor of the data processing unit 1, which may be constructed from a digital signal processor. 2a designates a data storage circuit of the tray 2, which may be constructed from a latch circuit, 2b designates a data transfer circuit of the tray 2, which may be constructed from a bus driver, 2c designates the control section of the tray 2, which may be constructed from logic circuits. 4 designates a storage device partially supplying data to the data processing unit 1 and partially controlling the data processing unit 1 and may be constructed from a RAM (random access memory). 5 designates a section of the system for establishing synchronization between the data processing units 1 and the trays 2. 5a designates a clock generator which may be constructed from a crystal oscillator, and 5b designates a clock distributor which may be constructed from a buffer circuit. In addition, 101 designates a sigmoid function unit which calculates a monotone nondecreasing continuous function which is referred to as a sigmoid function and its differential coefficient, the function being approximated by a polynominal. 103 designates a section of the system for deciding the end of learning, which may be constructed from a host computer communicating with the data processing units, means for informing an output error calculated by each processing unit 1 of the host computer and deciding the end of learning on the basis of a plurality of values of output errors to bring the neuro-computer to a stop. 102 designates the whole of the neuro-computer.

Figure 7B:
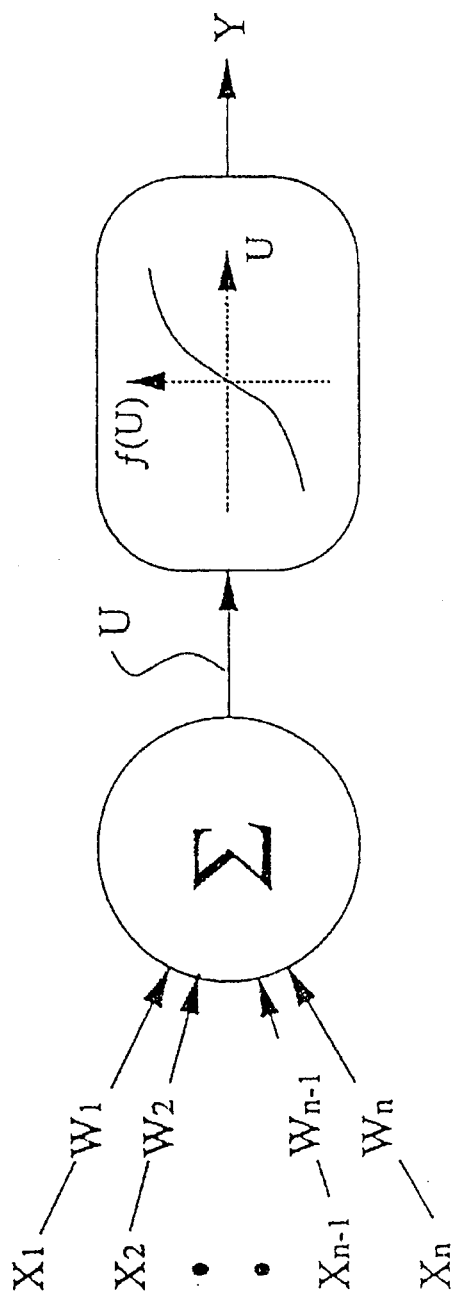
FIG. 7B illustrates a neuron model of the fourth embodiment.

FIG. 7B illustrates a neuron model which is a basic element of the neuro-computer of the present invention. The neuron model multiplies inputs $X_1, X_2, \ldots, X_n$ by weights $W_1, W_2, \ldots, W_n$ serving as synapses, respectively, and obtains the sum of the products which is used as an internal value U. A nonlinear function f is applied to the internal value U to provide an output Y. Such an S-shaped sigmoid function as illustrated is generally used herein for the nonlinear function f.

Figure 7C:
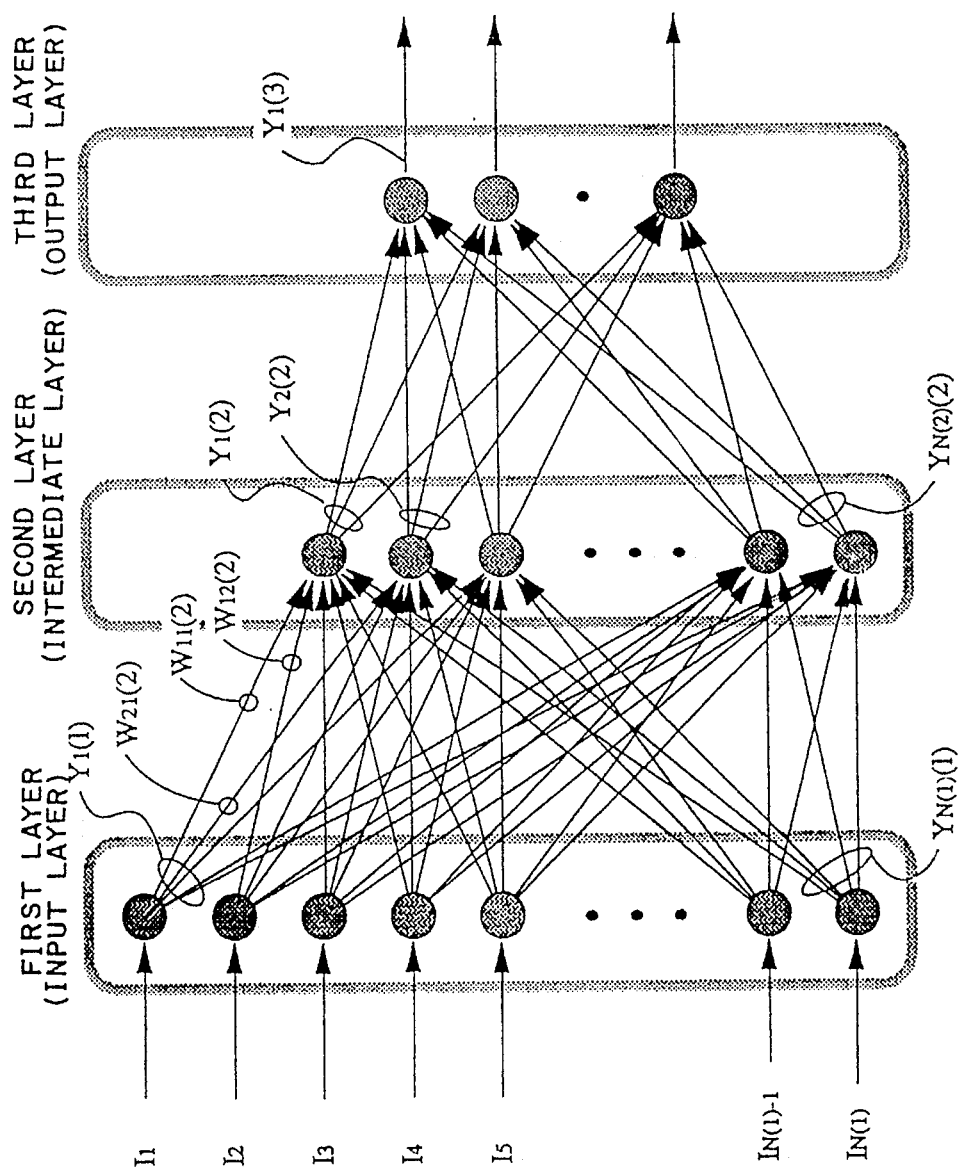
Figure 7C illustrates a network of the fourth embodiment.
Figure 7D:
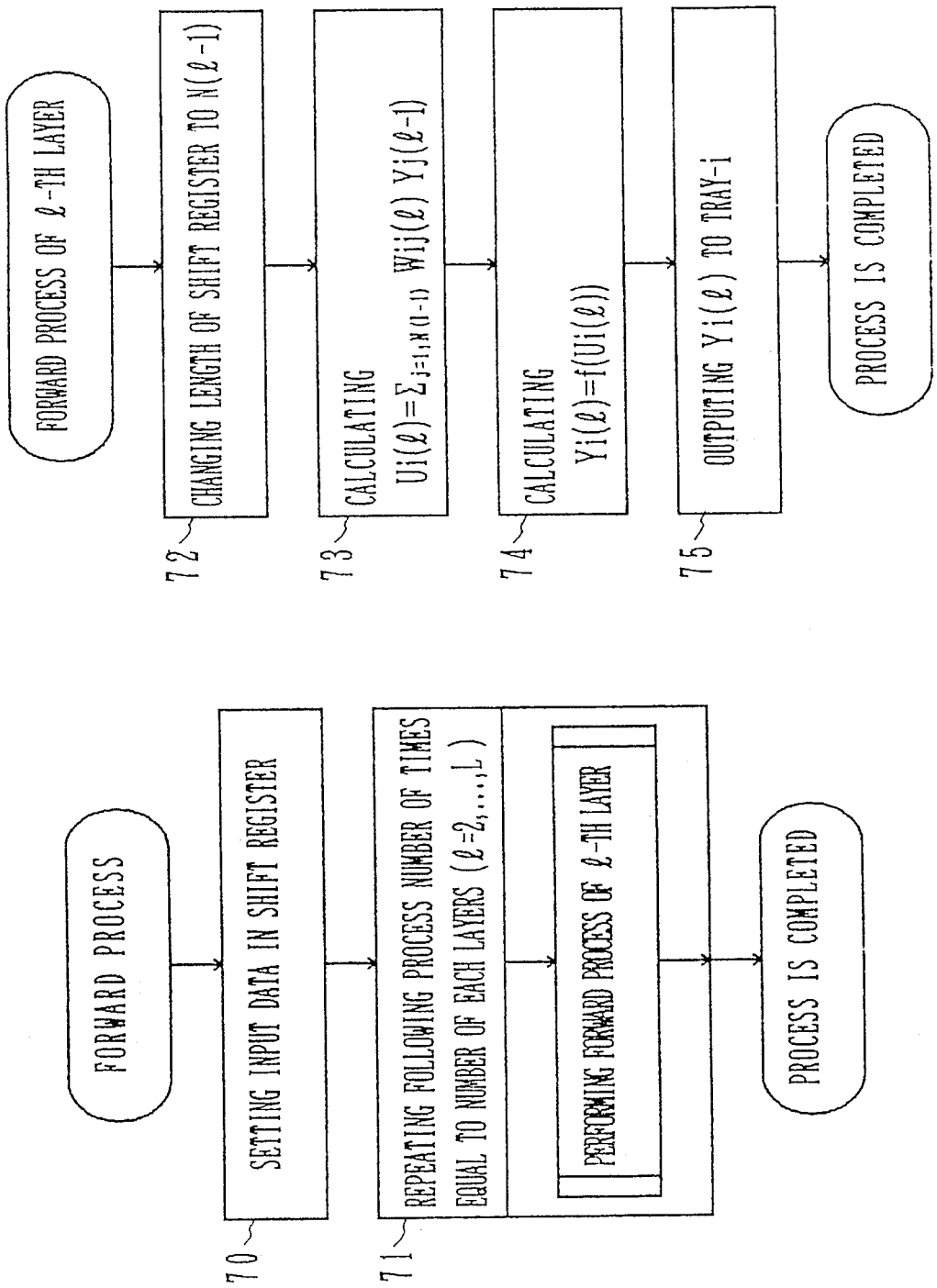
FIG. 7D is a flowchart of a forward process in the fourth embodiment, FIGS. 7E(1), 7E(2) and 7E(3) are flowcharts of a learning process in the fourth embodiment.

FIG. 7C is a conceptual diagram of a hierarchical neural network constituting a neurocomputer of a three-layer structure comprised of an input layer, an intermediate layer and an output layer using a plurality of neuron models of FIG. 7D. The input layer, which is the first layer, receives input signals $I_1, I_2, \ldots, I_{N(1)}$. Each of a plurality of units, i.e., neuron models, of the second intermediate layer is connected to all the neuron models in the first layer. The tiebranches therefor are synapses which are given respective weights $W_{ij}$. The third output layer also has each of its units or neuron models connected to all the neuron models of the intermediate layer. The outputs are drawn to the outside. In this neural network, an error between a teacher signal corresponding to input pattern signals applied to the input layer at the time of learning and an output signal from the output layer is obtained. The weights between the intermediate layer and the output layer and the weights between the first and second layers are determined so that the error may become very small. This algorithm is called the law of back propagation learning. When an associative process, such as pattern recognition, is performed by retaining weight values determined by the law of back propagation learning, if an imperfect pattern which is slightly different from a pattern to be recognized is applied to the inputs of the first layer, an output signal corresponding to the pattern is output from the output layer. The signal is very similar to a teacher signal corresponding to the pattern applied at the time of learning. If the difference between the output signal and the teacher signal is very small, the imperfect pattern will become recognized.

The operation of the neural network can be implemented with the neuro-computer 102 of FIG. 7A on an engineering basis. Though such a three-layer network as shown in FIG. 7C is used in the present embodiment, the number of layers has no essential influence on the operation of the present embodiment as will be described below. In the figure, N(1) stands for the number of neurons of the first layer. In general, the output of each neuron of the first layer, or the input layer is equal to its input. Thus, there is no need of substantial processing. The forward process in the normal process, that is, pattern recognition, is illustrated in FIG. 7D.

FIG. 7D is a flowchart of the forward process of the fourth embodiment. It is assumed in the forward process that the weight coefficients on the tie-branches between layers in the network of FIG. 7C are determined. To implement the network of FIG. 7C with the neuro-computer of FIG. 7A, the following process is performed. The basic operation in the forward operation, in the neuron model of FIG. 7B, is to multiply inputs by weights and apply a nonlinear function to the sum U of products. This operation is performed for each of the layers. First, in step 70, data from $I_1$ to $I_{N(1)}$ are set in the shift register. With the number of layers represented by L, the following processes are all repeated for each of the layers. If L is 3, for example, they are repeated three times. The forward process of one layer is repeated. Then, the process is terminated. The forward process for one layer is indicated below. In the case of the intermediate layer, l=2. In step 72, the length of the shift register. is changed to N(l-1). That is, since l=2, the length of the shift register is made N(1), i.e., the number of the neurons in the input layer. In step 73, the process of neuron models in the intermediate layer is performed. The index j is changed from 1 to the number of units N(1) of the input layer. $W_{ij}(l)$ represents a weight coefficient for coupling between layer l-1 and layer l. For l=2, the weight coefficient is for weighting signals between the input layer and the intermediate layer. $Y_j$ (l-1) is an output from the j-th unit of the input layer. Reference character i stands for the i-th unit of layer *1l. The state $U_i(2)$ of the i-th unit is calculated by multiplying the output $Y_j$ of the input layer, i.e., the j-th Y, by the weight $W_{ij}$ and obtaining the sum of the products. In step 74, the state $U_i(2)$ of the i-th unit of the intermediate layer is input to a nonlinear function, i.e., a sigmoid function to provide an output $Y_i(2)$. That is, the calculation of inner product in step 73 is performed in the unit 102 of FIG. 7A, and the calculation of the sigmoid function is performed by unit 101. In step 75, the output $Y_i(2)$ of the i-th unit of the intermediate layer is output to the i-th tray. Then, the process terminates. The above forward process is performed for each of the input layer, intermediate layer and output layer. The forward process for each layer terminates in this manner. The process required for simulation of a neuron itself is the calculation represented by the expression shown in FIG. 7B and includes calculation of the inner product of weights and input vectors and a sigmoid function for the result of the inner product. The calculation of the function is implemented by the sigmoid function unit 101. Therefore, the process of a certain layer in the network is to perform the calculation for a neuron itself for each of the neurons in the layer as shown in FIG. 7C. Thus, the calculation of the inner product becomes a vector of the product of a matrix of coupling coefficient vectors W(l)=[Wij(l)] and a vector of inputs to the layer $\bar{X}$ (l)=[$X_j$(l)], $$U(l) = [U1(l)] = \sum_{j=1}^{N(l)} Wij(l) Xj(l)$$

This is made possible by the method described in connection with the third embodiment of the present invention as this is a matrix vector product. The calculation of the sigmoid function is performed by each sigmoid function unit 101 inputting each element Ui(l) of the product vector and outputting a corresponding function value Yi(l)=f(Ui(l)). If there is a succeeding layer, i.e., the (l+1)th layer, each of its function value outputs Yi(l) is written into a respective tray. In the process of the (l+1)th layer they are used as inputs to repeat the above process.

The learning operation, namely, the back propagation algorithm which is performed using a neuron computer shown in FIG. 7A will be explained hereinafter.

FIG. 7E is a flowchart of the learning process in the fourth embodiment. The learning process in the neurocomputer corrects the weight of each neuron until the network satisfies a desired input and output relationship. The method of learning is to prepare a plurality of pairs of an input signal vector and a teacher signal vector, namely, the number of the pairs corresponds to that of teacher signal set. Then, is selected one pair from among the pairs, the input signal $I_p$ for the selected pair is entered into the network as an object of learning and the output of the network for the input signals $I_p$ is completed with the correct output signal, that is, the teacher signal $O_p$ corresponding to the input signal. The difference is referred to as an error. The weights of the neurons are corrected on the basis of the error and the values of the input and output signals at that time. This process is repeated for each of the elements of the set of teacher signals until the learning converges. That is, all of the input patterns are memorized as weight values in a distributed manner. In the process of correcting weights, which is called the backward process, the error obtained at the output layer is propagated toward the input layer in the direction opposite to the normal flow direction of signals while it is corrected. This is the algorithm of back propagation.

The error D is defined recursively as follows. Di(l) is an error which is propagated backward from the i-th neuron in the l-th layer. L is the number of layers in the network.

$$Di(L) = f'(Ui(L))(Yi(L) - Opi) \quad (1)$$
$$Di(l-1) = f'(Ui(l-1)) \quad (2)$$
$$\Sigma_{j=1,N(l)} Wji(l)Dj(l)$$
$$(l = 2, \ldots, L) \quad (2)$$
$$(i = 1, \ldots, N(l))$$

where f'(U) is the value of the differential coefficient f'(X) of a sigmoid function f(X) when X=U. If, for example, $$f(X)=\tanh X \quad (3)$$

since $$f'(X) = d(\tanh X)/dX = 1 - \tanh^2 X \quad (4)$$
$$= 1 - f^2(X)$$

we have $$f'(Ui)=1-f^2(Ui)=1-Yi^2 \quad (5)$$

On the basis of the Di and Yi the weight is updated as follows. Here η stands for the size of steps at which the weight is updated. If η is too small, the convergence of the learning becomes slow, while, if η is too large, no convergence is allowed.

$$Wij (l)^{(t+1)}=Wij (l)^{(t)}+\Delta Wij (l)^{(t)} \quad (6)$$

$$\Delta Wij (l)^{(t)}=\eta Di (l) Y j (l-1) (l=2, \ldots, L) \quad (7)$$

However, the following expression is frequently used. This is obtained by passing $\Delta Wij(l)^{(t)}$ in the above expression through a first-order digital lowpass filter, and α is a parameter which defines the time constant of the filter.

$$\Delta W_{ij}(l)^{(t+1)} = \eta D_i(l) Y_j(l-1) + \alpha \Delta W_{ij}(l)^{(t)} \quad (8)$$

The calculation needed in the backward process includes inter-vector calculation and calculation of a matrix and a vector. Particularly, the central calculation is multiplication of the transposed matrix $W^T$ of a matrix $W$ whose elements are weights of neurons in each layer and the above error vector Dj(l). In the general case where there are a plurality of neurons in an layer, the error is represented by a vector.

The flowchart of FIG. 7E(1) will now be described.

The forward process and backward process for one layer are performed. First, input data $I_p$ is set in the shift register to perform the forward process for one layer. Since this is performed in each layer, the forward process is repeated the number of times equal to the number of layers. Then, output data $O_p$ is output to be set in the shift register. The steps following step 79 are carried out in parallel for each of the units in the output layer. That is, error $D_i(L)=Y_i(L)-O_p(i)$ is calculated and set in the i-th tray. Subsequently, the backward process is carried out for each of the layers from the output layer to the input layer. in step 80. This backward process is indicated in FIG. 7E(2). As for the L-th layer, since the number of the neurons in the previous layer is N(l-1), the shift register length is set to N(l-1) in step 81. Subsequently, the following steps are carried out in parallel for each of the units in the present layer as indicated by step 82. That is, the above expression (2) is carried out in step 83.

It is to be noted here that the weight is $W_{ij}(l)$, this is an element of the transposed matrix $W^T$ of the weight matrix, the sum is obtained with regard to i and the multiplication is performed regarding Wij. Then, in step 84, the expressions (6), (7) or (8) are calculated to update the weight. The error Di(l-1) obtained in step 83 is output to i-th tray. In order to perform the next error calculation, the operation of step 83 is necessary.

In FIG. 7(3) is illustrated a flowchart which represents that the flowchart in FIG. 7E(1), i.e., the continuous process of the forward process and the backward process is repeated until the learning converges by changing a sample as shown in step 86. Such a process includes processes of updating weights and smoothing correction amounts of the weights to stabilize the learning. These processes consist of multiplication of a matrix by a scalar and addition of and subtraction between matrices and can be performed by the present neuro-computer. The sigmoid function unit 101 may be implemented with software in place of hardware. The means 103 for inverting termination of the learning may be implemented with software on the host computer.

An operation of updating the weight of a back propagation can be performed by hardware and, particularly when it is performed by a DSP, software for updating the weight is stored in a memory and an operation of updating the weight is controlled by the DSP by using the software.

One example of a calculation of updating the weight is as follows.

$W = W + \eta\ DY^T$ or $W_{ij} = W_{ij} + \eta Di\ Yj$, where $W$ is a weight matrix, $D$ is an error vector, $Y$ is an output vector and $\eta$ is a learning coefficient which can be selected as large as possible within the scope in which convergence is possible. When the above expression is considered regarding the DSP, the partial vector Wi* of the weight matrix W is expressed as follows.

$$Z_j = Z_j + \eta DY_j \quad (j=1-n(l))$$

where l represents the number of neurons in the l-th layer. The loop expressed by Zj is obtained.

Figure 7F:
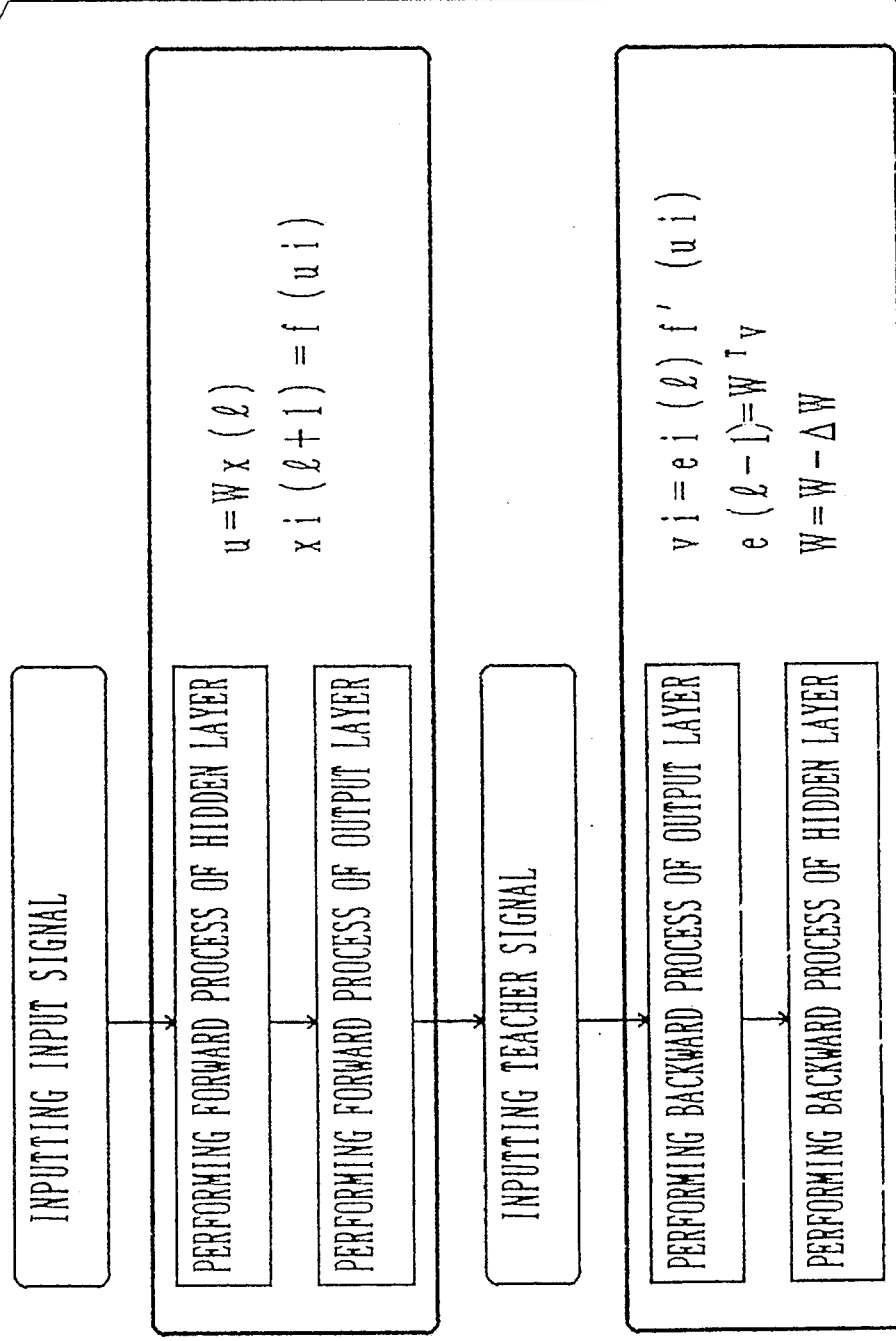
FIG. 7F is a flowchart of error back propagation learning.

The neuro-computer is further described with reference to FIG. 7F. FIG. 7F is a flowchart of a process of learning error back propagation. The vector representation is used herein.

In FIG. 7F $x$ (l) is a neuron vector of the l-th layer, and W is a coupling coefficient, i.e., a weight matrix. f is a sigmoid function, $e$ (l) is an error vector propagated backward from the output side of the l-th layer, and $\Delta W$ is an amount of correction of weight. Supposing that there is no input layer in the case of three layers, the forward process of a hidden layer is performed when an input signal is applied. This is represented by $u = W\ x$ (l). If a nonlinear function is applied to $v$, an input is provided for the next layer, i.e., (l+1)th layer. Since this is the input to the output layer, the forward process of the output layer is performed. Subsequently, a teacher signal is input for the backward process. In the output layer, an error e between a teacher signal and an output signal is multiplied by differentiation of f for the backward process. An error of the intermediate layer is obtained by multiplying a variable, which is obtained by multiplying a back propagated error signal by the differentiation, by the transposed matrix $W^T$ of the weight matrix. A value obtained by multiplying each element of the error vector by differentiation of the sigmoid is multiplied by an element of the previous $W^T$ to obtain $\Delta W$ so $W$ is updated. In this way the backward process of the output layer and the backward process of the hidden layer are performed. The calculation performed in the forward process is the multiplication of the weight matrix $W$ and the input vector $x$ and consequently the calculation of a value of the sigmoid function of each element of the vector. This calculation can be performed at each neuron in parallel. The backward process is classified into two main jobs: propagation of an error between a teacher signal and an output signal in the opposite direction while correcting the error; and correction of weights on the basis of the error. The backward calculation requires multiplication by the transposed matrix $W^T$ of the weight matrix $W$. The product of the transposed matrix $W^T$ and the vector has been described in connection with the previous embodiment. That is, an important point in realizing the learning of back propagation is a method of efficiently realizing multiplication of the transposed matrix $W^T$ of a weight matrix and a vector.

Figure 7G:
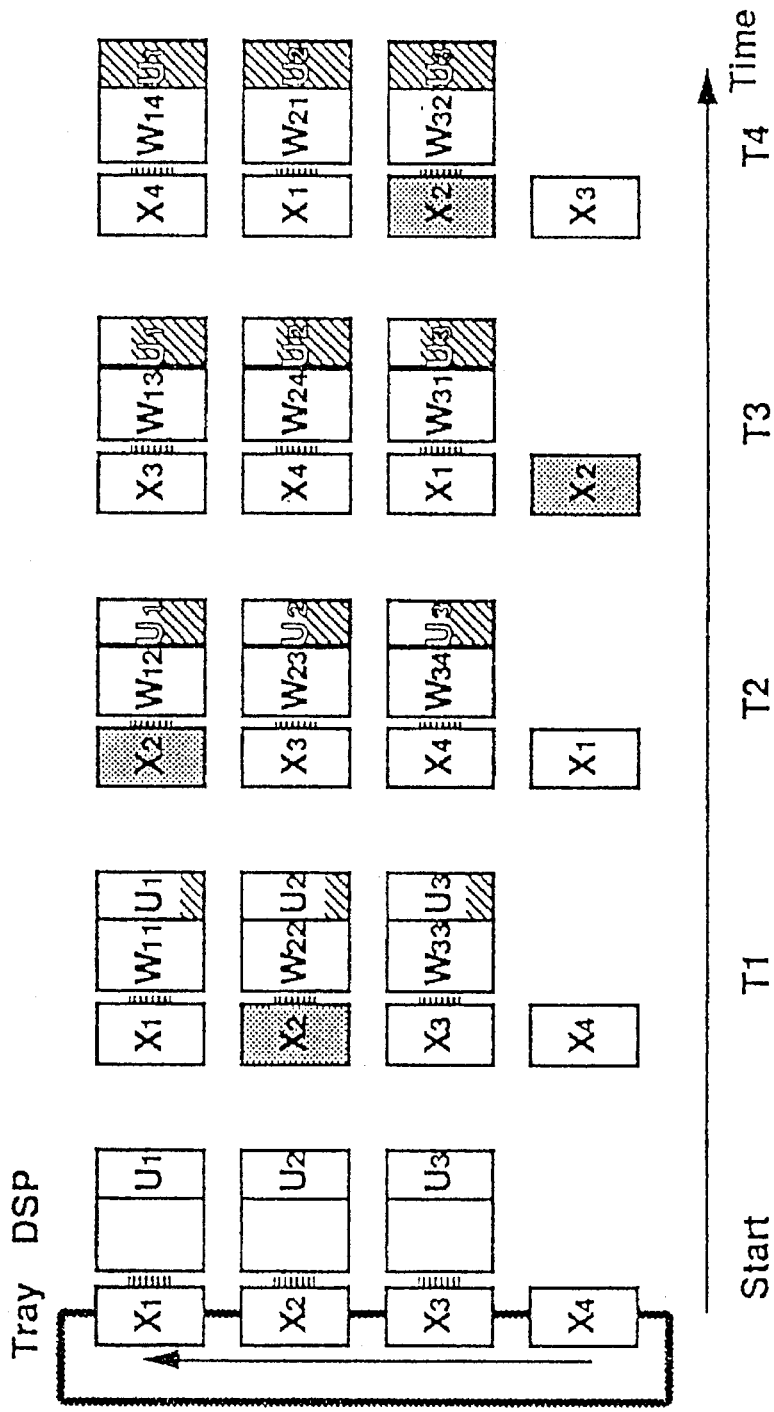
FIG. 7G is a timing chart when the sum of products of a matrix and a vector $u = W x$ is calculated.

Next, the forward sum-of-products calculation and the backward sum-of-products calculation will be described with reference to FIGS. 7G and 7H. The forward sum-of-products calculation is calculation of the product of a matrix and a vector, and the matrix comprises a weight matrix.

Where the matrix vector product $u = W\ x$ is calculated in the present invention, the product of rows of a weight matrix and a vector $x$ is calculated concurrently in accordance with the following expression.

$$\begin{pmatrix} u_1 \\ u_2 \\ u_3 \end{pmatrix} = \begin{pmatrix} W_{11} & W_{12} & W_{13} & W_{14} \\ W_{21} & W_{22} & W_{23} & W_{24} \\ W_{31} & W_{32} & W_{33} & W_{34} \end{pmatrix} \begin{pmatrix} X_1 \\ X_2 \\ X_3 \\ X_4 \end{pmatrix} \quad (9)$$

This process is explained with reference to FIG. 7G. The weight matrix $W$ is a rectangular matrix, e.g., a 3 by 4 matrix. The elements of the vector $x$ are input to the trays. At time $T_1$ the products of $X_1$ and $W_{11}$, $X_2$ and $W_{22}$, $X_3$ and $W_{33}$ are calculated in the respective units. At time $T_2$ each element of the vector $x$ is shifted cyclically. At time $T_2$ the product of $W_{12}$ and $X_2$ is added to $U_1$. Thus, at time $T_2$, $U_1=X_1 \times W_{11}+X_2 \times W_{12}$. Also, $W_{23}$ and $X_3$ are multiplied in the second unit and $W_{34}$ and $X_4$ are multiplied in the third unit. At $T_3$, $W_{13}$ and $X_3$ are multiplied and the resultant product is added to $U_1$. $W_{24}$ and $X_4$ are multiplied to be added to $U_2$. $W_{31}$ and $X_1$ are multiplied to be added to $U_3$. At this time $X_2$ is removed from the objects of calculation. At $T_4$, $W_{14}$ and $X_4$, $W_{21}$ and $X_1$, $W_{32}$ and $X_2$ are multiplied simultaneously and the resultant products are added to $U_1$, $U_2$ and $U_3$, respectively. In this case, $X_3$ is removed from the objects of calculation. The multiplication of a rectangular matrix and a vector can thus be effected by taking the removal from the objects of calculation into consideration.

In the local memory PE-$_i$, the partial vector Wi* of W is stored skewed so that $W_{ii}$ may stay at the head. $X_i$ circulates through the tray ring counterclockwise. $U_i$ is accumulated in a register of PE-$_i$.

A start is made from the state $U_j=0$. PE-$_i$ multiplies $X_j$ and $W_{ij}$ and then adds the result to $U_i$. At the same time $X_j$ adjoins the next tray (circulates through the ring counterclockwise). When this is repeated four times, all the $U_i$ are obtained simultaneously.

$W_{ii}$ is skewed, the process starts when all $X_i$ are provided in trays and all $U_i$ are obtained concurrently.

Figure 7H:
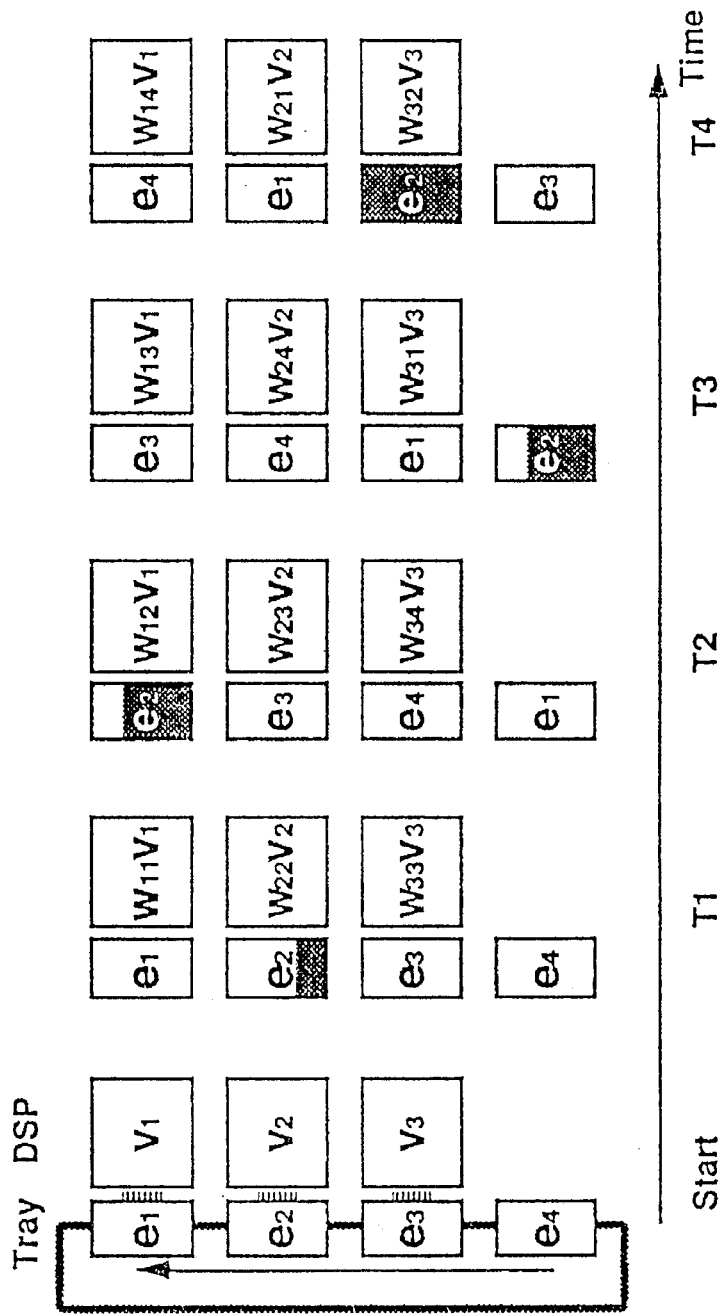
FIG. 7H is a timing chart when the sum of products of a transposed matrix and a vector $e = W^T v$ is calculated.
Figure 71:
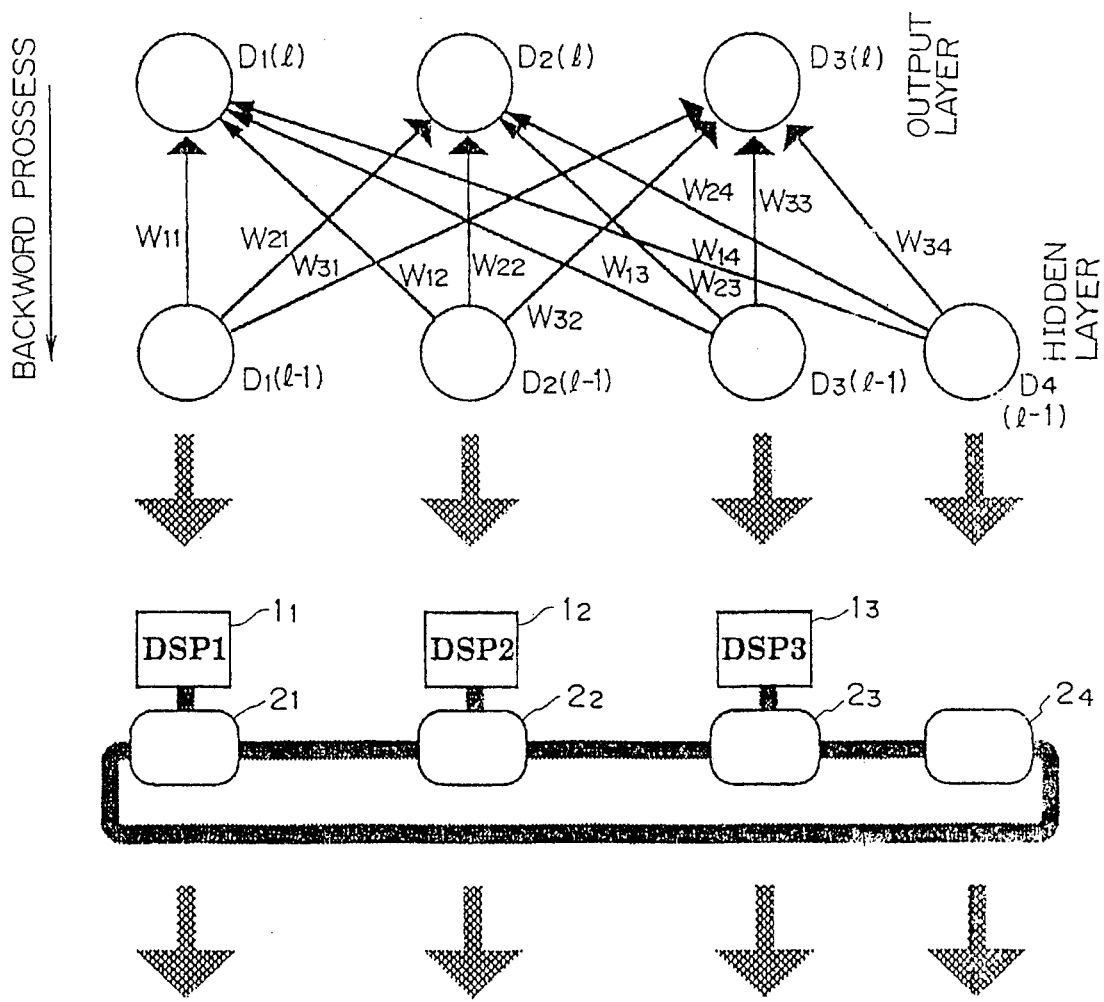

FIG. 7H is a diagram illustrating the backward sum-of-products calculation. This is a timing diagram when the product of a transposed matrix and a row vector, $e = W^T v$ is calculated. In this case, the vector $v$ comprises elements obtained by multiplying the error vector of the previous layer by differentiation of a nonlinear function.

$e$ is an error vector for back propagation in the next layer to be obtained. It is important in the present invention that, even if the transposed matrix $W^T$ is used for calculation, its arrangement may be the same as W on the memory utilized in the forward sum-of-products calculation.

That is, in the present invention, the vector e to be obtained is shifted cyclically. The transposed matrix $U^T$ and vector $v$ are expressed as follows.

$$\begin{pmatrix} e_1 \\ e_2 \\ e_3 \\ e_4 \end{pmatrix} = \begin{pmatrix} W_{11} & W_{21} & W_{31} \\ W_{12} & W_{22} & W_{32} \\ W_{13} & W_{23} & W_{33} \\ W_{14} & W_{24} & W_{34} \end{pmatrix} \begin{pmatrix} v_1 \\ v_2 \\ v_3 \end{pmatrix} \quad (10)$$

As can be seen from the above expression, the matrix W is transposed and moreover is a rectangular matrix. $e_1$ equals $W_{11} \times v_1 + W_{21} \times v_2 + W_{31} \times v_3$. To perform this calculation, the product of $W_{11}$ and $v_1$ is obtained in the first unit (DSP) in the time slot $T_1$ as shown in FIG. 7H. This is added to $e_1$ which is zero. Then, a cyclic shift is performed. At time $T_2$, $e_1$ is removed from the objects of calculation. At time $T_3$, $e_1$ becomes an object of calculation in the third unit. That is, $W_{31} \times v_3$ is added to the previous value, namely, $W_{11} \times v_1$. Thus, $e_1$ becomes $W_{11} \times v_1 + W_{31} \times v_3$ in the time slot $T_3$. At time $T_4$, $e_1$ is shifted cyclicly and enters the second unit for calculation. $W_{21} \times v_2$ is added to $e_1$ so that the inner product of the first row of the matrix and the vector $v$ is calculated and its result is stored as $e_1$.

Similarly, the product $e_2$ of the second can of transposed matrix $W^T$ and the vector $u$ is obtained as the sum of products, i.e., the sum of $W_{22} \times v_2$ (at time $T_1$), $W_{12} \times v_1$ (at time $T_2$) and $W_{32} \times v_3$ (at time $T_4$). $e_2$ becomes idle at time $T_3$. The product $e_3$ of the third row of $W^T$, and the vector $e$ is obtained as the sum of products, i.e. the sum of $W_{33} \times V_3$ (at time $T_1$), $W_{23} \times V_2$ (at time $T_2$) and $W_{13} \times V_1$ (at time $T_3$). $e_4$ is idle in time slot $T_4$. The product $e_4$ of the fourth row of $W^T$ and the vector $v$ is obtained as the sum of $W_{34} \times v_3$ (at time $T_2$), $W_{24} \times v_2$ (at time $T_3$) and $W_{14} \times v_1$ (at time $T_4$). $e_4$ is idle in time $T_1$. In the present invention, the i-th row Wi* of vector W is stored in a local memory in PE-$_i$ skewed so that diagonal element Wii may stay at the head as before. In this case, $e_i$ and $V_i$ are replaced with each other. Namely, partial sum of products $e_i$ is accumulated while circulating through the trays counterclockwise, while $V_i$ always stays in PE-$_i$. In the matrix $V_i$ is shifted but in the transposed matrix $e_i$ is shifted.

A start is made from $e_j=0$. PE-$_i$ multiplies Vi and Wij and adds the result to $e_j$. At the same time the updated $e_j$ is transferred to the next tray (circulates through the ring counterclockwise). When this is repeated four times, all the $e_j$ are obtained simultaneously.

As described above, the neuro-computer of the present invention can be realized with any number of layers and not only has flexibility that the degree of freedom of learning algorithms is high but also can utilize the speed of DSP as it is. Moreover, there is no overhead in calculation by the DSP and the SIMD can be carried out by the DSP.

FIG. 7I illustrates the process of FIG. 7H with the symbols used in FIG. 7I corresponding to those in FIG. 7E to explain the backward process.

If an input conversion value of an error of the output layer is designated as $D_1(l)$, $D_2(l)$, $D_3(l)$, an error in the output of the hidden layer is expressed as $D_1(l-1)$, $D_2(l-1)$, $D_3(l-1)$ and $D_4(l-1)$ and weights as $W_{11}$, $W_{21}$, $W_{31}$; $W_{12}$, $W_{22}$, $W_{32}$; $W_{13}$, $W_{23}$, $W_{33}$; and $W_{14}$, $W_{24}$, $W_{34}$, the following transposed matrix vector products are established.

$$\begin{vmatrix} D_1(l-1) \\ D_2(l-1) \\ D_3(l-1) \\ D_4(l-1) \end{vmatrix} = \begin{vmatrix} W_{11} & W_{21} & W_{31} \\ W_{12} & W_{22} & W_{32} \\ W_{13} & W_{23} & W_{33} \\ W_{14} & W_{24} & W_{34} \end{vmatrix} \begin{vmatrix} D_1(l) \\ D_2(l) \\ D_3(l) \end{vmatrix}$$

In DSP1 in a first operation unit $1_1$ sequentially obtains products of an input conversion value of an error of an output layer $D_1(l)$ stored in a register in the DSP1 and the first row $W_{11}$, $W_{12}$, $W_{13}$ and $W_{14}$ of the weight matrix stored in a memory and the product is added to tray 21 and then shifted in a counter clockwise direction at time $T_1$, $T_2$, $T_3$ and $T_4$. As to the error, $D_2(l-1)$ of the second neuron in the hidden layer $D_2(l-1)$ is provided at $W_{22}$ $D_2(l)$ by DSP2 at time $T_1$ and the product is added to the tray and shifted. The product $W_{12}$ $D_1(l)$ is provided by DSP1 at time $T_2$ and the product is added to a tray and the sum of the product $W_{22}$ $D_2(l)+W_{12}$ $D_1(l)$ is shifted. At time $T_3$, no DSP is corresponding to a tray and thus, an operation is not performed. At time $T_4$, the error $D_2(l-1)$ is provided as the product $W_{32} D_3(l)$ by DSP3. And the product is added to a tray, and thereby the sum of the product $W_{22} D_2(l)+W_{12}D_1(l)+W_{32} D_3(l)$ is provided. The sum of the product corresponds to an operation of the second row of the above transposed matrix vector product. Namely, the forward process calculates one row by using one DSP but the backward process calculates one row by using DSP1, 2 and 3. According to the system of the present invention, instead of transposing a weight matrix stored in a memory, an element of a weight matrix and an element of output layer error vector by each other to provide a product which is added to a tray and shifted, thereby ebabling a product of a transposed weight matrix and an error vector. Therefore, according to the present invention, in a neuron computation, a back propagation of an error can be obtained and in a normal matrix operation, a product of a transposed matrix and vector can be obtained.

Figure 7J:
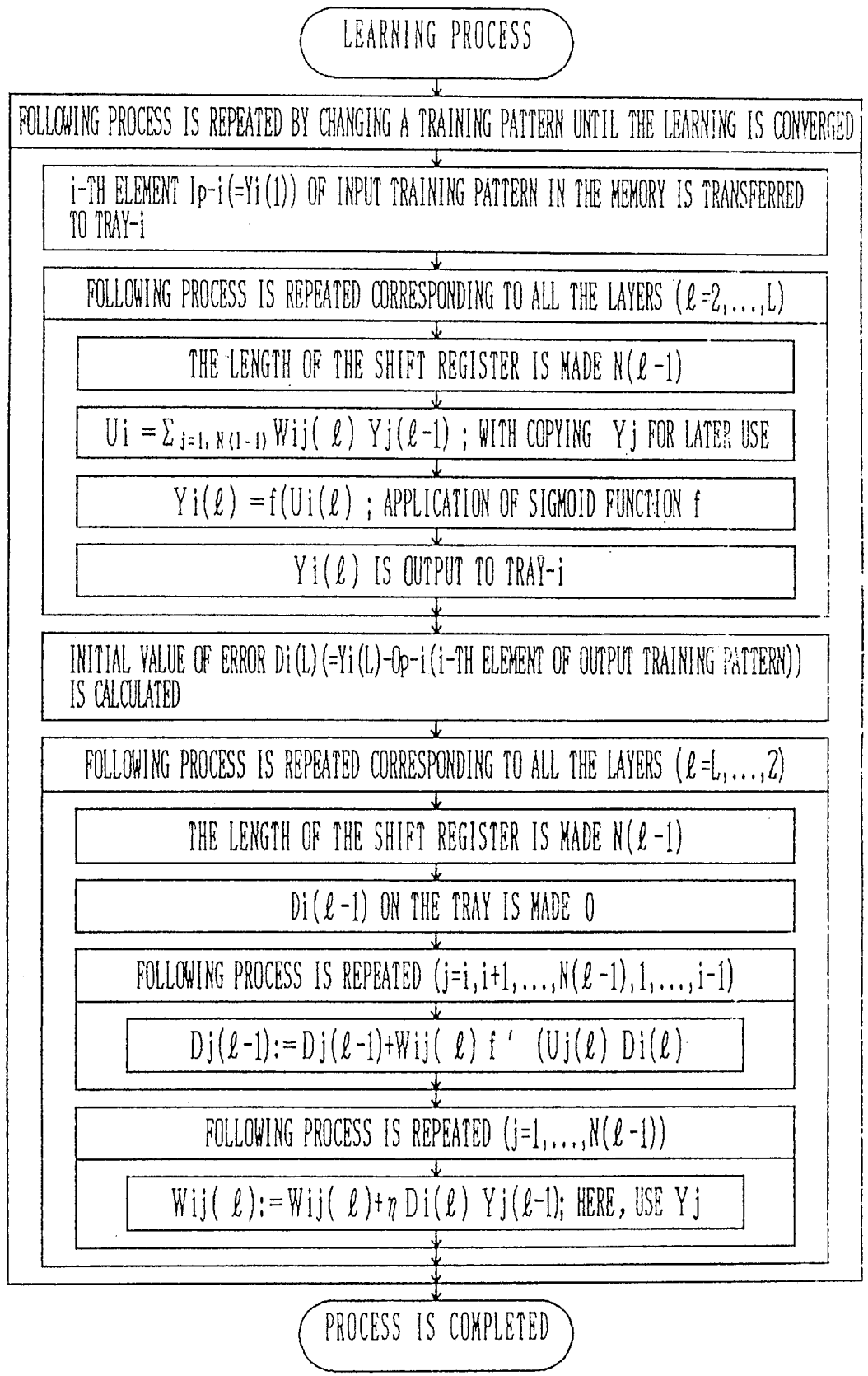
FIG. 7J is a flowchart of a whole learning.

FIG. 7J shows a flowchart of i-th DSP. After a learning process starts the following process is repeated by changing a training pattern until the learning is converged.

An i-th element Ip-i (=Yi(1)) of input training pattern in the memory is transferred to a tray i.

Then the following process is repeated corresponding to the number of all the layers (l=2, . . . , L).

Then the length of the shift register is made N(l-1).

Ui(l)lj=i, N(l-1) Wij (l) Yj(l-i) is calculated with copying Yj for later use.

Yi(l)=f(Ui(l)) is calculated to apply a sigmoid function f.

The Yi(l) is output to a tray i.

Next, an initial value of an error (Di(L)(=Yi(L)-Op-i(i-th element of output training pattern)) is calculated.

The following process is repeated for all the layers (l=L, . . . , 2).

Then the length of the shift register is made N(l-1).

The $D_i(l-1)$ on the tray i is made 0.

Then following equation is repeated. (j=i, i+1, . . . , N(l-1), 1, . . . , i-1)

$$Dj(l-1):=Dj(l-1)+Wij(l)f(Uj(l))Di(l)$$

Then the following process is repeated (j=1, . . . , N(l-1)).

$$Wij(l):=Wij(l)+\eta Di(l)Yj(l-1);$$

Figure 7K:
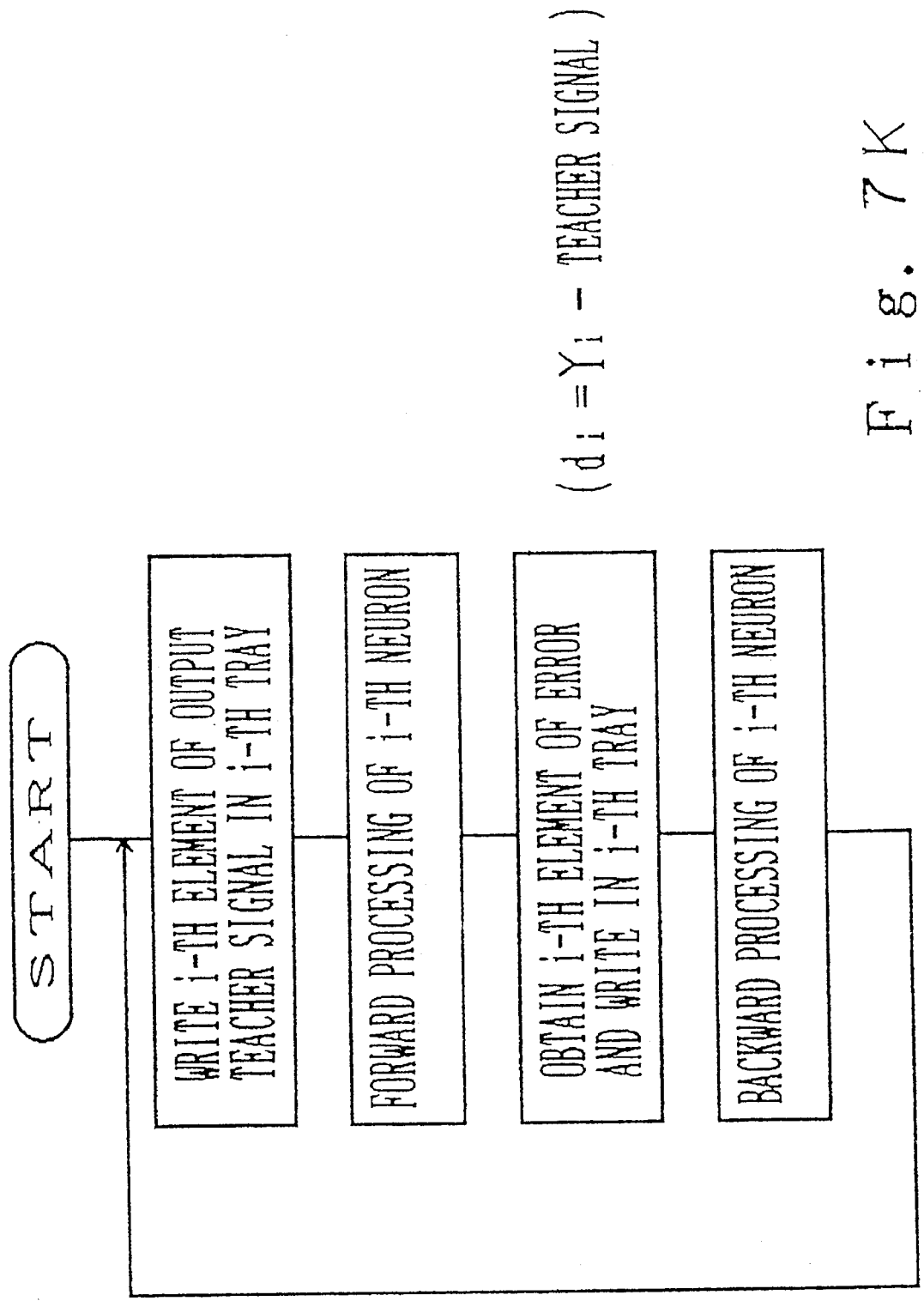
FIG. 7K is a simplified flowchart of the learning process.

FIG. 7K shows the control of the DSP in a simpler form. The i-th element of the input teacher signal is written to the i-th tray. Then, the i-th neuron is subjected to a forward process. This step is repeated for layers 2 to L. Then, the i-th element of the error is written in the i-th tray. Therefore, di=Yi-teacher signal i. The i-th neuron is subjected to a backward process. This step 114 is repeated for layers L to 2. Then the process is returned to "START".

Figure 8A:
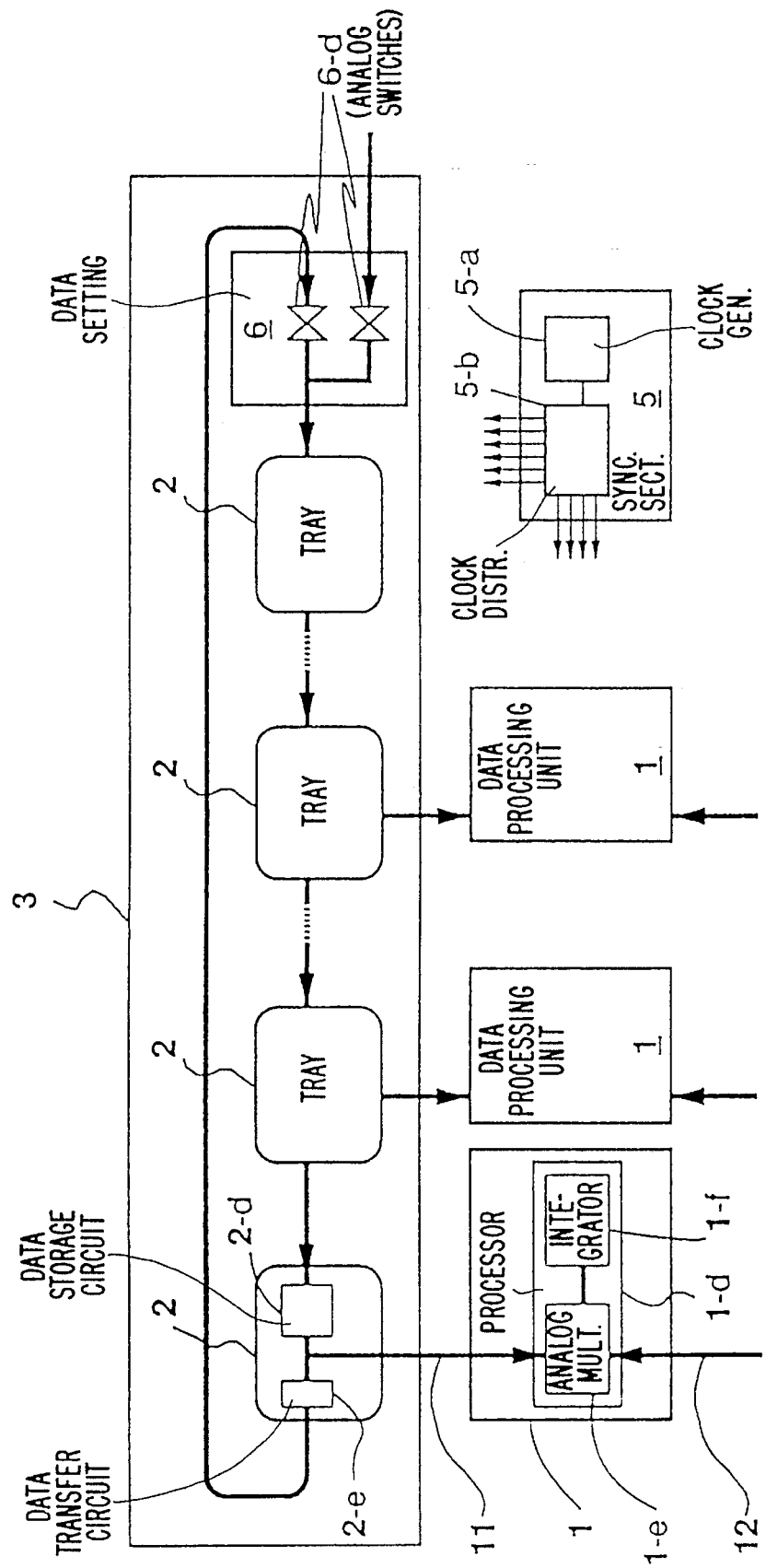
FIG. 8A illustrates a configuration of a fifth embodiment of the present invention.
Figure 8B:
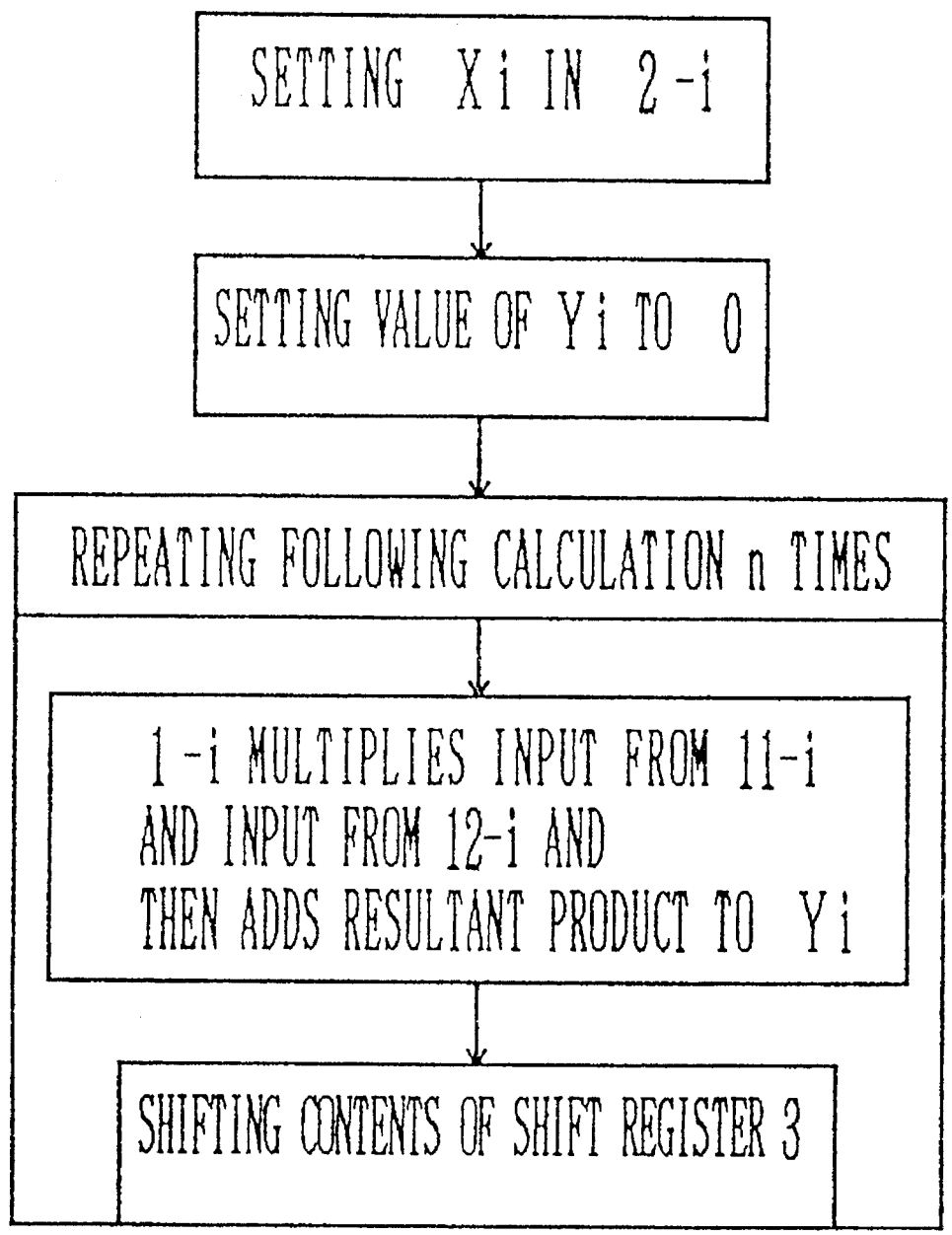
FIG. 8B is an operational flowchart of the fifth embodiment.

FIG. 8 illustrates a fifth embodiment of the present invention. This embodiment obtains the product of matrices using analog data. In the figure, like reference characters are used to designate corresponding parts to those in FIG. 4. ld designates a processor of the data processing unit 1, which may be composed of an analog multiplier 1e and an integrator lf. 2d designates a data storage circuit of the tray 2, which may be constructed from a sample-hold circuit 2f. 2e designates a data transfer circuit of the tray 2, which may be comprised of an analog switch 2g and a buffer amplifier 2h. 6 designates means for setting data in the tray 2, which may be constructed from analog switches 6d.

The operation of the present embodiment is the same as that of the principle of the present invention in FIG. 3A.

Figure 9A:
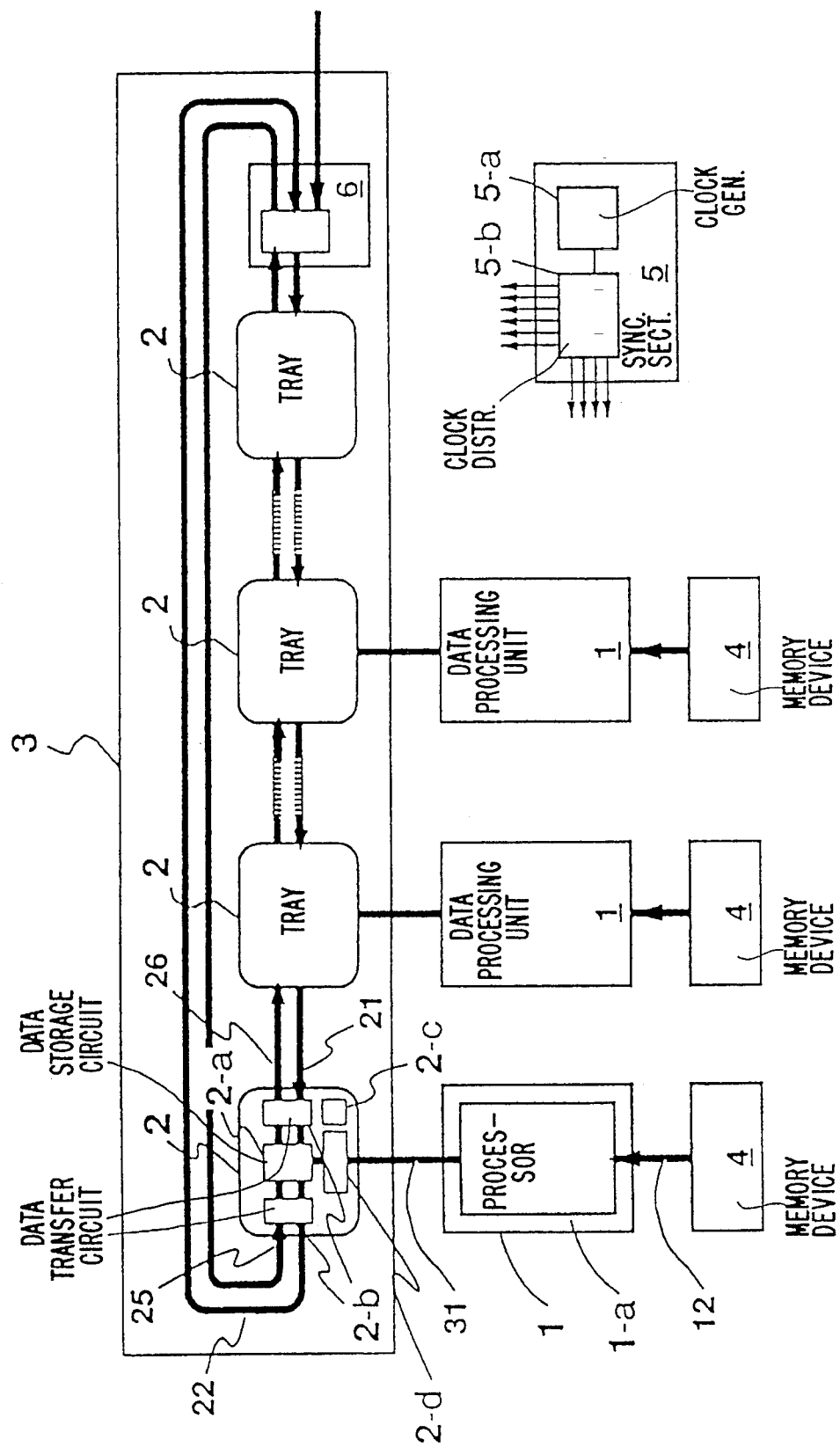
FIG. 9A illustrates a configuration of a sixth embodiment of the present invention.

FIG. 9A illustrates a sixth embodiment of the present invention which multiplies a band matrix and a vector. In the figure, like reference characters are used to designate corresponding parts to those in FIG. 4A.

Figure 9B:
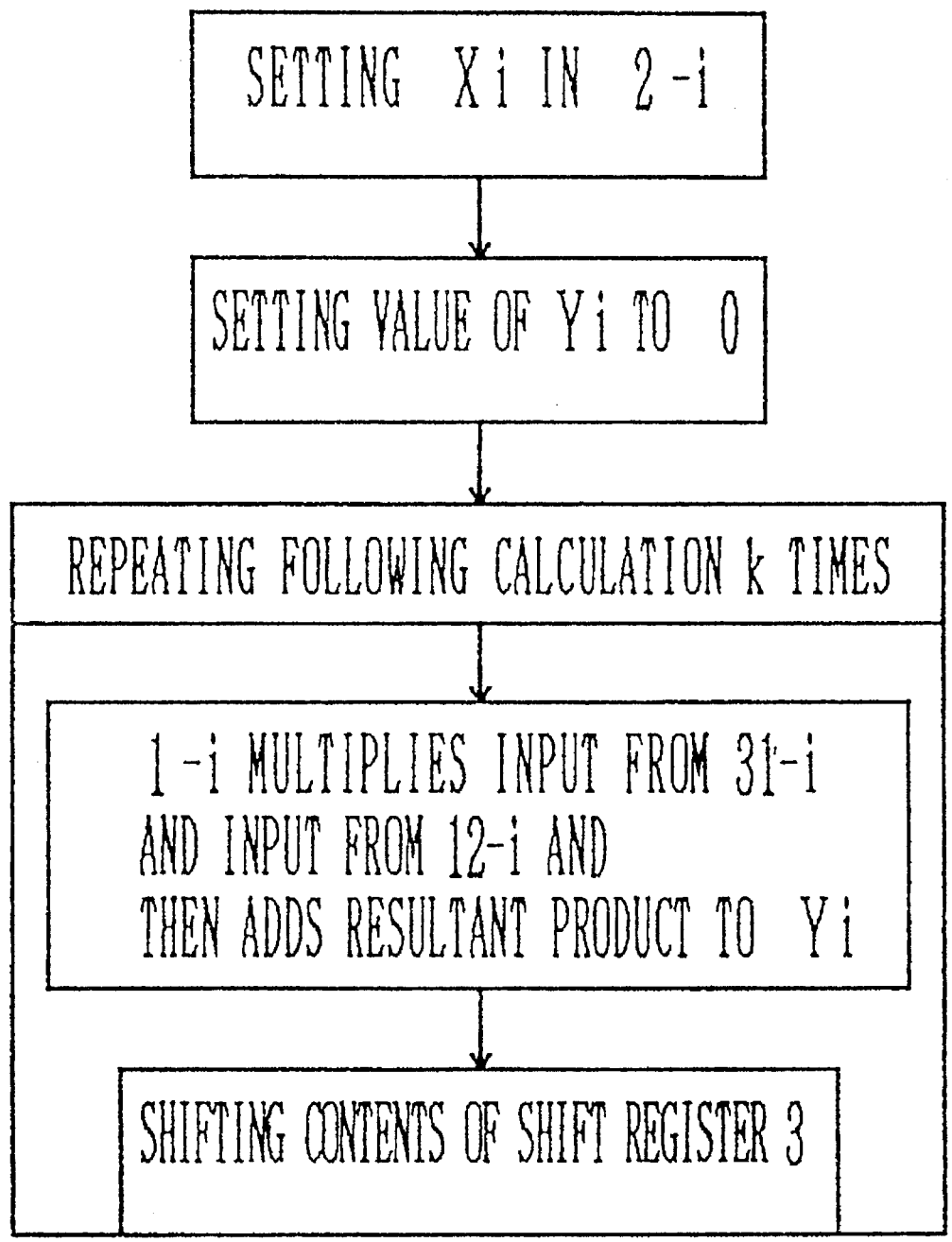
FIG. 9B is an operational flowchart of the sixth embodiment.
Figure 9D:
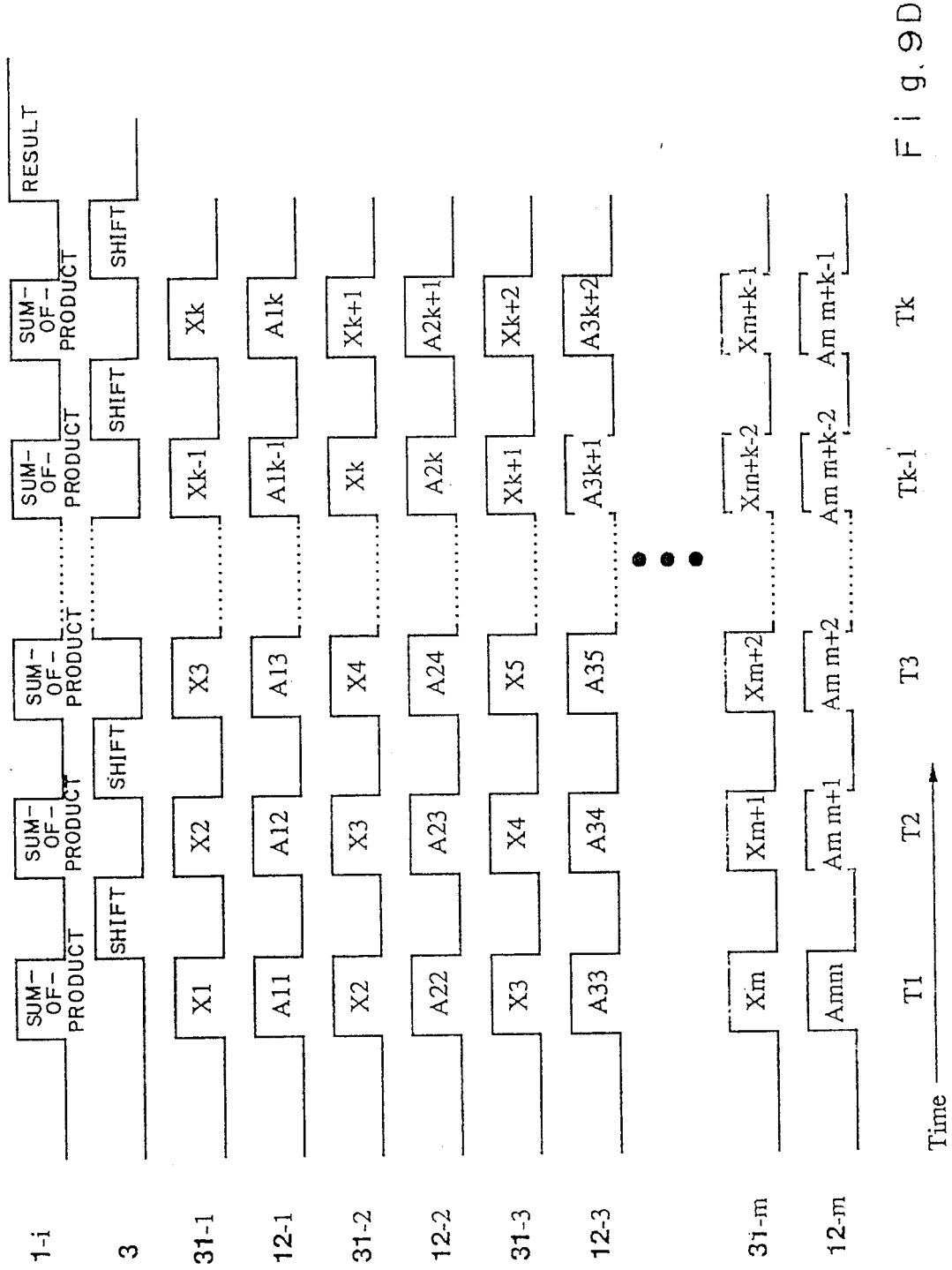
FIG. 9D is a timing chart of the sixth embodiment.

The operation of the present embodiment will be described with reference to FIG. 9B. In order to obtain the product (a vector $\vec{y}$ with m elements) of an m×n (n≧m≧1) band matrix A with a width of k and a vector x with n elements, the present embodiment uses m data processing units 1 each having two inputs and functions of multiplication and accumulation of the result of multiplication, n trays 2 and input data supply means connected to the data processing units. In this case, the calculation is performed in accordance with the procedure shown in FIG. 9B and timing steps shown in FIGS. 9C and 9D. Thus, the multiplication of the band matrix with a width of k and the vector can be carried out in a process time proportional to k.

Important things in the present embodiment are not to cause the vector $\vec{x}$ to make one circulation and, unlike the first embodiment and so on, to shift the vector just to the position in which the band starts when setting the vector $\vec{x}$ in the shift register 3. That is, where a process is started from the position in which the band starts, if calculation of sum of products while shifting the vector in a direction, the process will be terminated in a time proportional to k. However, where the process is initiated from the middle of the band due to some circumstances though not shown, it is evident that the vector $\vec{x}$ has only to be shifted to an end initially. In this case, it is significant that the shift register 3 can be shifted in two directions.

Where the process is started from the center of the band, the vector is initially shifted right by k/2 (omission of decimals) and subsequently the calculation of sum of products is performed while the vector is shifted in the opposite direction (left in this case) so that the process is terminated in a time proportional to 3/2 k.

If the shift register 3 is not bi-directional, the vector $\vec{x}$ has to be circulated by one rotation through the register. Thus, a time proportional to not the width k of the band matrix but its magnitude n is needed. With a large scale band matrix, the difference is very great. It is an advantage of the present invention that the multiplication of a band matrix and a vector can be carried out in a time proportional to the width k of the band matrix.

Figure 10A:
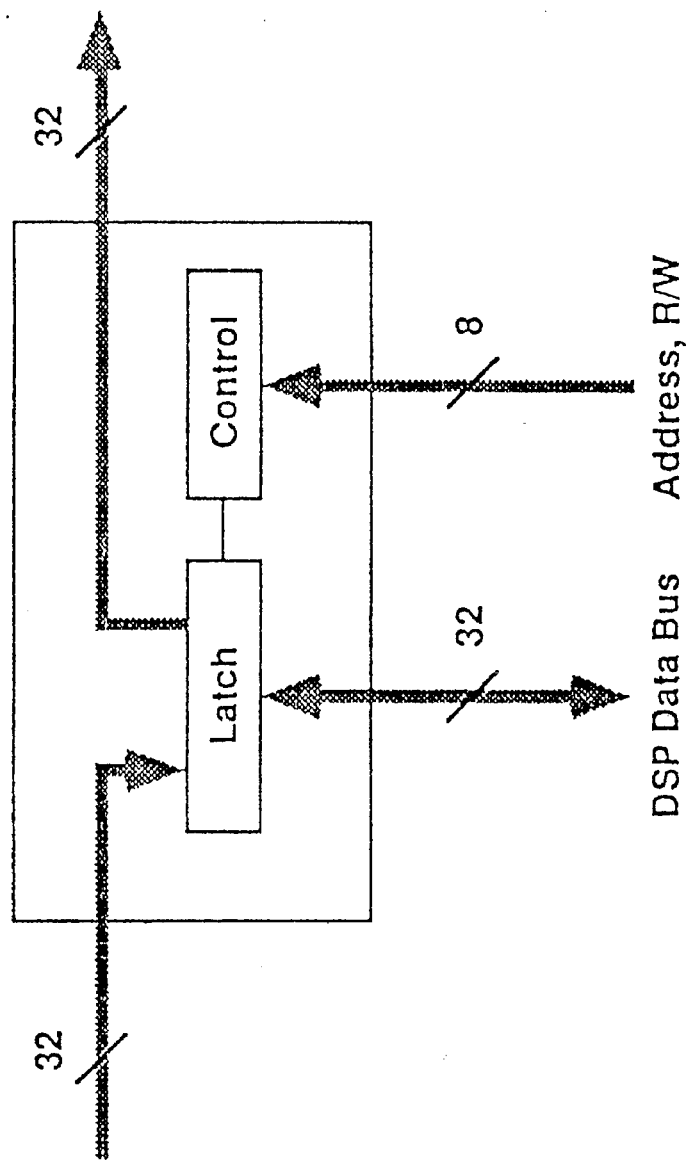
FIG. 10A illustrates a specific structure of the tray.

FIG. 10A illustrates a specific structure of the tray.

The tray is basically a one-word latch. Access to the tray from DSP and data transfer from a tray to the next can be carried out in one cycle (post shift).

Switching between functions is made by lower bits of an address line simultaneously with data access, improving the speed of operation.

One tray is a gate array of a scale of about 1200 basic cells. Two, three or four trays can be packaged in one chip.

Also, the tray can incorporate work registers for 10 several words.

Figure 10B:
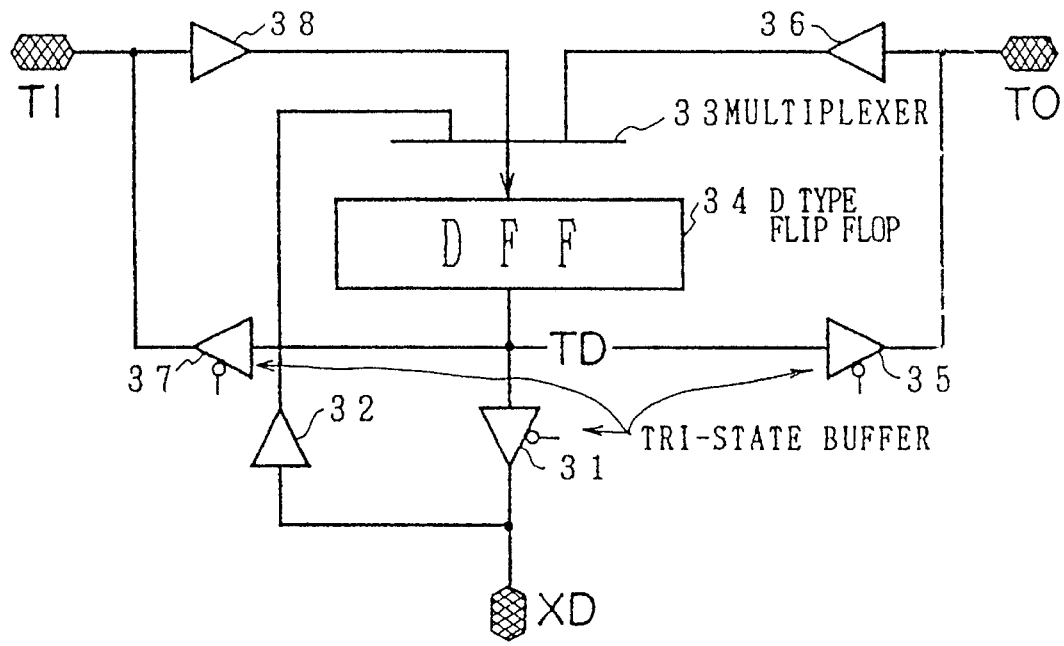
FIG. 10B is a concrete structure of the tray according to the present invention.

A tray circuit 2 is shown in FIG. 10B. It comprises a bus interface circuit comprising a tri-state buffer 31 and a buffer 32, a multiplexer 33, a D-type flip-flop 34, a first interface circuit comprising a tri-state buffer 35 and a buffer 36, and a second interface circuit comprising a tri-state buffer 37 and a buffer 38. The output of tri-state buffer 31 is connected to data processing unit 1 and the input of buffer 32 is also connected to the data processing unit 1. The output of tri-state buffer 35 and the input of buffer 36 are connected to the adjacent tray on the right side. The output of buffer 37 is connected to the adjacent tray on the left side and the input of buffer 38 is connected to the adjacent tray on the left side. The outputs of buffers 32, 36 and 38 are selected by multiplexer 33 to provide an output to D flip-flop 34. The output of D flip-flop 34 is connected to the input of tri-state buffers 31, 35 and 37. The data from the adjacent tray on the left side is input to D flip-flop 34 through buffer 38, output to the adjacent tray on the right side and applied to the data processing unit through tri-state buffer 31. The input from the adjacent tray on the right side is applied to the D flip-flop 34 through buffer 36, to the adjacent tray on the left side through tri-state buffer 37 and to the data processing unit I through tri-state buffer 31.

Figure 10C:
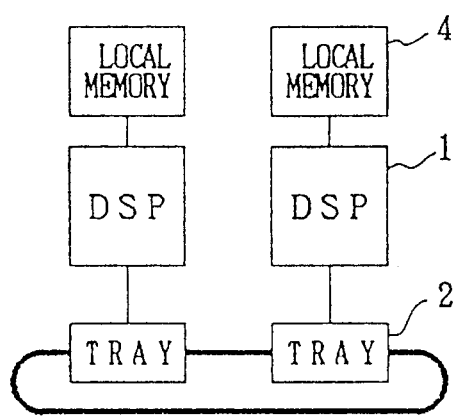
FIG. 10C shows a relation between a tray and a data processing unit comprising a DSP (digital signal processor)

Tray circuit 2 is connected to the adjacent tray as shown in FIG. 10C, thereby forming a ring-bus comprising 32 bits, for example. The instruction for the tray is comprised by using the lower 2 bits of the address bus of the DSP forming the data processing unit 1 and an access mode signal (XR-W) of the DSP.

Therefore, the tray circuit 2 can be observed as a mere external register by the data processing unit comprising the DSP. Thus, the operation can be carried out without loading an overhead to the DSP. The manner of bus access by the tray circuit and the DSP is shown in the timing chart of FIG. 10D. The instructions for the tray circuit 2 comprise NOP, RSR (read and shift right), RSL (read and shift left), WSR (write and shift right), WSL (write and shift left), RD (read), and WR (write). Data flow between the tray circuit 2 and the data processing unit 1 is shown in FIG. 10E.

Figure 10D:
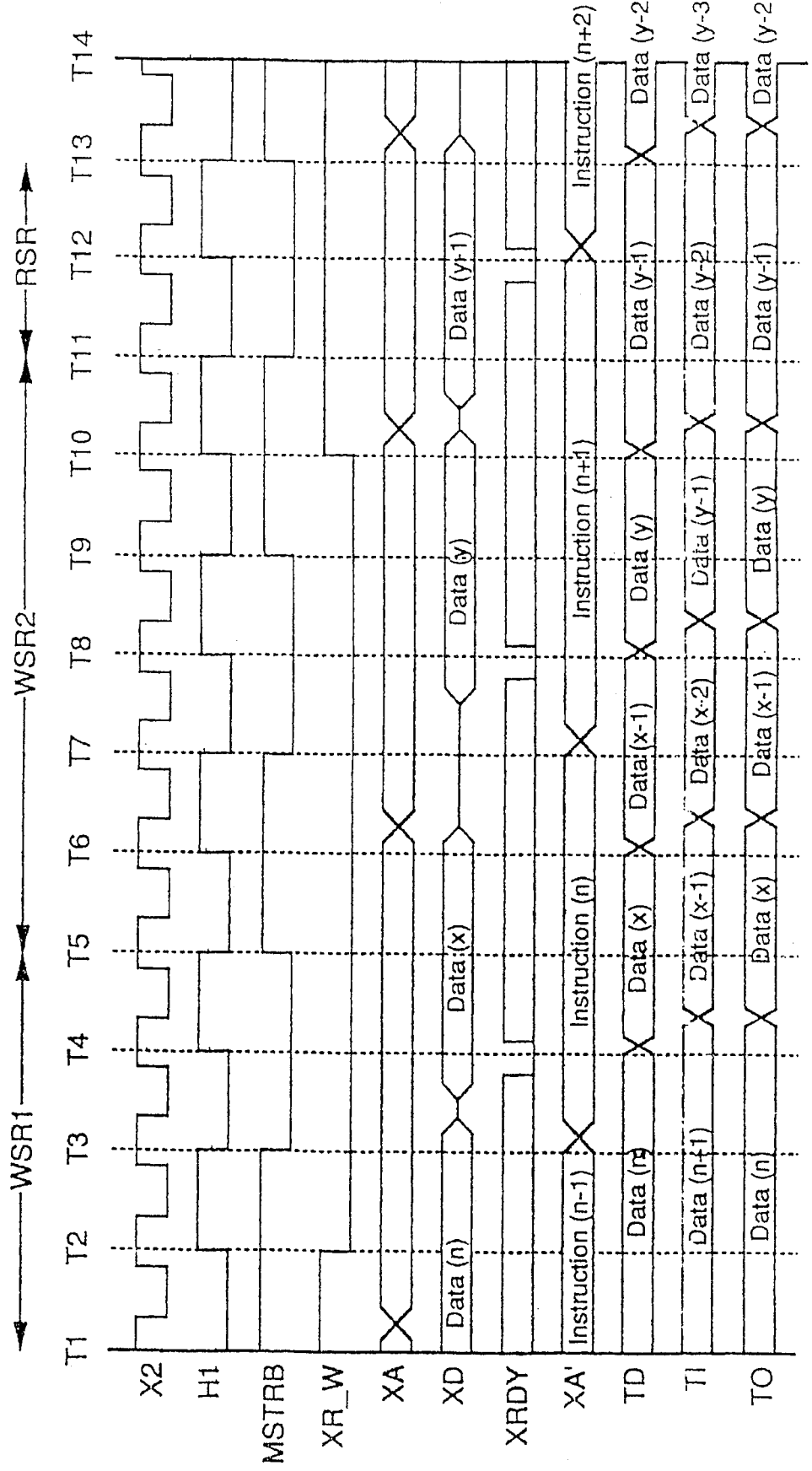
FIG. 10D is a timing chart of an operation of the tray.

The signals shown in FIG. 10D will be explained as follows. Signal X2 is a clock signal provided to DSP and signal H1 is obtained by dividing a frequency of signal X2 and corresponds to a machine cicyle of the DSP and the timing of the operation of DSP is based on the signal H1.

Signal MSTRB shows a memory strobe signal and the later recited signals XR_W, XA and XD are valid during the period when the signal MSTRB is low.

X attached to the head of respective signals XR_W, XA, XD, XRDY means "extended" and distinguishes a port of DSP to which a tray is connected. A port to which a memory is connected is not attached with X.

Signal XR_W is a control signal designating "read" when it is high and designating "write" when it is low.

XA designates an address and XD designates a data signal.

XRDY is a signal which a connected apparatus returns to the DSP but is not important for the present invention and the explanation is abbreviated.

XA' represents that XA output from the DSP is subject to sample and hold operation at a negative edge of MSTRB and operates as a control signal of an operation mode of the tray for an operation of a shifting of the tray. TD, TI and TO are respectively an abbreviation of tray data, tray in and tray out. TD is an output of DFF when the tray is shifted to the rightward, namely, data is shifted from left to right, the left side is TI, and the right side is TO. Conversely, when the tray is shifted to the left, the right side is TI and the left side is TO.

The timing chart comprises three cycles of WSR1, WSR2 and RSR. In FIG. 10D, the first WSR cycle (WSR1) is from to T1 to T5, the second WSR cycle (WSR2) is from T5 to T11 and RSR cycle is from T11 to T13. Data(n), Instruction (n-1) and Data (n+1) positioned-at the starting of the timing chart in FIG. 10D do not have any special meaning and merely designate a kind of data.

At $T_1$, WSR1 starts. Instruction (n) designating a shift right is output on XA, at a rise of H1 (T2) read and write signal XR_W becomes low, designating a write cycle. At a fall of MSTRB (T3), Instruction (n) on XA is latched and appears on XA'. Sequentially DSP outputs Data(x) and at a rise of H1 (T4) is written in DFF. The data(x) is output to the right side (TO). At the same time, Data(x-1) output from the left side is input to T1. MSTRB becomes high at T5 and this bus cicyle is completed, thereby keeping Data(x) and Data(x-1) to output. At T6, shifting operation starts and Data(x-1) on T1 is storerd in DFF and the value is output to TO. Simultaneously, Data(x-2) is supplied from the left side to TI. At this T6, XA of WSR2 cycle which starts at T5 is output. The operation from T5 to T9 is performed in the same way as T1 to T5.

Sequentially, the RSR cycle starts and when read cycle follows immediately after the write cycle, the write cycle is extented by one machine cycle until it covers T11. During this extended cycle, XR_W becomes high at T10 and thereafter it is designated that the operation is in read cycle. In synchronizing with this operation, Instruction(n+2) designating RSR cycle is output on XA and sequentially Data(y-1) on DFF is output on XD. DSP reads this data at T13 and sequentially a shifting operation starts. Data(y-2) on TI is latched at DFF and simultaneously is output to TO. At this time, Data(y-3) from the left side appears on TI.

Figure 11:
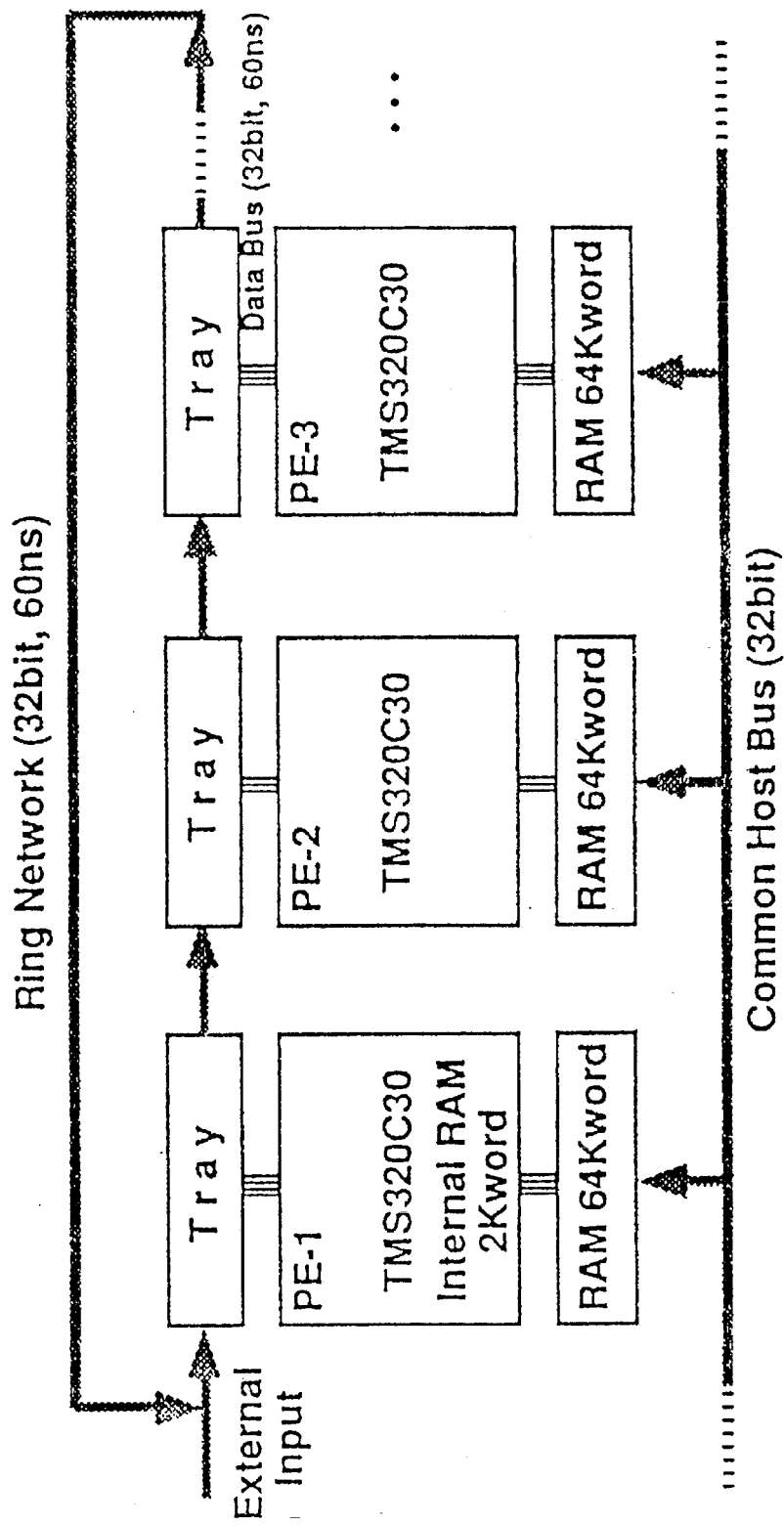
FIG. 11 is a block diagram of a neuro-computer actually constructed using the embodiments of the present invention.

FIG. 11 is a block diagram of a neuro-computer actually configured using the embodiments of the present invention.

The basic configuration of the present invention is an SIMD type multiprocessor using one-dimensional torus coupling of DSPs.

It is characteristic that, although the coupling topology and operation are similar to a one-dimensional systolic array, the present invention operates as SIMD.

The trays connected to the DSPs through bi-directional buses are latches having a transfer function and connected together in the form of a ring to form a cyclic shift register. Hereinafter the shift register is referred to as the ring.

Each DSP has a 2K-word internal memory and a 64-word built-on RAM. The internal memory can be accessed in one cycle and the built-on memory can be accessed in 1 or 2 cycles.

The built-on RAM is connected to a VMEW bus of a host computer through a common bus for initial loading of a program and data. External inputs are also connected to the host computer through a buffer memory.

FIG. 12 is a time-space chart at the time of learning in the embodiments of the present invention. The number of processors is represented in the longitudinal direction, and time is represented in the lateral direction. I corresponds to the number of processors of an input layer, H corresponds to the number of processors of a hidden layer, and τ corresponds to time of calculation of sum of products.

The time required to calculate the forward sum of products of the hidden layer is proportional to the product of the number of processors in the input layer and the operational time τ of one processor corresponding to the sum of products. Next, the sigmoid is calculated. In the output layer as well, the forward sum of products (2Hτ) and the sigmoid of the output layer are calculated. Since the number of processors in the output layer is smaller than the number of processors in the hidden layer, the size of the ring also becomes small. Next, a teacher signal input is received to calculate and back propagate an error. The error calculation is performed by a backward operation of the sum of the products in the output layer, and the weight updating in the output layer is performed through gradient vector calculation and lowpass filtering. After the sigmoid error calculation in the hidden layer, only the weight updating is performed in the hidden layer without calculating the backward sum of products.

What is claimed is:

1. A parallel data processing system, comprising:

input means for inputting data; and matrix operation means for performing a matrix operation using the data input by said input means, said matrix operation means comprising:

shift means for receiving, storing and transferring the data input, said shift means including a plurality of trays connected in cascade, each tray having a first input for receiving data of said input data and a first output for transferring the data received, at least one of said trays having a second output; and a plurality of data processing units for processing select data of the data input, each data processing unit of said data processing units having a first input and a first output and each data processing unit corresponding to one tray of the at least one of said trays having a second output, each first input of said data processing units being coupled to a corresponding second output of the corresponding tray of the at least one of said tray data processing for receiving the select data, said matrix operation being performed by said plurality of data processing units using the data input to said shift means and the select data transferred between corresponding ones of said trays and said data processing units synchronously.

2. A parallel data processing system according to claim 1, wherein said shift means is a cyclic shift register.

3. A parallel data processing system according to claim 1, wherein:

said shift means includes a shift register having a length, and said parallel data processing system further comprises means for changing the length of said shift means by altering a number of said trays connected in cascade to form said shift means.

4. A parallel data processing system according to claim 3, wherein said means for changing the length of said shift means comprises:

means for selecting a series of said trays to form the shift register, and input switching means for selecting among inputs to said trays to specify inputs to said shift means.

5. A parallel data processing system according to claim 3, further comprising data inputs coupled to said shift means, and wherein said means for changing the length of said shift means comprises:

means for selecting a series of said plurality of trays to form said shift register;

means for supplying external data to said shift register; and means for selecting among said data inputs.

6. A parallel data processing system according to claim 5, wherein each of the second inputs of said trays are connected to a respective output of the at least one output of the respective one of said data processing units, and wherein said parallel data processing system further comprises data writing means for writing data output from said data processing units into said trays.

7. A parallel data processing system according to claim 6, further comprising bi-directional data transfer paths between said data processing units and said plurality of trays.

8. A parallel data processing system according to claim 7, wherein said data processing units produce results of data processing, and wherein said data writing means transfers the results of data processing to said trays.

9. A parallel data processing system according to claim 1, wherein said shift means comprises a bi-directional shift register.

10. A parallel data processing system according to claim 9, further comprising a bi-directional bus providing a data transfer path between adjoining ones of said trays of said bi-directional shift register, the bi-directional bus used in common for input and output.

11. A parallel data processing system according to claim 10, wherein data is transferred in two directions through said bi-directional shift register.

12. A parallel data processing system according to claim 1, wherein said matrix operation means produces a product of a matrix and a vector.

13. A parallel data processing system according to claim 1, further comprising means for storing a sum of products of a matrix and vector in said trays and for shifting the sum of products, and wherein said matrix operation means performs a transposed matrix operation.

14. A parallel data processing system according to claim 1, wherein said matrix operation means performs a band matrix operation.

15. A parallel data processing system according to claim 1, wherein said matrix operation means operates on an analog signal.

16. A parallel data processing system, comprising:

input means for inputting data; and neuron computing means for performing a neuron computation using the data input, said neuron computing means comprising:

shift means for receiving, storing and transferring the data input, said shift means including a plurality of trays connected in cascade to form said shift means, each tray having a first input for receiving the data input and a first output for transferring the data input, at least some of said trays having a second output; and a plurality of data processing units for processing select data of the data input, each of said data processing units having a first input and a first output and corresponding to one of the at least some of said trays having a second output, each first input of said data processing units being coupled to the corresponding second output of the corresponding tray for receiving the select data, said neuron computation being performed using the data transferred through said shift means and between corresponding ones of said trays and said data processing units and for controlling data processing in said data processing units synchronously.

17. A parallel data processing system according to claim 16, wherein said shift means is a cyclic shift register.

18. A parallel data processing system according to claim 16, wherein:

said shift means includes a shift register having a length, and said parallel data processing system further comprises means for changing the length of said shift means by altering the number of said trays connected in cascade to form said shift means.

19. A parallel data processing system according to claim 18, wherein said means for changing the length of said shift means comprises:

means for selecting a series of said trays to form the shift register, and input switching means for selecting among inputs to said trays to specify inputs to said shift means.

20. A parallel data processing system according to claim 18, further comprising data inputs coupled to said shift means and wherein said means for changing the length of said shift means comprises:

means for selecting a series of said trays to form said shift register;

means for supplying external data to said shift register; and means for selecting among said data inputs.

21. A parallel data processing system according to claim 20, wherein said trays have second inputs;

said data processing units each have first outputs;

said trays each have second inputs of the trays is connected to the at least one output of the respective one of said data processing units; and said parallel data processing system further comprises data writing means for writing data from said data processing units into said trays.

22. A parallel data processing system according to claim 21, further comprising bi-directional data transfer paths between said data processing units and said trays.

23. A parallel data processing system according to claim 22, wherein said data processing units produce results of data processing, and wherein said data writing means transfers the results of the data processing to said trays.

24. A parallel data processing system according to claim 16, wherein said shift means comprises a bi-directional shift register.

25. A parallel data processing system according to claim 24, further comprising a bi-directional data transfer path between adjoining ones of said trays constituting said bi-directional shift register and used in common for input and output.

26. A parallel data processing system according to claim 25, wherein data is transferred in two directions through said bi-directional shift register.

27. A parallel data processing system according to claim 16, wherein said neuron computing means produces a product of a matrix and a vector.

28. A parallel data processing system according to claim 16, further comprising means for storing a sum of products of a matrix and vector in said trays and for shifting the sum of products, and wherein said neuron computing means performs a transposed matrix operation.

29. A parallel data processing system according to claim 16, wherein said neuron computing means performs a band matrix operation.

30. A parallel data processing system according to claim 16, wherein said neuron computing means operates on an analog signal.

31. A parallel data processing system, comprising:

tray means for performing a shifting of elements of a vector by preserving and transferring the elements;

a plurality of data processing means for performing a multiplication, synchronously with the shifting by said tray means, of a rectangular matrix by the vector, said rectangular matrix having elements in rows and columns and a number of plurality of said data processing units corresponding to the rows of the rectangular matrix, the number of rows being different from the number of columns, the multiplication including accumulating a product formed by multiplying an element of the elements of the vector, shifted by said tray means, with an element of the rectangular matrix;

a plurality of memory means corresponding to said plurality of data processing means, for storing the elements of respective rows of the rectangular matrix, each memory means storing the elements of one row of the respective rows; and coupling means for coupling selected data processing means of said plurality of data processing means to selected trays of said tray means.

32. The parallel data process system according to claim 31, wherein said tray means shifts the elements of the vector using circulation shifting over a length and comprises bypass means for changing the length of the circulation shifting.

33. The parallel data processing system according to claim 31, wherein:

said vector stored in said tray means has a length, said tray means forms a shift register having a length of n which is equal to the length of the vector stored in said tray means, each data processing means of said plurality of data processing means cyclically multiplies a respective element of the vector obtained from a corresponding tray by a respective element of the elements of the rectangular matrix obtained from a corresponding memory means to produce the product and accumulates the product produced during each cycle of multiplication, the elements of the vector being shifted n times to obtain an accumulated product; and said coupling means determines the length of the shift register formed by said tray means.

34. The parallel data process system according to claim 31, wherein said plurality of data processing means multiplies a transposed matrix of an input rectangular matrix by a vector; and wherein each memory means of said plurality of memory means stores a partial row vector of the input rectangular matrix, said parallel data process system further comprising a data maintaining circuit coupled between said respective tray means, said data maintaining circuit accumulating a partial sum obtained during operation of said parallel data process system, wherein each of said data processing means multiplies data from a corresponding tray means of said tray means by data from a corresponding memory means of said plurality of memory means to produce the product and adds the partial sum to the product for transfer to the corresponding tray means, and wherein said plurality of said tray means perform circular shifting.

35. The parallel data process system according to claim 31, wherein said parallel data process system executes a forward process of a neural network of interconnected neurons, wherein said memory means stores respective elements of the elements of respective rows of said rectangular matrix, the respective elements corresponding to weights between interconnected neurons in the neural network; and wherein said data means provides a sum of the product of an input variable and a respective weight of respective neuron by multiplying the input variable stored in the respective data maintaining circuits in said tray means by a corresponding weight obtained from memory means, and further comprising a non-linear function circuit for processing said sum of the product.

36. The parallel data process system according to claim 35, wherein said non-linear function circuit comprises a sigmoid function unit for performing a sigmoid function.

37. The parallel data process system according to claim 31, wherein said neural network comprises a layered neural network including at least three layers.

38. The parallel data process system according to claim 31, wherein said parallel data process system performs functions of a neural network; and further comprises means for performing a back propagation learning process in the neural network by performing a sum of a product calculation in a backward direction including multiplication of a transposed matrix by a vector, wherein said back propagation learning process is performed by calculating an error between an output signal from an output layer of the neural network and a teacher signal and propagating the error to an input layer of the neural network in a direction opposite to a normal flow of data in the neural network, by multiplying a vector having the back propagated error signal as an element by the transposed matrix of a weight coefficient matrix having a weight obtained in a backward process as an element, to obtain a partial sum of the product, and shifting, through said tray means, the partial sum of the product, wherein a respective element of a weight coefficient matrix stored in said memory means is multiplied by the error vector in said data processing means, the product is added to said partial sum, and the partial sum is stored in said tray means, thereby carrying out the back propagation learning process.

39. The parallel data process system according to claim 31, wherein a plurality of data processing means multiplies a band matrix with width k of an m×n matrix by a vector x having n elements, and wherein said plurality of tray means performs a circulating shifting operation, said vector is not rotated one rotation by said circulating shift operation and when an element of the vector x is shifted in said tray means, the starting point at which the band of the matrix starts can be designated in a discretional manner.

40. The parallel data process system according to claim 39, in which said shifting operation can be performed in a bi-directional manner.

41. The parallel data process system according to claim 40, wherein:

the tray means has a data reserving function, said data processing means is separated from said tray means having the data reserving function, and processes the data transferred between said tray means concurrently and parallelly, and said parallel data process system further comprises means for shortening a time period required for data transfer between said tray means to less than a time period required for the data processing in said data processing means to enable a time for data transfer to be hidden in a data process time.

* * * * *